(12) United States Patent
Watanabe et al.

(10) Patent No.: US 10,286,608 B2
(45) Date of Patent: May 14, 2019

(54) LASER WELDING APPARATUS AND LASER WELDING METHOD

(71) Applicant: SEIDENSHA ELECTRONICS CO., LTD., Arakawa-ku, Tokyo (JP)

(72) Inventors: Kimihiko Watanabe, Tokyo (JP); Naokazu Nagasawa, Tokyo (JP)

(73) Assignee: SEIDENSHA ELECTRONICS CO., LTD, Tokyo (JP)

( * ) Notice: Subject to any disclaimer, the term of this patent is extended or adjusted under 35 U.S.C. 154(b) by 0 days.

(21) Appl. No.: 15/312,538

(22) PCT Filed: Feb. 23, 2016

(86) PCT No.: PCT/JP2016/055290
§ 371 (c)(1),
(2) Date: Nov. 18, 2016

(87) PCT Pub. No.: WO2017/145269
PCT Pub. Date: Aug. 31, 2017

(65) Prior Publication Data
US 2018/0111327 A1    Apr. 26, 2018

(51) Int. Cl.
*B32B 41/00* (2006.01)
*B29C 65/16* (2006.01)
(Continued)

(52) U.S. Cl.
CPC ...... *B29C 65/1635* (2013.01); *B23K 26/0608* (2013.01); *B23K 26/211* (2015.10);
(Continued)

(58) Field of Classification Search
CPC ............ B29C 65/1635; B23K 26/0608; B23K 26/703; B23K 26/0063; B23K 26/211; B29K 2101/12
(Continued)

(56) References Cited

U.S. PATENT DOCUMENTS

2006/0071371 A1    4/2006  Quint et al.

FOREIGN PATENT DOCUMENTS

JP    S62142092 A    6/1987
JP    H09510930 A    11/1997
(Continued)

OTHER PUBLICATIONS

Japanese and English translation of Office Action, from Japanese Patent Office in JP2016-510336, 5 pages.
(Continued)

*Primary Examiner* — Michael N Orlando
*Assistant Examiner* — Joshel Rivera
(74) *Attorney, Agent, or Firm* — Greenblum & Bernstein, P.L.C.

(57) ABSTRACT

A laser welding apparatus is provides that includes: a support member including a heat generation portion which has a size that is limited to correspond to a size of a welding area of a plurality of plastic components and is made from a material that absorbs a laser beam and generates heat, and which generates heat of a temperature that is equal to or greater than a melting temperature of the plastic components; a laser beam irradiation unit for converging a laser beam to be transmitted through the plurality of plastic components, and irradiating the laser beam toward the heat generation portion through the plurality of plastic components; and a welding controller for causing a laser beam to be irradiated at the heat generation portion using the laser beam irradiation unit to thereby cause the heat generation portion to generate heat, and welding abutting faces of a welding area of the plurality of plastic components with heat that is generated.

18 Claims, 63 Drawing Sheets

(51) Int. Cl.
  *B23K 26/57* (2014.01)
  *B23K 26/211* (2014.01)
  *B23K 26/70* (2014.01)
  *B23K 26/06* (2014.01)
  *B29C 65/18* (2006.01)
  *B29C 65/24* (2006.01)
  *B29C 65/78* (2006.01)
  *B29C 65/00* (2006.01)
  *B29K 101/12* (2006.01)

(52) U.S. Cl.
  CPC ............ *B23K 26/57* (2015.10); *B23K 26/703* (2015.10); *B29C 65/1616* (2013.01); *B29C 65/1622* (2013.01); *B29C 65/1641* (2013.01); *B29C 65/1654* (2013.01); *B29C 65/1658* (2013.01); *B29C 65/1667* (2013.01); *B29C 65/18* (2013.01); *B29C 65/245* (2013.01); *B29C 65/7882* (2013.01); *B29C 66/0342* (2013.01); *B29C 66/112* (2013.01); *B29C 66/114* (2013.01); *B29C 66/1122* (2013.01); *B29C 66/1142* (2013.01); *B29C 66/1312* (2013.01); *B29C 66/21* (2013.01); *B29C 66/24221* (2013.01); *B29C 66/326* (2013.01); *B29C 66/348* (2013.01); *B29C 66/3472* (2013.01); *B29C 66/3492* (2013.01); *B29C 66/41* (2013.01); *B29C 66/43* (2013.01); *B29C 66/45* (2013.01); *B29C 66/522* (2013.01); *B29C 66/526* (2013.01); *B29C 66/5221* (2013.01); *B29C 66/5261* (2013.01); *B29C 66/5268* (2013.01); *B29C 66/5344* (2013.01); *B29C 66/5346* (2013.01); *B29C 66/545* (2013.01); *B29C 66/63* (2013.01); *B29C 66/65* (2013.01); *B29C 66/73521* (2013.01); *B29C 66/8122* (2013.01); *B29C 66/8161* (2013.01); *B29C 66/8167* (2013.01); *B29C 66/81267* (2013.01); *B29C 66/81419* (2013.01); *B29C 66/81427* (2013.01); *B29C 66/81431* (2013.01); *B29C 66/81457* (2013.01); *B29C 66/81465* (2013.01); *B29C 66/81469* (2013.01); *B29C 66/81811* (2013.01); *B29C 66/81821* (2013.01); *B29C 66/8248* (2013.01); *B29C 66/8282* (2013.01); *B29C 66/83221* (2013.01); *B29C 66/83413* (2013.01); *B29C 66/872* (2013.01); *B29C 66/8748* (2013.01); *B29C 66/919* (2013.01); *B29C 66/9161* (2013.01); *B29C 66/91212* (2013.01); *B29C 66/91216* (2013.01); *B29C 66/91221* (2013.01); *B29C 66/91231* (2013.01); *B29C 66/91421* (2013.01); *B29C 66/91431* (2013.01); *B29C 66/91641* (2013.01); *B29C 66/9241* (2013.01); *B29C 66/961* (2013.01); *B29C 66/9672* (2013.01); *B29C 66/9674* (2013.01); *B29C 65/1683* (2013.01); *B29C 66/71* (2013.01); *B29C 66/73921* (2013.01); *B29C 66/81423* (2013.01); *B29C 66/8222* (2013.01); *B29C 66/8223* (2013.01); *B29K 2101/12* (2013.01)

(58) Field of Classification Search
  USPC .................. 156/60, 64, 350, 351, 378, 379
  See application file for complete search history.

(56) References Cited

FOREIGN PATENT DOCUMENTS

| | | |
|---|---|---|
| JP | H11170371 A | 6/1999 |
| JP | 2001191412 A | 7/2001 |
| JP | 2004142225 A | 5/2004 |
| JP | 2011131556 A | 7/2011 |
| JP | 2011240585 A | 12/2011 |
| JP | 2013018206 A | 1/2013 |
| JP | 2013-75071 A | 4/2013 |
| JP | 2013184437 A | 9/2013 |
| JP | 2013202876 A | 10/2013 |

OTHER PUBLICATIONS

Japanese and English translation of Written Argument filed Jul. 29, 2016, by applicant in JP2016-510336, 16 pages.

Japanese and English translation of Written Amendment filed Jul. 29, 2016, by applicant in JP2016-510336, 12 pages.

Japanese and English translation of Decision to Grant a Patent dated Aug. 31, 2016, from Japanese Patent Office in JP2016-510336, 2 pages.

Japanese and English version of Certificate of Patent dated Dec. 2, 2016, from Japanese Patent Office in JP2016-510336, 1 page.

Japanese and English translation of Patent Gazette dated Dec. 21, 2016, from Japanese Patent Office in JP2016-510336, International Application No. PCT/JP2016/055290, 1 page.

European Search Report issued with respect to Application No. 16790867.2, dated May 25, 2018.

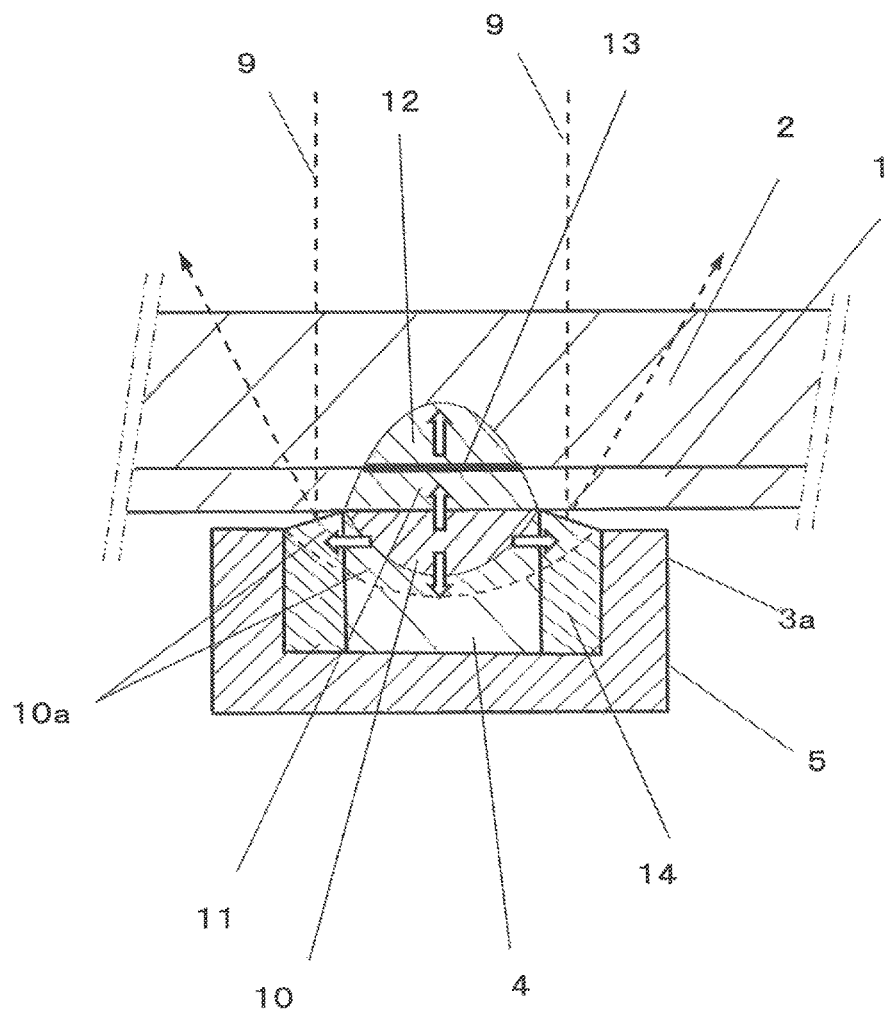

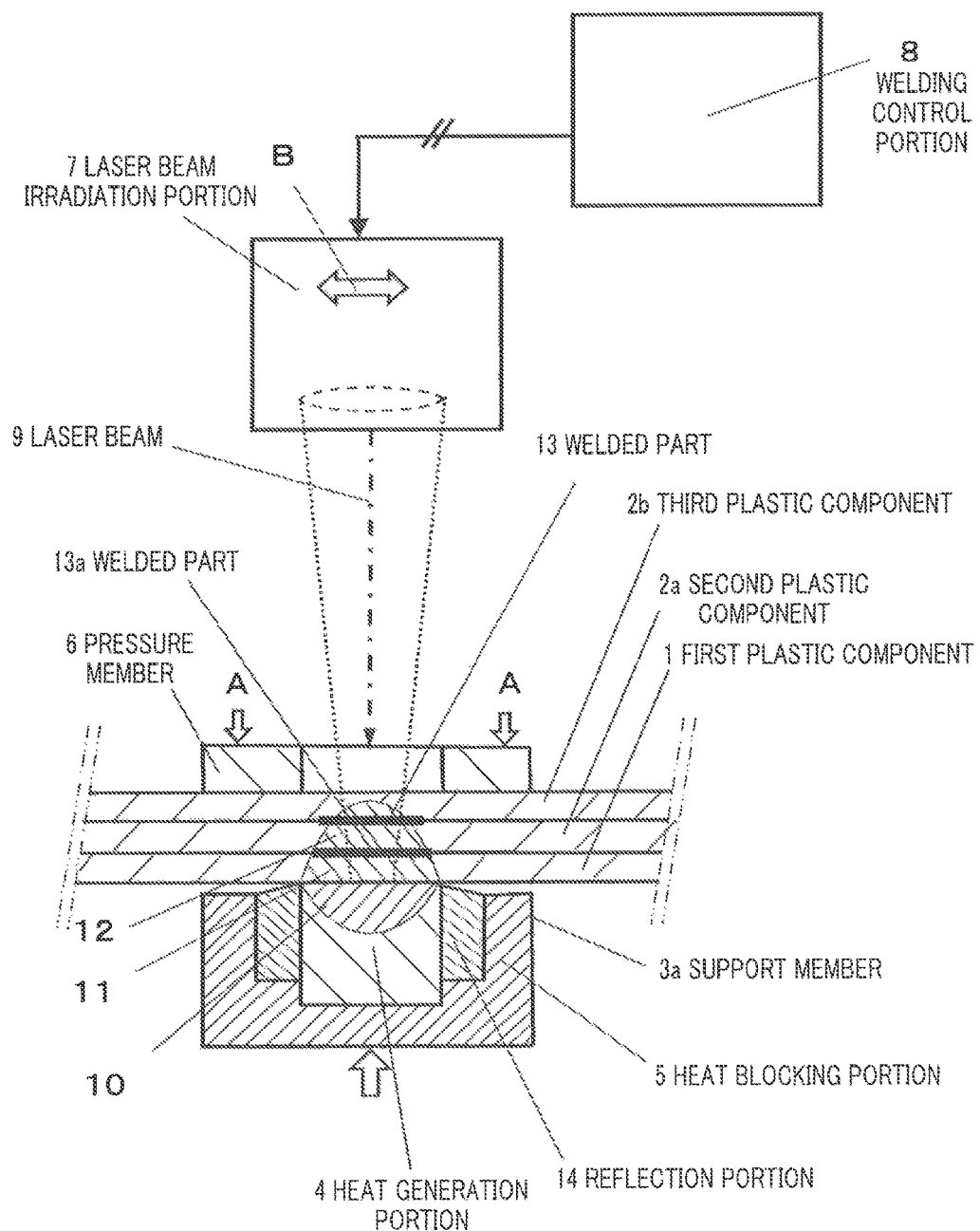

FIG. 12

| PARAMETER | | CONDITION A | CONDITION B | CONDITION C |
|---|---|---|---|---|
| FIRST PLASTIC COMPONENT | MATERIAL | N1 | N2 | N3 |
| | THICKNESS | 1 | 1 | 1 |
| SECOND PLASTIC COMPONENT | MATERIAL | N1 | N2 | N3 |
| | THICKNESS | 2 | 2.5 | 2 |
| HEATING TEMPERATURE RANGE | $T_1$ | 230~250 | 230~250 | 230~250 |
| COOLING TEMPERATURE RANGE | $T_2$ | 70~90 | 70~90 | 70~90 |
| SIZE OF WELDING AREA | La | 2 | 3 | 2 |
| SIZE OF HEAT GENERATION PORTION | Lb | 2 | 3 | 2 |
| UNIT TIME OF LASER BEAM IRRADIATION | $\Delta t$ | 0.1 | 0.1 | 0.1 |
| AMOUNT OF INCREASE/DECREASE IN LASER BEAM IRRADIATION AMOUNT | $\Delta P$ | 0.1 | 0.1 | 0.1 |
| UNIT MOVEMENT AMOUNT OF PLASTIC | $\Delta L$ | --- | --- | --- |
| RESULT OF EVALUATION ACCORDING TO STRENGTH | F/Fo *100 | 90 | 85 | 80 |

FIG. 52
(a) 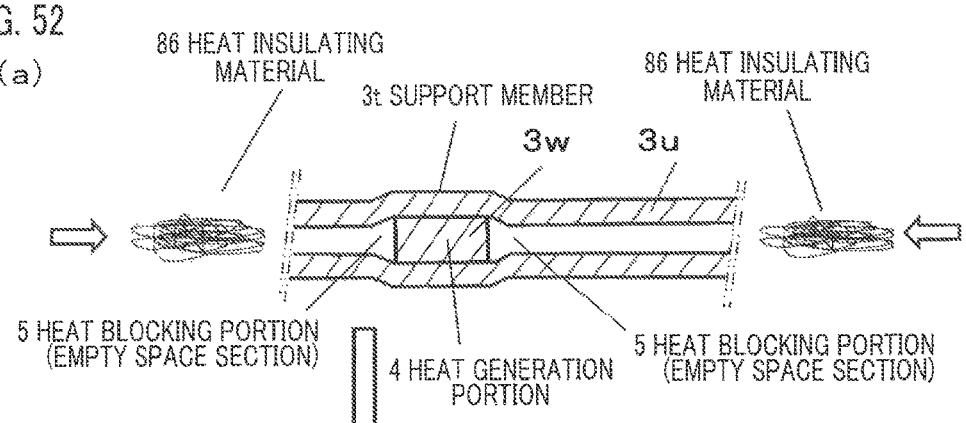
(b) 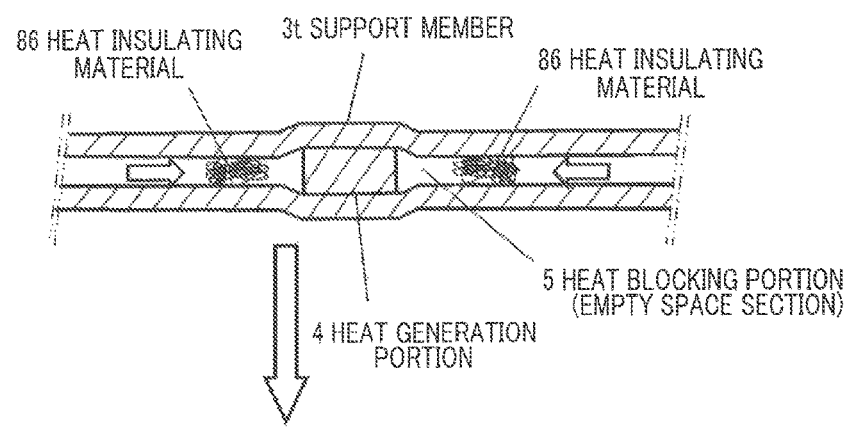
(c) 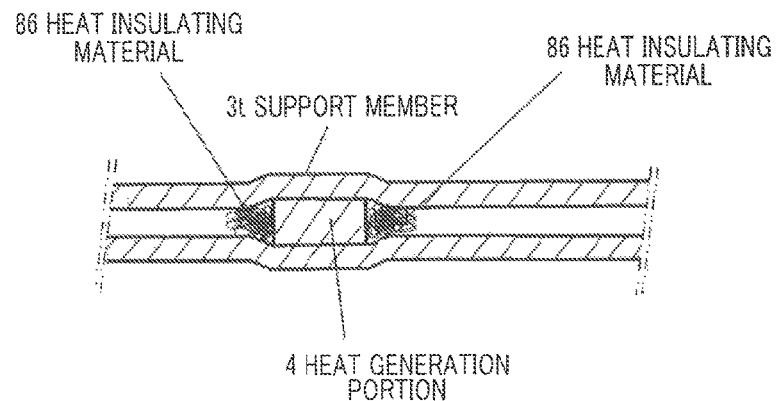

FIG. 56

|  | 96a | 96b | 96c | 96d | 96e |
|---|---|---|---|---|---|
| PATTERN A | LOW | MEDIUM | HIGH | MEDIUM | LOW |
| PATTERN B | LOW | HIGH | HIGH | HIGH | LOW |
| PATTERN C | HIGH | MEDIUM | LOW | MEDIUM | HIGH |

FIG. 57
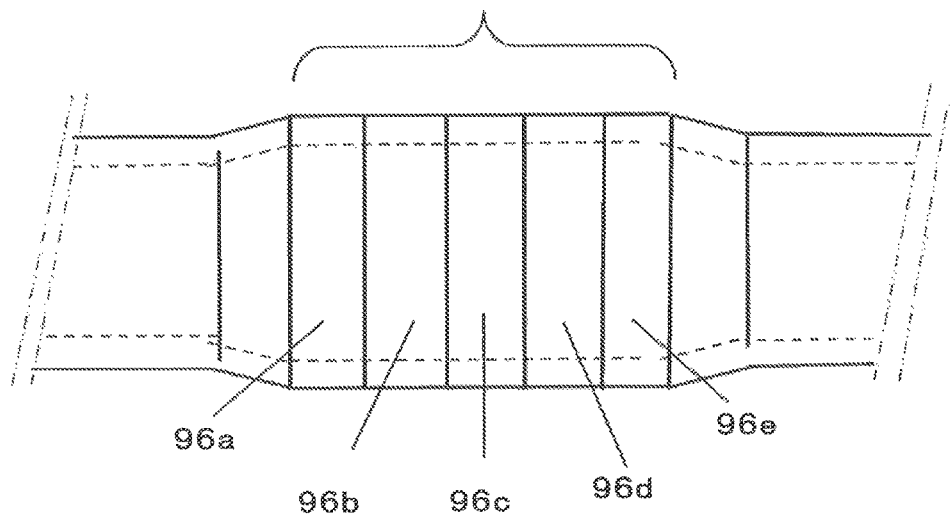
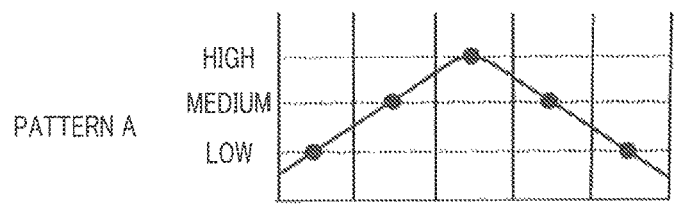
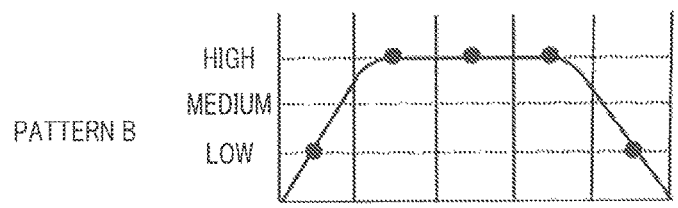
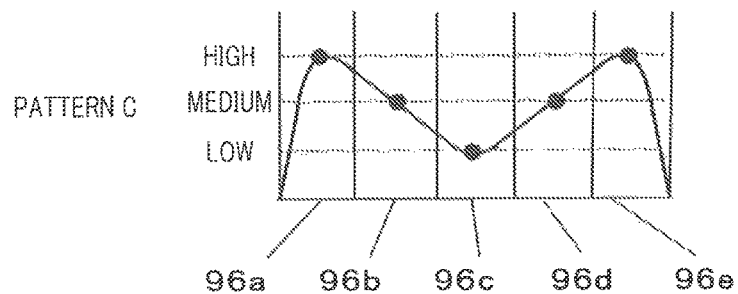

LASER WELDING APPARATUS AND LASER WELDING METHOD

TECHNICAL FIELD

The present disclosure relates to a laser welding apparatus and a laser welding method for laser welding of a plurality of plastic components which transmit a laser beam.

BACKGROUND ART

As a laser welding method for welding plastic components, a method is known in which a laser-beam-transmitting plastic component that transmits a laser beam is superposed on a laser-beam-absorbing plastic component that absorbs a laser beam, a laser beam is irradiated from above the laser-beam-transmitting plastic component toward the laser-beam-absorbing plastic component to cause the laser-beam-absorbing plastic component to absorb laser beam energy and generate heat, and the vicinity of abutting faces at which the laser-beam-transmitting plastic component and the laser-beam-absorbing plastic component come in contact are melted by the heat generated in the laser-beam-absorbing plastic component, and then allowed to harden and weld.

FIG. 72 illustrates the principles of a conventional laser welding method for welding plastic components. In FIG. 72, a laser-beam-absorbing plastic plate 302 and a laser-beam-transmitting plastic plate 303 are placed on a supporting base 301 made of glass, and a pressure member 304 made of glass is placed on the laser-beam-transmitting plastic plate 303. The pressure member 304 is pressed downward by an unshown pressing source, for example, an air cylinder, to thereby cause the abutting faces of the laser-beam-absorbing plastic plate 302 and the laser-beam-transmitting plastic plate 303 to closely contact.

Subsequently, when a laser beam 305 is irradiated onto the entire area of the aforementioned abutting faces from above the pressure member 304, the laser beam 305 is transmitted through the pressure member 304 and the laser-beam-transmitting plastic plate 303 and is absorbed by the laser-beam-absorbing plastic plate 302. The laser-beam-absorbing plastic plate 302 absorbs the laser beam 305 and generates heat. In the laser-beam-absorbing plastic plate 302, the area in the vicinity of the abutting face with the laser-beam-transmitting plastic plate 303 which the laser beam 305 impinges upon becomes a high temperature and melts. Subsequently, the abutting face of the laser-beam-transmitting plastic plate 302 also melts. When irradiation of the laser beam 305 stops, the melted portions cool and harden, and thus the laser-beam-transmitting plastic plate 303 and the laser-beam-absorbing plastic plate 302 are welded (see Patent Document 1).

FIG. 73 is a view that illustrates the principles of a laser welding method in the case of performing laser welding of a plurality of laser-beam-transmitting plastic plates 303a and 303b through which a laser beam passes. In FIG. 73, the plurality of laser-beam-transmitting plastic plates 303a and 303b are mutually superposed and placed on the supporting base 301 made of glass. Since the plurality of laser-beam-transmitting plastic plates 303a and 303b transmit the laser beam, the laser-beam-transmitting plastic plates 303a and 303b do not generate heat. Therefore, a laser beam absorbing material 306 that absorbs the laser beam 305 is coated between the respective abutting faces of the plurality of laser-beam-transmitting plastic plates 303a and 303b. A pigment such as carbon black is mixed into the laser beam absorbing material 306.

When the laser beam 305 is irradiated from above the pressure member 304 onto the entire area of the abutting faces of the laser-beam-transmitting plastic plates 303a and 303b on which the laser beam absorbing material 306 is coated, the laser beam absorbing material 306 absorbs the laser beam 305 and generates heat and melts. The laser beam absorbing material 306 acts as an adhesive that bonds the laser-beam-transmitting plastic plates 303a and 303b to thereby weld together the two plastic plates 303a and 303b (see Patent Documents 1 and 2).

According to the above described laser welding methods there are the advantages that (1) abutting faces of a plurality of plastic components are firmly welded, (2) a beautiful finish is achieved, and (3) vibrations are not applied to the components as in the case of ultrasonic welding. For these reasons, the above described laser welding methods are used for miscellaneous kinds of plastic welding (see Patent Document 3).

However, the above described laser welding methods are based on the premise that one of the laser-beam-absorbing plastic plate 302 and the laser beam absorbing material 306 absorbs a laser beam. There has been the problem that because a pigment such as carbon black is included in the laser-beam-absorbing plastic plate 302 or the laser beam absorbing material 306, the plastic plate 302 or absorption material 306 is colored and opaque or, even if the plastic plate 302 or absorption material 306 is semi-transparent, the degree of transparency is low.

PRIOR ART DOCUMENT

Patent Document

Patent Document 1: Japanese Patent Laid-Open No. 62-142092
Patent Document 2: Japanese Patent Laid-Open No. 11-170371
Patent Document 3: National Publication of International Patent Application No. 9-510930

SUMMARY OF THE INVENTION

Problems to be Solved by the Invention

An object of the present invention is to provide a novel laser welding apparatus and laser welding method which can directly weld together a plurality of plastic components that transmit a laser beam.

Means for Solving the Problems

In order to achieve the above object, a laser welding apparatus according to the present invention includes: a support member including a heat generation portion which has a size that is limited to correspond to a size of a welding area of a plurality of plastic components and is made from a material that absorbs a laser beam and generates heat, and which generates heat of a temperature that is equal to or greater than a melting temperature of the plastic components; a laser beam irradiation unit for converging a laser beam to be transmitted through the plurality of plastic components, and irradiating the laser beam toward the heat generation portion through the plurality of plastic components; and a welding controller for causing a laser beam to be irradiated at the heat generation portion using the laser beam irradiation unit to thereby cause the heat generation portion to generate heat, and welding abutting faces of a welding area of the plurality of plastic components with heat that is generated.

In order to achieve the above object, a laser welding method according to the present invention is a method that welds abutting faces of a welding area of a plurality of plastic components which transmit a laser beam, and that includes the following steps (1) to (8): (1) mounting a plurality of plastic components on a support member that includes a heat generation portion which has a size that is limited to correspond to a size of a welding area of the plurality of plastic components and is made of a material that absorbs a laser beam and generates heat, and which generates heat of a temperature that is equal to or greater than a melting temperature of the plastic components; (2) causing the plurality of plastic components to come in contact at abutting faces of the welding area; (3) causing a certain portion of the abutting faces of the welding area of the plurality of plastic components to be superposed facing the heat generation portion of the support member; (4) by using the pressure member to sandwich and press the plurality of plastic components between the pressure member and the heat generation portion, causing the abutting faces of the welding area of the plurality of plastic components to closely contact, and simultaneously causing the heat generation portion of the support member and a surface of a plastic component that contacts the heat generation portion to closely contact; (5) using laser beam irradiation unit to converge a laser beam and irradiate the laser beam toward the heat generation portion of the support member through the plurality of plastic components; (6) causing the laser beam to be transmitted through the plurality of plastic components and absorbed by the heat generation portion; (7) causing the heat generation portion to generate heat; and (8) welding the abutting faces of the welding area of the plurality of plastic components with heat generated by the heat generation portion.

Advantageous Effects of the Invention

According to the present invention, a plurality of plastic components which transmit a laser beam can be directly welded together without interposing a laser beam absorbing material or the like therebetween.

BRIEF DESCRIPTION OF THE DRAWINGS

FIG. 5B is a partial enlarged view illustrating the vicinity of a heating portion of the first modification of the laser welding method according to the first embodiment of the present invention.

FIG. 6 is a view that illustrates principles of a second modification of the laser welding method according to the first embodiment of the present invention.

FIG. 12 is a view that illustrates an example of storage contents of a memory of the seventh modification of the laser welding method according to the first embodiment of the present invention.

FIG. 52 is a view illustrating procedures for attaching a heat insulating material to a support member that is used in a laser welding method according to a thirteenth embodiment of the present invention.

FIG. 56 is a view that describes coating division patterns of resin coatings of a support member of the laser welding method according to the sixteenth embodiment of the present invention.

FIG. 57 is a view that visually illustrates coating division patterns of resin coatings of the support member of the laser welding method according to the sixteenth embodiment of the present invention.

MODE FOR CARRYING OUT THE INVENTION

First Embodiment

Figure 1:
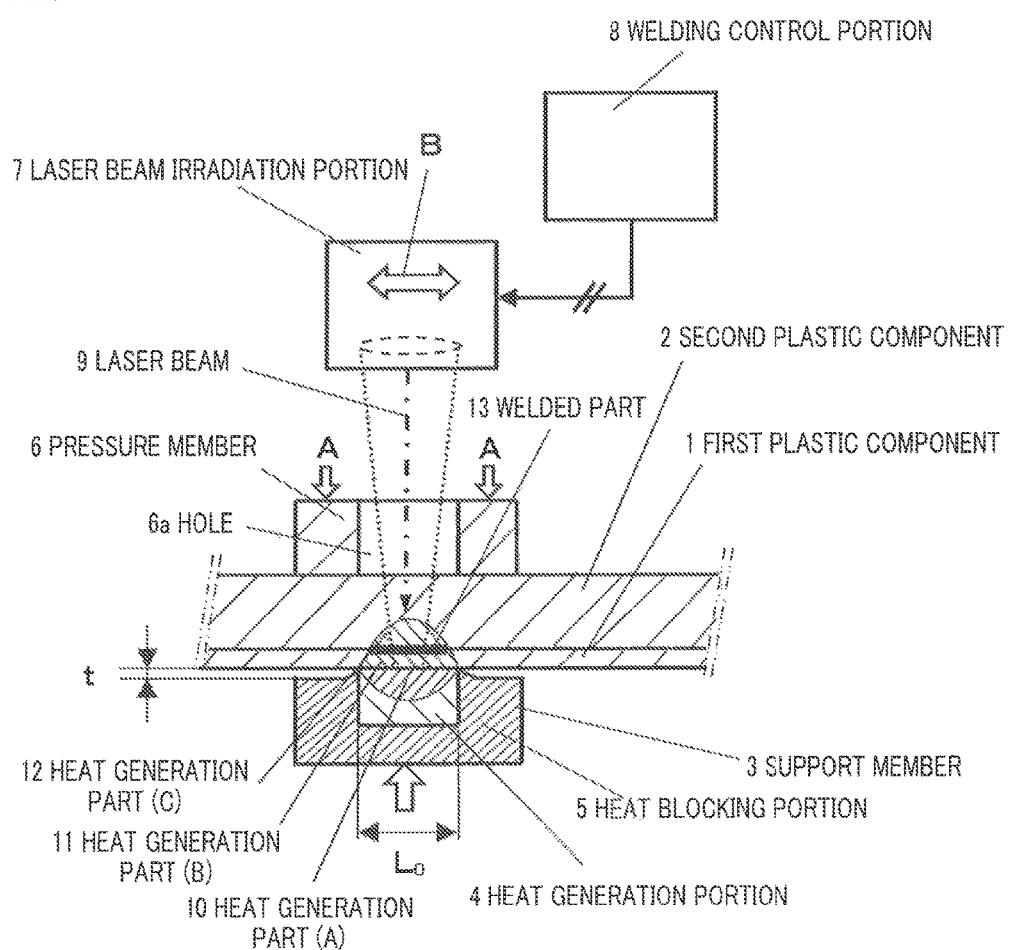
FIG. 1 is a cross-sectional view illustrating principles of a laser welding method according to a first embodiment of the present invention.
Figure 2:
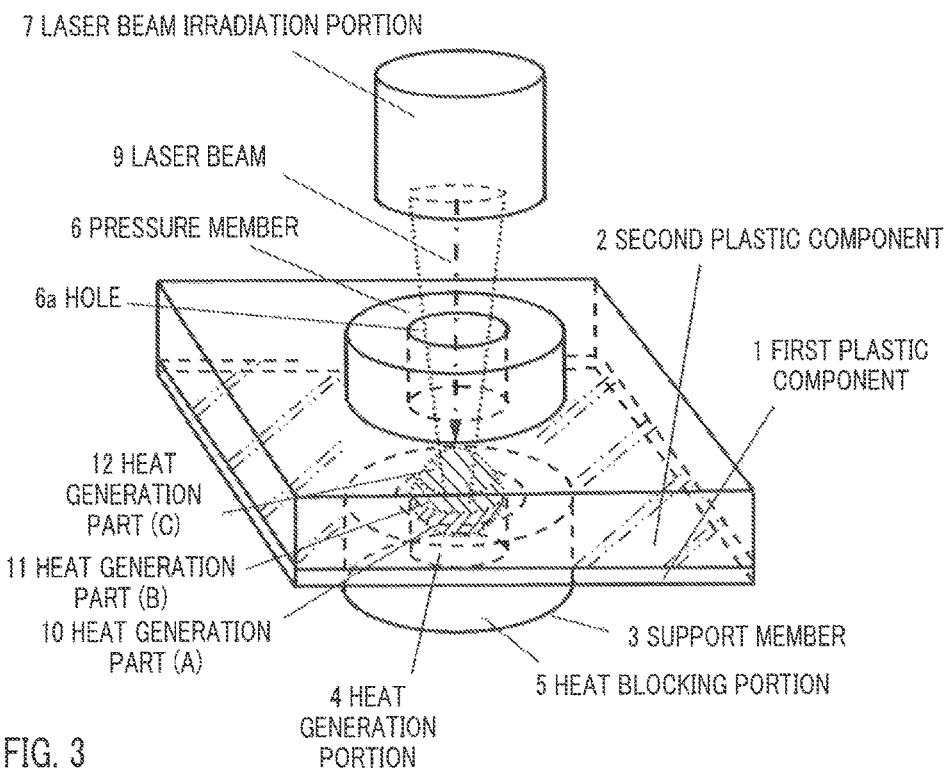
FIG. 2 is a perspective view illustrating principles of the laser welding method according to the first embodiment of the present invention.

The principles of a laser welding method for welding first and second plastic components 1 and 2 will be described as a laser welding method for welding a plurality of plastic components that transmit a laser beam according to a first embodiment of the present invention. FIG. 1 is a cross-sectional view of a principal portion in the first embodiment, and FIG. 2 is a perspective view thereof.

In FIG. 1, reference numerals 1 and 2 denote a plurality of plastic components that are to be welded together. Here, a method will be described that welds a first plastic component 1 and a second plastic component 2 as a plurality of plastic components. A case where three plastic components are to be welded together is described later using FIG. 6.

Each of the first and second plastic components 1 and 2 are made from a material which has low absorptivity with respect to a laser beam and which transmits a laser beam, for example, a thermoplastic resin such as a polyamide resin. Note that, apart from a polyamide resin, for example, a polyester, a polyolefin and a thermoplastic polyurethane are also available as transparent resin materials which transmit a laser beam.

In FIG. 1, the first plastic component 1 has a thin plate shape and the second plastic component 2 has a thick plate shape. Reference numeral 3 denotes a support member that supports the first and second plastic components 1 and 2 to be welded together. The support member 3 has a heat generation portion 4. The heat generation portion 4 has a size that is limited to correspond to a size of a welding area of the plurality of plastic components. The heat generation portion 4 is made of a material that absorbs a laser beam and generates heat, and generates heat of a temperature that is equal to or greater than a melting temperature of the plastic. Since FIG. 1 is a cross-sectional view, the size of the heat generation portion 4 is shown as a length ($L_0$).

Here, the term "size that is limited to correspond to a size of a welding area" refers to a size that is limited according to welding conditions such as the material and size of the components to be welded together, the output of a laser beam irradiation apparatus and the intended strength of the laser welding, and means a size that is limited to a size necessary for welding abutting faces of the welding area (a welded part 13 indicated by a thick line in FIG. 1), and excludes a portion having a size as a continuum. Upon receiving a laser beam, the heat generation portion 4 generates heat of a temperature that is equal to or greater than the melting temperature of plastic.

The aforementioned "size that is limited to correspond to a size of a welding area" is determined based on experimental values and empirical values obtained by combining respective parameters and actually performing laser welding and thereafter measuring and evaluating the welding strength.

Since the material and sizes of the plurality of plastic components to be welded together, the area of welding and a welding strength to be realized are given as preconditions, the size of the heat generation portion 4 is determined based on experimental values and empirical values obtained by measuring and evaluating the welding strength after actually performing laser welding in which a size that is the same as the welding area of the plurality of plastic components is taken as the basic dimension of the heat generation portion 4, a laser beam is irradiated and welding is performed, the welding strength is measured, and if the strength is insufficient the irradiation conditions of the laser beam are changed and the size of the heat generation portion 4 is changed.

If preconditions such as the material, size and welding area of the plurality of plastic components are similar, it is easy to determine the size of the heat generation portion based on evaluated experimental values and empirical values. Therefore, in the present invention, after respective parameters are combined and laser welding is actually performed, experimental values and empirical values obtained by measuring and evaluating the welding strength are stored in a memory, and when welding control is next performed, the previous conditions are read from the memory and utilized. This process is described later as a seventh modification of the first embodiment using FIGS. 11 and 12.

The welding areas of the first plastic component and the second plastic component of the present embodiment are circular abutting faces. In contrast, the heat generation portion 4 has a cylindrical shape, and one end face forming the upper face thereof abuts against the first plastic component 1. In the present embodiment, the size (area) of the one end face of the heat generation portion 4 is formed to be the same size (area) as the abutting faces that are the welding area of the first plastic component 1 and the second plastic component 2. Note that, the length $L_0$ in FIG. 1 is equivalent to the diameter of the upper face of the heat generation portion 4.

The heat generation portion 4 is made from a metal such as stainless steel, and generates heat upon a laser beam being irradiated thereon. The respective faces other than the upper face that is a face to be irradiated of the heat generation portion 4 are surrounded by a heat blocking portion 5 that is made from a heat insulating material such as gypsum. Note that, a configuration is adopted so that a height position of the upper face of the heat generation portion 4 protrudes slightly so as to be higher than an upper face position of the heat blocking portion 5, and only the upper face of the heat generation portion 4 securely contacts against a surface of the first plastic component 1 (in FIG. 1, the undersurface of the first plastic component 1). Therefore, as shown in FIG. 1, a clearance (t) is formed between the upper face of the heat blocking portion 5 and the surface of the first plastic component 1. Thus, the support member 3 has an approximately cylindrical shape in which the heat generation portion 4 is disposed at the center, and the periphery of the heat generation portion 4 is surrounded by the heat blocking portion 5. In the support member 3, the heat generation portion 4 is limited to a size that is limited to correspond to the size of the welding area.

Reference numeral 6 denotes a pressure member for causing the abutting faces of the welding area of the first and second plastic components 1 and 2 to closely contact each other. When the pressure member 6 contacts against the upper face of the second plastic component 2, and the pressure member 6 is pressed to the support member 3 side by a pressing source such as an air cylinder or a clamp that is indicated by outline arrows A in FIG. 1, of the abutting faces of the first and second plastic components 1 and 2, at least portions that corresponds to the heat generation portion 4 (in FIG. 1, portions having the length $L_0$) closely contact. Further, the upper face of the heat generation portion 4 and the surface of the first plastic component 1 also closely contact at portions that correspond to the heat generation portion 4 (in FIG. 1, portions having the length $L_0$). Note that, when the first and second plastic components 1 and 2 to be welded together have a large self-weight and the above described close contact force is obtained, pressurization by the pressure member 6 may not be required.

In FIG. 1, a hole 6a is formed in a circular shape in the center of the pressure member 6 to enable a laser beam 9 to pass therethrough. Note that, if a material that transmits a laser beam, such as transparent silicone rubber is used as the material of the pressure member 6, the hole 6a need not be formed in the center. Reference numeral 7 denotes a laser beam irradiation portion that irradiates the laser beam 9 according to control of a welding control portion (welding controller) 8. In the present embodiment a near-infrared laser beam is used as the laser beam 9, the laser beam 9 is converged with a lens, which is not illustrated in detail, within the laser beam irradiation portion 7, and is irradiated onto the surface of the heat generation portion 4 of the support member 3. A wavelength of the laser beam 9 is in a range of 700 to 1200 nm, and preferably a range of 800 to 1000 nm.

According to the laser welding apparatus configured in this manner, the first and second plastic components 1 and 2 to be welded together are mounted on the heat generation portion 4 of the support member 3, and the pressure member 6 is placed on the first and second plastic components 1 and 2. Subsequently, the abutting faces of the welding area are caused to closely contact by pressing the first and second plastic components 1 and 2 toward the support member 3 through the pressure member 6 by means of a force from the pressing source, and thus the heat generation portion 4 and the surface of the first plastic component 1 that contacts against the heat generation portion 4 are caused to closely contact. Next, the laser beam 9 is irradiated by the laser beam irradiation portion 7 from above the pressure member 6, that is, from beyond the first and second plastic components 1 and 2 with respect to the heat generation portion 4. The laser beam 9 passes through the hole 6a of the pressure member 6, is transmitted through the first and second plastic components 1 and 2, and is irradiated onto and absorbed by the surface of the heat generation portion 4 that is made of a metal such as stainless steel.

As shown in FIG. 1, because the respective faces other than the upper face of the heat generation portion 4 are surrounded by the heat blocking portion 5 that is made of a heat insulating material such as gypsum, heat that is generated in a heat generation part (A) 10 of the heat generation portion 4 of the support member 3 is not emitted to outside of the heat blocking portion 5. The heat generated in the heat generation part (A) 10 is transmitted to a heat generation part (B) 11 of the first plastic component 1 that the upper face of the heat generation portion 4 is in close contact with, and is further transmitted to a heat generation part (C) 12 of the second plastic component 2.

The manner in which heat generated in the heat generation part (A) 10 of the heat generation portion 4 of the support member 3 forms a lump of heat and is transmitted to the heat generation part (B) 11 of the first plastic component 1 which the upper face of the heat generation portion 4 is in close contact with, and is further transmitted to the heat generation part (C) 12 of the second plastic component 2 will be understood by referring to the perspective view in FIG. 2.

As irradiation of the laser beam 9 by the laser beam irradiation portion 7 continues, the temperature of the heat generation part (A) 10, the heat generation part (B) 11 and the heat generation part (C) 12 of the heat generation portion 4, the first plastic component 1 and the second plastic component 2, respectively, becomes a high temperature and exceeds the melting temperature of the first and second plastic components 1 and 2. Subsequently, the abutting portions of the first and second plastic components 1 and 2 are melted by the heat that is generated at the heat generation portion 4. When irradiation of the laser beam 9 of the laser beam irradiation portion 7 stops, heat generation in the heat generation part (A) 10 of the heat generation portion 4 stops, and the heat generation part (B) 11 and heat generation part (C) 12 of the abutting portions of the first and second plastic components 1 and 2 cool and harden to thereby complete the welding.

A feature of the present embodiment is that the heat generation portion 4 is provided which is of a size that is limited to correspond to a size of a welding area of the plurality of plastic components, is made of a material that absorbs a laser beam and generates heat, and generates heat of a temperature that is equal to or greater than the melting temperature of plastic.

If a configuration is adopted in which the size of the heat generation portion 4 is not limited, and is a size as a continuum with respect to the abutting faces of the welding area, the heat that is absorbed from the laser beam will diffuse over a wide area. For example, although the first and second plastic components 1 and 2 are each formed in the shape of a square plate as shown in the perspective view in FIG. 2, if a part at which the laser beam is not irradiated of the support member 3 were also made of the same material as the heat generation portion 4, when the whole area thereof is supported, heat that arises as the result of irradiation of the laser beam will be diffused over a wide area in which the laser beam is not irradiated, and will not be adequately transmitted in the thickness direction of the first and second plastic components 1 and 2. If heat is not transmitted in the thickness direction of the first and second plastic components 1 and 2, sufficient heat for melting the first and second plastic components 1 and 2 will not be transmitted and it will not be possible to perform welding.

Therefore, in the present embodiment the laser beam 9 is converged and irradiated onto the heat generation portion 4 which is of a size that is limited to correspond to the size of the welding area of the plurality of plastic components, and is made of a material that absorbs a laser beam and generates heat, and generates heat of a temperature that is equal to or greater than the melting temperature of plastic. Further, a configuration is adopted so that the laser beam energy is converted to heat and the generated heat does not diffuse from the heat generation portion 4 to a part at which the laser beam 9 is not irradiated, and thus the heat generation portion 4 is caused to generate heat of a temperature that is equal to or greater than the melting temperature of plastic and to transmit the heat in the thickness direction of the first and second plastic components 1 and 2 to directly weld together the plurality of plastic components 1 and 2 that transmit the laser beam 9.

A further feature of the present embodiment is that the respective faces other than the upper face of the heat generation portion 4 are surrounded by the heat blocking portion 5. This is because it is difficult for heat generated at the heat generation portion 4 to diffuse when the periphery of the heat generation portion 4 is surrounded by the heat blocking portion 5.

Figure 3:
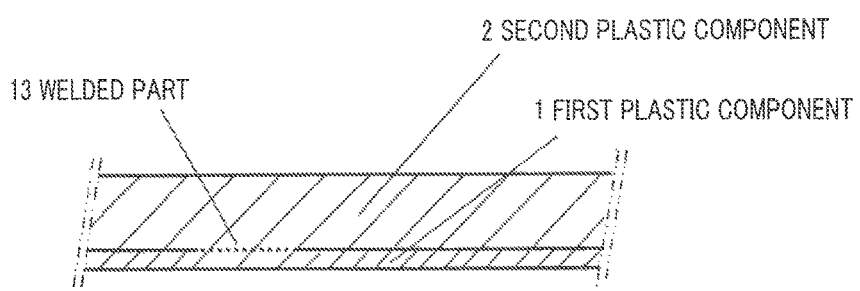
FIG. 3 is a cross-sectional view of plastic components that are welded by the laser welding method according to the first embodiment of the present invention.

FIG. 3 illustrates a cross-sectional view after laser welding of the first and second plastic components 1 and 2 according to the first embodiment of the present invention. In FIG. 3, of the entire abutting faces of the first and second plastic components 1 and 2, a welded part 13 which was welded as a result of irradiation of the laser beam 9 by the laser beam irradiation portion 7 is indicated by a dotted line, and an area that is not welded is indicated by a solid line to distinguish the non-welded area from the welded part 13.

In FIG. 3, the first plastic component 1 that abuts against the heat generation portion 4 is formed in the shape of a thin plate, and the second plastic component 2 is formed in the shape of a thick plate. When the thickness of the first plastic component 1 is thin, there is the advantage that it is easy for heat of the heat generation portion 4 of the support member 3 to be transmitted to the abutting faces of the first and second plastic components 1 and 2, and laser welding can be performed by irradiating a small amount of the laser beam 9.

Note that, the laser beam irradiation portion 7 may be movable. For example, the laser beam irradiation portion 7 may be moved in directions that are orthogonal to the irradiation direction of the laser beam 9, such as being moved in the transverse direction as indicated by an outline arrow B that is shown in FIG. 1, and being moved in the depth direction in FIG. 1. Further, the optical axis of the laser beam 9 may be deflected to change the irradiation angle of the laser beam 9. When the emitting position of the laser beam 9 is moved or the irradiation angle of the laser beam 9 is changed, the size of the face to be irradiated that the laser beam 9 is irradiated onto increases, and hence the welding area can be expanded and the welding strength can be increased.

Figure 4A:
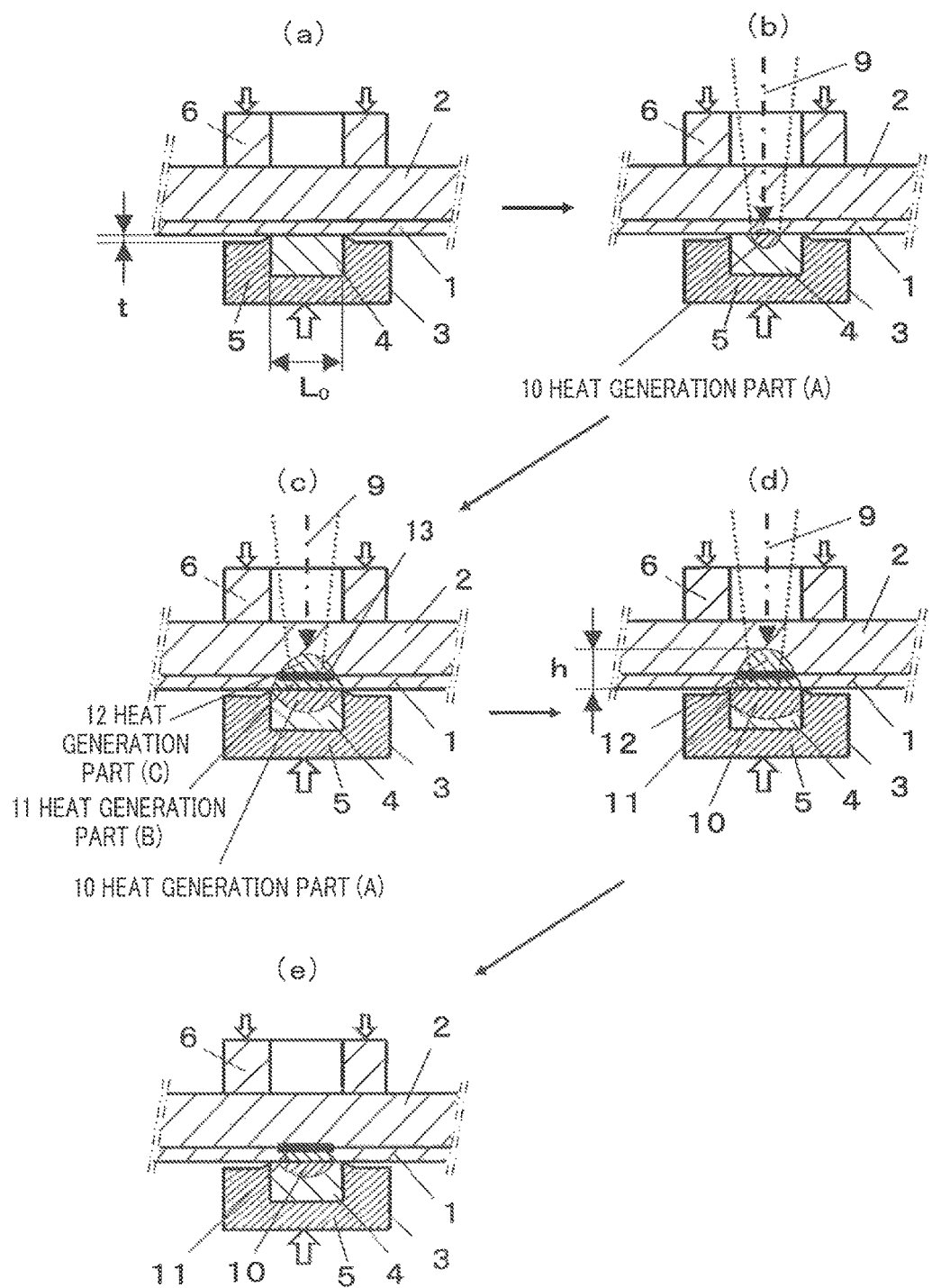
FIG. 4A is a view that illustrates, in chronological order, welding operations of a laser welding method according to the first embodiment of the present invention.

Welding operations at the time of laser welding according to the laser welding method of the first embodiment of the present invention will now be described in detail in chronological order. In FIG. 4A, (a) to (e) are views that chronologically illustrate welding operations of the laser welding method according to the first embodiment of the present invention, specifically, transitions in the heating status of each portion.

In FIG. 4A(a), the first plastic component 1 is placed on the upper face of the heat generation portion 4 of the support member 3, the second plastic component 2 is placed thereon, and the pressure member 6 is then placed thereon. Subsequently, the first and second plastic components 1 and 2 are pressed to the heat generation portion 4 side by an unshown pressing source to cause the respective abutting faces of the first and second plastic components 1 and 2 to closely contact each other, and simultaneously cause the surface of the first plastic component 1 to closely contact the heat generation portion 4. Note that, at this time point, a laser beam is not irradiated.

FIG. 4A(b) illustrates the state of heat generation when irradiation of the laser beam 9 is started. When the laser beam 9 impinges upon the heat generation portion 4, heat is generated from the part that the laser beam 9 has impinged on and the heat generation part (A) 10 arises in a small region from the surface to the inside of the heat generation portion 4.

FIG. 4A(c) illustrates a state of heat generation when irradiation of the laser beam 9 is continued for a fixed time period. By continuing to cause the laser beam 9 to impinge upon the heat generation portion 4 for a fixed time period, the size of the heat generation part (A) 10 of the surface of the heat generation portion 4 expands, the surface of the heat generation portion 4 becomes a high temperature, and the thickness of the heat generation part (A) 10 also expands. The heat of the heat generation part (A) 10 is then transmitted as the heat generation part (B) 11 to the first plastic component 1, and is further transmitted as the heat generation part (C) 12 to the second plastic component 2.

FIG. 4A(d) illustrates a state of heat generation when irradiation of the laser beam 9 is continued for a further fixed time period. By continuing to cause the laser beam 9 to impinge upon the heat generation portion 4 for a further fixed time period, although the heat generation part (A) 10 of the surface of the heat generation portion 4 expands, expansion in the horizontal direction is blocked by the heat blocking portion 5, and the heat generation part (A) 10 expands in only the thickness direction. Heat of the heat generation part (A) 10 that expanded as far as the heat blocking portion 5 is transmitted as the heat generation part (B) 11 to the first plastic component 1, and is further transmitted as the heat generation part (C) 12 to the second plastic component 2. For example, in FIG. 4A(d), heat is transmitted as far as a thickness h up to a middle position in the thickness direction of the second plastic component 2 from the first plastic component 1. The heat generation part (A) 10, the heat generation part (B) 11 and the heat generation part (C) 12 then reach a high temperature that exceeds the melting temperature of the first and second plastic components 1 and 2. Subsequently, the abutting portions of the first and second plastic components 1 and 2 are melted by the heat generated at the heat generation portion 4.

FIG. 4A(e) illustrates the situation after irradiation of the laser beam 9 of the laser beam irradiation portion 7 is stopped. When irradiation of the laser beam 9 stops, heat generation of the heat generation part (A) 10 of the heat generation portion 4 stops and the heat generation part (B) 11 and heat generation part (C) 12 of the abutting portions of the first and second plastic components 1 and 2 cool and harden. In the state illustrated in FIG. 4A(e), although the heat generation part (A) 10 and the heat generation part (B) 11 remain, the heat generation part (C) 12 has already disappeared. Upon the disappearance of the heat generation part (A) 10 and the heat generation part (B) 11 also, welding is completed.

Figure 4B:
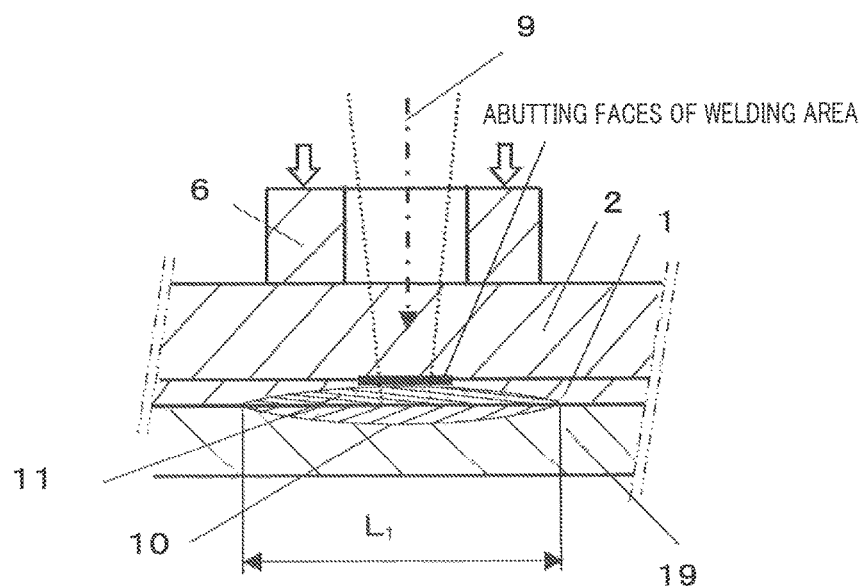
FIG. 4B is a view that, for the purpose of comparison with the present invention, illustrates a situation that arises when a laser beam is irradiated onto a heat generation portion of a continuous size whose size is not limited.

FIG. 4B is a view that, for the purpose of comparison with the present embodiment, shows a state in a case where the present embodiment is not used. FIG. 4B illustrates a state of heat generation of the first and second plastic components 1 and 2 when a portion capable of heat generation 19 having a continuous size is used as a support member. Note that constituent elements which are the same as in the present embodiment are denoted by the same reference numerals.

In the cross-sectional view in FIG. 4B, the heat generation portion 4 which is of a size that is limited to correspond to the size of the welding area (length ($L_0$) in FIG. 4A(a)) of the plurality of plastic components as in the present embodiment is not provided as a support member. When the first and second plastic components 1 and 2 are supported by the portion capable of heat generation 19 that has a continuous size, even when the first and second plastic components 1 and 2 are pressed with the pressure member 6, because the portion capable of heat generation 19 receives the pressing force over a wide area, the force disperses and the close contact force is reduced. Therefore, in FIG. 4B, heat generated at the portion capable of heat generation 19 by the irradiated laser beam 9 diffuses over a wide area ($L_1$) of the first and second plastic components 1 and 2, and is not transmitted in the thickness direction of the first and second plastic components 1 and 2. Even when irradiation of the laser beam 9 continues for a fixed time period, the area ($L_1$) over which the heat of the portion capable of heat generation 19 diffuses merely expands, and in many cases heat up to a temperature that melts the abutting faces of the first and second plastic components 1 and 2 is not transmitted and welding cannot take place.

In contrast, according to the present embodiment, by limiting the size of the heat generation portion 4 of the support member 3 to correspond to the size of the welding area of the plurality of plastic components, laser beam energy of the laser beam 9 that has converged on the heat generation portion 4 becomes a lump of heat and is concentrated, and heat of a temperature that is equal to or greater than the melting temperature of plastic is generated and is transmitted in the thickness direction toward the abutting faces in the welding area of the closely contacting first and second plastic components 1 and 2. Thus, the first and second plastic components 1 and 2 can be efficiently and more reliably welded in a short time period.

Although a configuration in which the support member 3 is constituted by the heat generation portion 4 that is made of a metal such as stainless steel and generates heat upon a laser beam being irradiated thereon, and the heat blocking portion 5 which has a configuration in which a heat insulating material such as gypsum is caused to closely contact each face other than the upper face of the heat generation portion 4 is illustrated in FIG. 1, in a case where a margin exists with respect to the capacity of the laser beam irradiation portion 7 to irradiate the laser beam 9, the thickness of the heat blocking portion 5 may be thinner than the thickness illustrated in FIG. 1. This is because welding can be performed if laser beam energy that is in excess of an amount of heat released to outside from the surface of the heat blocking portion 5 is irradiated onto the heat generation portion 4.

Figure 5A:
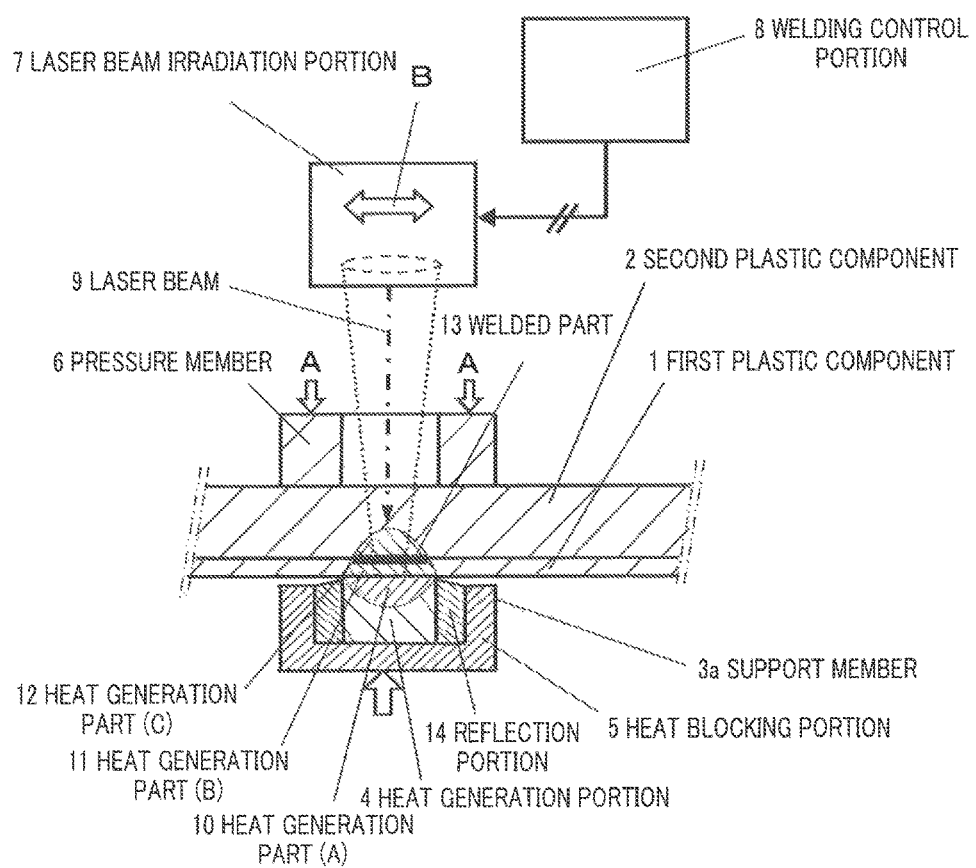
FIG. 5A is a view that illustrates principles of a first modification of the laser welding method according to the first embodiment of the present invention.

FIG. 5A is a view illustrating a first modification of the principles of the first embodiment of the present invention. In FIG. 5A, the periphery excluding the two end faces at the top and bottom of the heat generation portion 4 of the support member 3a is surrounded by a reflection portion 14 that reflects a laser beam, and the reflection portion 14 is further surrounded by the heat blocking portion 5. Copper or aluminum which is respectively known as a high-reflectance material with respect to laser beams is used for the reflection portion 14.

FIG. 5B is a view which illustrates, in an enlarged form, the vicinity of the heating portion of the first modification of the laser welding method according to the first embodiment of the present invention. The reflection portion 14 fulfills two functions. The first function is to reflect the laser beam 9 with the surface of the reflection portion 14 when the laser beam 9 is irradiated onto the periphery of the heat generation portion 4, that is, onto an area that extends off from the upper face of the heat generation portion 4. Although the laser beam 9 from the laser beam irradiation portion 7 is basically irradiated onto the upper face of the heat generation portion 4, as shown in FIG. 5B, even if the laser beam 9 is irradiated onto an area that extends off from the upper face of the heat generation portion 4, the reflection portion 14 that is around the heat generation portion 4 reflects the laser beam 9. Thus, only the upper face of the heat generation portion 4 absorbs the laser beam 9.

The second function is to make the temperature of the heat generation portion 4 even. Although the heat generation portion 4 generates heat upon receiving the laser beam 9, heat generation of the heat generation portion 4 becomes uneven if, for example, the center of irradiation of the laser beam 9 deviates from the center of the upper face of the heat generation portion 4. However, since the reflection portion 14 is made of a material having high heat conductivity, such as copper or aluminum, the heat of the heat generation portion 4 is conducted to the surrounding reflection portion 14, and the temperature of the reflection portion 14 quickly becomes even. Further, because the reflection portion 14 is surrounded by the heat blocking portion 5, even when heat that is generated in the heat generation portion 4 is transmitted to the reflection portion 14, the heat is not released to outside from the heat blocking portion 5. Consequently, the heat of a high temperature part of the heat generation portion 4 flows to a low temperature part through the reflection portion 14, and the temperature of the heat generation portion 4 becomes even.

Note that, a configuration may also be adopted in which, instead of the reflection portion 14 that uses copper or aluminum, the heat generation portion 4 is surrounded by a member to which heat of the heat generation portion 4 is conducted that is made of another material which does not reflect a laser beam but which has high heat conductivity, and thus mainly fulfills the above described second function, and is referred to as a "heat conduction portion.

When the heat generation portion 4 of the support member 3*a* is surrounded by the reflection portion 14 and the heat blocking portion 5 as shown in FIG. 5A and FIG. 5B, if some margin exists with respect to the capacity of the laser beam irradiation portion 7 to irradiate the laser beam 9, the thickness of the heat blocking portion 5 may be made even thinner. This is because welding can be performed if laser beam energy that is in excess of an amount of heat that is released to outside from the surface of the heat blocking portion 5 is irradiated onto the heat generation portion 4. Depending on the case, a configuration may be adopted in which the heat generation portion 4 is surrounded by only the reflection portion 14. Depending on the intended use, a configuration may also be adopted which only includes the heat generation portion 4 and does not include the reflection portion 14 and the heat blocking portion 5.

Note that, the laser beam irradiation portion 7 may be movable. For example, the laser beam irradiation portion 7 may be moved in directions that are orthogonal to the irradiation direction of the laser beam 9, such as being moved in the transverse direction as indicated by an outline arrow B that is shown in FIG. 5A, and being moved in the depth direction in FIG. 5A. Further, the optical axis of the laser beam 9 may be deflected to change the irradiation angle of the laser beam 9. When the emitting position of the laser beam 9 is moved or the irradiation angle of the laser beam 9 is changed, the size of the face to be irradiated that the laser beam 9 is irradiated onto increases, and consequently the welding area can be expanded and the welding strength can be increased. This situation is similar to the first embodiment.

Note that, when the foregoing description of the first embodiment of the present invention is described as a "laser welding method that performs laser welding of a plurality of plastic components that transmit a laser beam", the first embodiment is described as a laser welding method constructed so as to sequentially perform the following steps:

(Step 1) Mounting first and second plastic components on a support member that includes a heat generation portion which has a size that is limited to correspond to a size of a welding area of the plurality of plastic components and which is made from a material that absorbs a laser beam and generates heat, and which generates heat of a temperature equal to or greater than a melting temperature of the plastic components;

(Step 2) Causing the first and second plastic components to come in contact at abutting faces;

(Step 3) Causing a certain portion of the abutting faces of the welding area of the first and second plastic components to be superposed facing the heat generation portion of the support member;

(Step 4) Using the pressure member to sandwich and press the first and second plastic components between the pressure member and the heat generation portion to thereby cause the abutting faces of the welding area of the first and second plastic components to closely contact, and simultaneously cause the heat generation portion of the support member and a surface of the first plastic component that contacts the heat generation portion to closely contact;

(Step 5) Using laser beam irradiation unit to converge a laser beam and irradiate the laser beam toward the heat generation portion of the support member through the first and second plastic components;

(Step 6) Causing the laser beam to be transmitted through the first and second plastic components and absorbed by the heat generation portion;

(Step 7) Causing the heat generation portion to generate heat; and (Step 8) Welding the abutting faces of the welding area of the first and second plastic components with heat generated by the heat generation portion.

FIG. 6 is a view illustrating a second modification of the principles of the first embodiment of the present invention. FIG. 6 illustrates a case of using a laser beam to weld three plastic components 1, 2*a* and 2*b* as a first plastic component 1, a second plastic component 2*a* and a third plastic component 2*b*. Each of the plastic components 1, 2*a* and 2*b* is made from a material that transmits a laser beam, and they each have the same thickness. In the present modification, relative to the above described first modification, the first and second plastic components 1 and 2 are replaced with the first to third plastic components 1, 2*a* and 2*b* that are superposed in the thickness direction, and the remaining configuration is the same as in the above described first modification and the same constituent elements are denoted by the same reference numerals.

In the second modification configured in this way, when the laser beam is irradiated onto the heat generation portion 4 through the three plastic components 1, 2*a* and 2*b*, heat is generated at the heat generation portion 4. The heat generated at the heat generation portion 4 is transmitted from the first plastic component 1 to the abutting faces of the welding area at which the first plastic component 1 and the second plastic component 2*a* closely contact. Next, the heat is transmitted to the abutting faces of the welding area at which the second plastic component 2*a* and the third plastic component 2*b* closely contact. As irradiation of the laser beam 9 continues, the respective abutting faces of the welding area of the three plastic components 1, 2*a* and 2*b* melt. When irradiation of the laser beam 9 is stopped and the abutting faces cool, the melted abutting faces combine together and harden. As a result, the first plastic component 1 and the second plastic component 2*a* are welded at their abutting faces, and the second plastic component 2*a* and the third plastic component 2*b* are also welded at their abutting faces.

When the energy of the laser beam that is irradiated from the laser beam irradiation portion 7 is sufficiently greater than the thermal energy necessary for welding the three plastic components 1, 2*a* and 2*b*, the three plastic components 1, 2*a* and 2*b* are welded in the welding area. Thus, in the present modification also, laser welding of a plurality of plastic components can be efficiently performed.

Further, when the above description of the second modification is described as a "laser welding method that performs laser welding of a plurality of plastic components that transmit a laser beam", the second modification can be described by substituting the term "plurality of plastic components" for the term "first and second plastic components" in the above described steps.

Note that, the laser beam irradiation portion 7 may be movable. For example, the laser beam irradiation portion 7 may be moved in directions that are orthogonal to the irradiation direction of the laser beam 9, such as being moved in the transverse direction as indicated by an outline arrow B that is shown in FIG. 6, and being moved in the depth direction in FIG. 6. Further, the optical axis of the laser beam 9 may be deflected to change the irradiation angle of the laser beam 9. When the emitting position of the laser beam 9 is moved or the irradiation angle of the laser beam 9 is changed, the size of the face to be irradiated that the laser beam 9 is irradiated onto increases, and consequently the welding area can be expanded and the welding strength can be increased. This situation is similar to the first embodiment.

Figure 7:
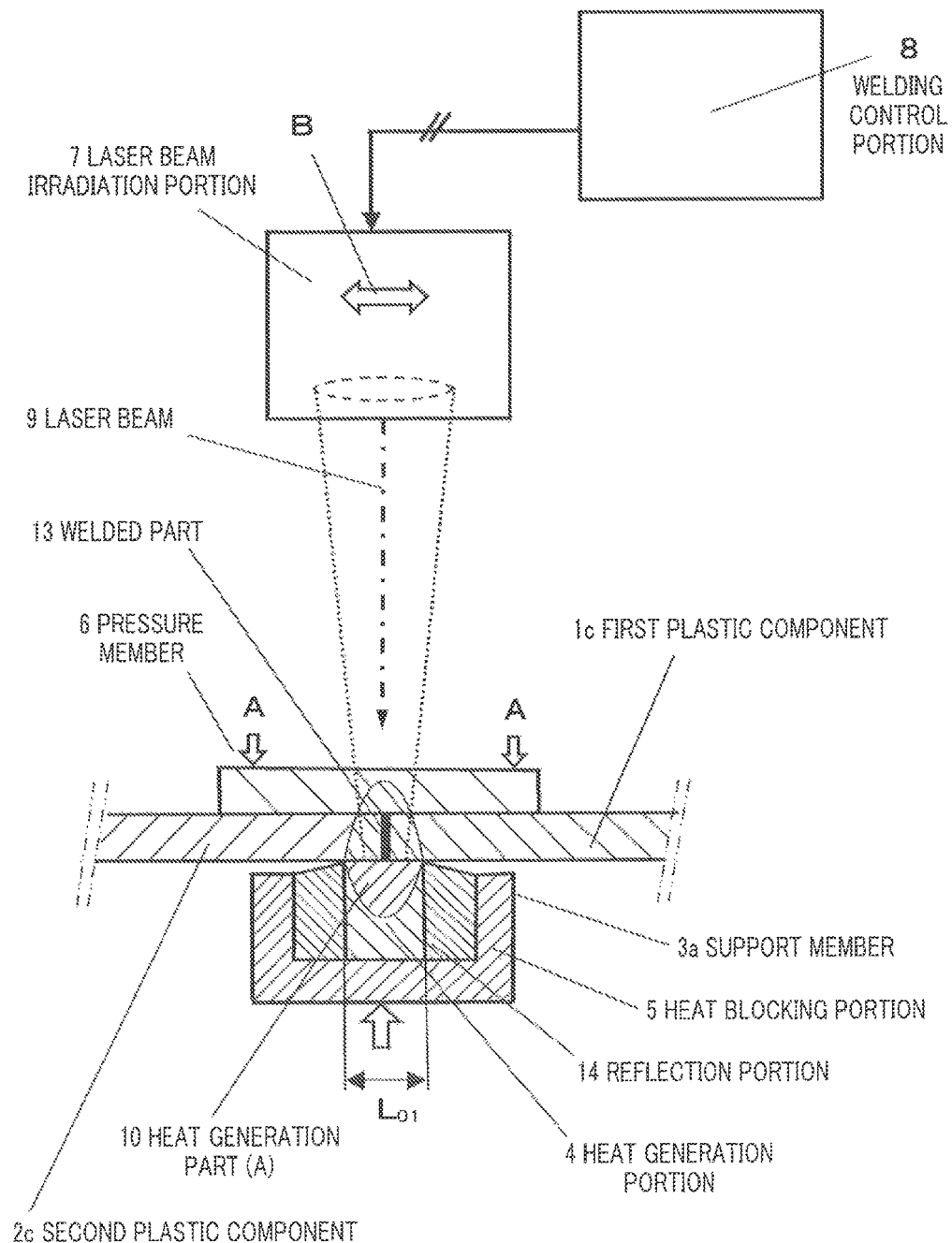
FIG. 7 is a longitudinal cross-sectional view of members to be welded together that illustrates principles of a third modification of the laser welding method according to the first embodiment of the present invention.
Figure 8A:
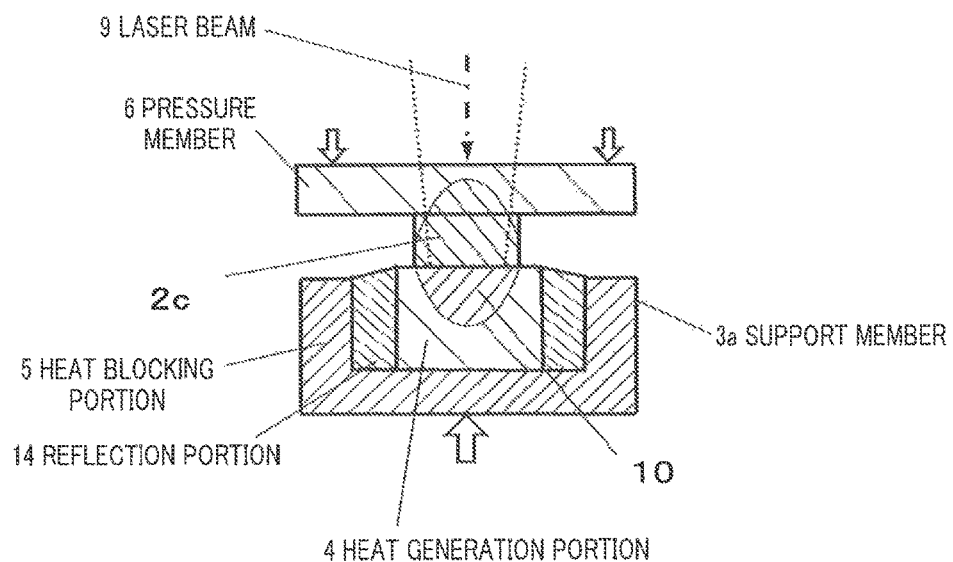
FIG. 8A is a lateral cross-sectional view in a case where the members to be welded together illustrated in FIG. 7 are in the shape of a square bar.
Figure 8B:
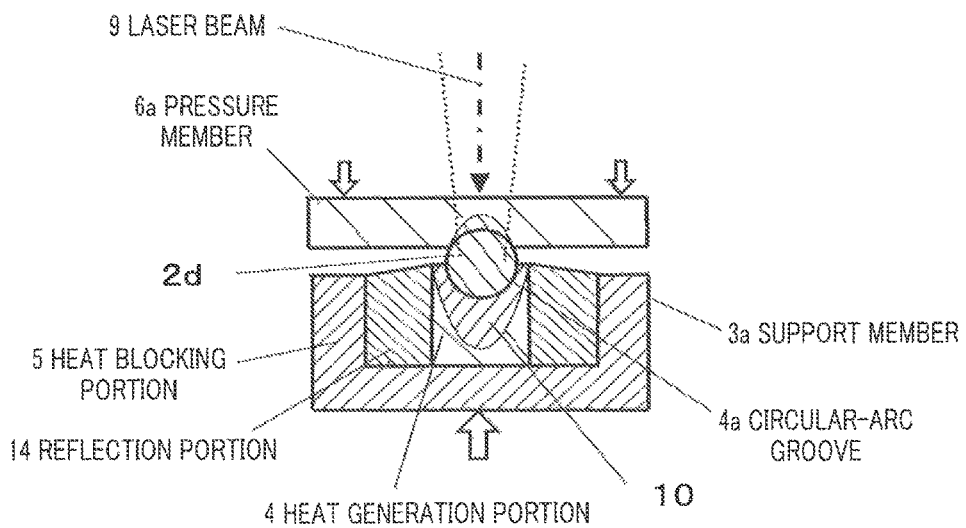
FIG. 8B is a lateral cross-sectional view in a case where the members to be welded together illustrated in FIG. 7 are in the shape of a round bar.

FIG. 7, FIG. 8A and FIG. 8B are views that illustrate a third modification of the principles of the first embodiment of the present invention. The third modification relates to butt welding of two plastic components. Although the components to be welded together are different, the constituent elements are substantially the same as in the above described first modification, and the same constituent elements are denoted by the same reference numerals and a description thereof is omitted.

FIG. 7 illustrates a case where two bar-shaped plastic components 1c and 2c are placed on the heat generation portion 4 of the support member 3a, respective end faces thereof are caused to butt against each other, and the end faces that are caused to closely contact are welded together using a laser beam. FIG. 8A is a cross-sectional view of the vicinity of the heat generation portion along a direction (lateral direction) perpendicular to the longitudinal direction of the plastic components 1c and 2c, in a case of welding the plastic components 1c and 2c that have a square bar shape using a laser beam. FIG. 8B is a lateral cross-sectional view of the vicinity of the heat generation portion 4 in a case of welding plastic components 1d and 2d (only the plastic component 2d is shown) that have a round bar shape using a laser beam. In FIG. 8B, a first circular-arc groove 4a as a concave portion is formed in the surface of the heat generation portion 4 so that the outer circumferential faces of the plastic components 1d and 2d having a round bar shape and the surface of the heat generation portion 4 can closely contact at abutting faces that have a certain area. Further, in the surface of the pressure member 6, a second circular-arc groove is formed at a position facing the first circular-arc groove 4a as the aforementioned concave portion, and the second circular-arc groove controls the positions of the round bar-shaped plastic components 1d and 2d by sandwiching the plastic components 1d and 2d together with the heat generation portion 4.

The two plastic components 1c and 2c shown in FIG. 7 and FIG. 8A are wedged between the heat generation portion 4 of the support member 3a and the pressure member 6 in a state in which the respective end faces of the two plastic components 1c and 2c are caused to butt against each other and closely contact. In this state, when the laser beam 9 is irradiated toward the abutting faces of the two plastic components 1c and 2c, the laser beam 9 is transmitted through the pressure member 6 and the two plastic components 1c and 2c and is irradiated onto the heat generation portion 4, and thus heat is generated at the heat generation portion 4. The heat generated at the heat generation portion 4 is transmitted to the abutting faces of the welding area at which the end faces of the first plastic component 1c and the second plastic component 2c are in closely contact with each other. As irradiation of the laser beam 9 continues, the abutting faces at which the end faces of the two plastic components 1c and 2c are contacting melt. When irradiation of the laser beam 9 is stopped and the abutting faces cool, the melted parts coalesce and harden, and thus the end face of the first plastic component 1c and the end face of the second plastic component 2c are welded together. Thus, according to the present invention, it is possible to perform laser welding of a plurality of plastic components whose end faces are butted against each other.

Note that, the laser beam irradiation portion 7 may be moved in directions that are orthogonal to the irradiation direction of the laser beam 9, such as being moved in the transverse direction as indicated by an outline arrow B that is shown in FIG. 7, and being moved in the depth direction in FIG. 7. Further, the optical axis of the laser beam 9 may be deflected to change the irradiation angle of the laser beam 9. When the emitting position of the laser beam 9 is moved or the irradiation angle of the laser beam 9 is changed, the size of the face to be irradiated that the laser beam 9 is irradiated onto increases, and consequently the welding area can be expanded and the welding strength can be increased. This situation is the same as in the first embodiment.

Note that, FIG. 8B illustrates a configuration in which, for butt-welding a plurality of round bar-shaped plastic components 1d and 2d (only the plastic component 2d is shown in FIG. 8B), a first circular-arc groove as a concave portion is formed in the surface of the heat generation portion 4 so that the outer circumferential faces of the plastic components 1d and 2d and the surface of the heat generation portion 4 closely contact at abutting faces of a certain area that is a size that is limited to correspond to the size of the welding area. By forming a first circular-arc groove 4a having a cross-sectional circular-arc shape within the heat generation portion 4 that is a limited area inside the support member, and causing the circular-arc groove 4a to closely contact the outer circumferential face of the plastic components 1d and 2d, the area at which the heat generation portion 4 and the plastic components 1d and 2d come in contact increases in correspondence with the size of the welding area. As a result, it is easy for heat of the heat generation portion 4 to be transmitted to the welding area of the plastic components 1d and 2d, and the plastic components 1d and 2d are heated sooner and efficiently welded. Thereby, heat is also efficiently transmitted to round bar-shaped abutting faces that are located side-by-side, with respect to which it is difficult for heat to be transmitted when employing a flat surface. As a result, strong welding can be achieved.

Figure 9A:
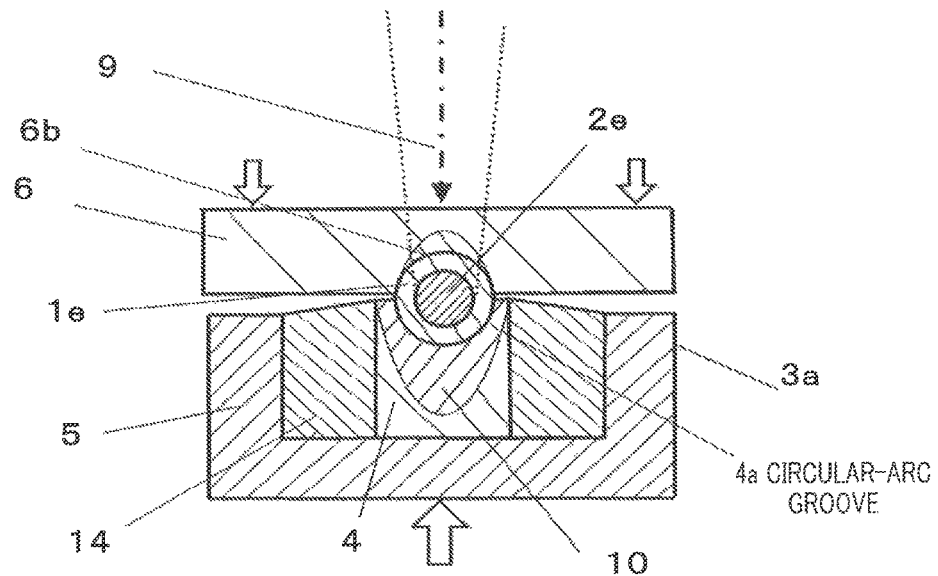
FIG. 9A is a cross-sectional view that illustrates principles of a fourth modification of the laser welding method according to the first embodiment of the present invention.

FIG. 9A is a view illustrating a fourth modification of the principles of the first embodiment of the present invention. FIG. 9A illustrates a laser welding apparatus of a form that, with respect to a tubular plastic component 1e and a round bar-shaped plastic component 2e that each transmit a laser beam, welds the tubular plastic component 1e to the outer circumference of the round bar-shaped plastic component 2e. In the case of this laser welding apparatus, a part to be welded in a state in which the round bar-shaped plastic component 2e is inserted into a hollow hole of the tubular plastic component 1e is mounted in the first circular-arc groove 4a formed as a concave portion in the surface of the heat generation portion 4 that is shown in FIG. 9A, the part to be welded is sandwiched between the heat generation portion 4 and the pressure member 6 having the second circular-arc groove 6b formed in the surface thereof, and the laser beam 9 is irradiated from above the pressure member 6.

Although the outer circumferential face of the tubular plastic component 1 is a curved surface, the outer circumferential face of the tubular plastic component 1 comes into close contact with the first circular-arc groove 4a of the heat generation portion 4 over a wider area with a size that is limited to correspond to the size of the welding area. Further, heat generated at the heat generation portion 4 upon receiving the laser beam 9 is transmitted from the first circular-arc groove 4a of the heat generation portion 4 to the tubular plastic component 1e and the round bar-shaped plastic component 2e. The tubular plastic component 1e and the round bar-shaped plastic component 2e are thus heated, melt, harden and weld together. Note that the tubular plastic component 1e and the round bar-shaped plastic component 2e may be rotatably supported. Thereby, by rotating the tubular plastic component 1e and the round bar-shaped plastic component 2e during irradiation of the laser beam 9, the entire circumference of the plastic components 1e and 2e can be efficiently welded.

Figure 9B:
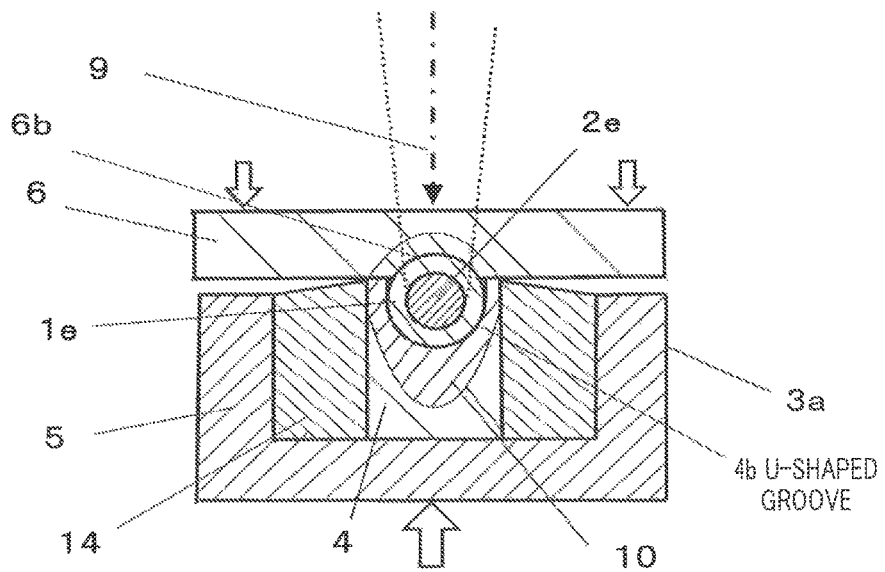
FIG. 9B is a cross-sectional view that illustrates principles of a fifth modification of the laser welding method according to the first embodiment of the present invention.

FIG. 9B is a view that illustrates a fifth modification of the principles of the first embodiment of the present invention. FIG. 9B shows a U-shaped groove 4b which has a cross-sectional "U" shape that has vertical walls those are both provided around the first circular-arc groove 4a of the heat generation portion 4 shown in FIG. 9A. The vertical walls of the U-shaped groove 4b of the heat generation portion 4 are located close to the upper part of the tubular plastic component 1 in which one part of the outer circumferential face is exposed. Although the vertical walls do not closely contact with the upper part of the outer circumferential face of the tubular plastic component 1e, heat from the heat generation portion 4 which generates heat upon receiving the laser beam 9, and heat from the reflection portion 14 that surrounds the outer circumference of the heat generation portion 4 are transmitted thereto. The heat transmitted to the vertical walls are transmitted as radiant heat to the outer circumferential face of the tubular plastic component 1e. As a result, the tubular plastic component 1e and the round bar-shaped plastic component 2e are heated by heat from the heat generation portion 4 and from the vertical walls and melt, and thereafter, by stopping irradiation of the laser beam 9, the tubular plastic component 1e and the round bar-shaped plastic component 2e harden and are welded together.

By providing a circular-arc groove or a U-shaped groove as a concave portion in the upper face of the heat generation portion 4 in this manner, a greater amount of heat can be imparted to to-be-welded plastic components having a cross-sectional circular shape, and the plastic components can be welded sooner and with greater strength.

Figure 10A:
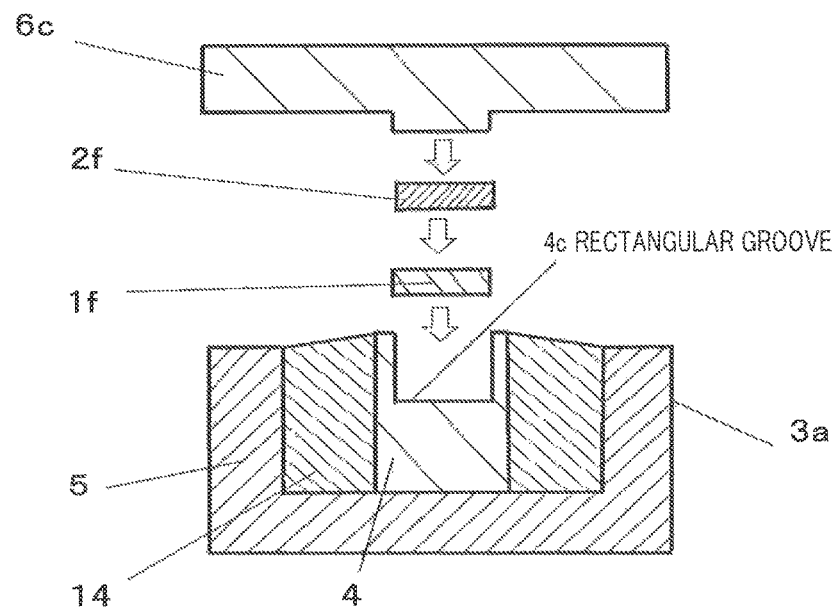
FIG. 10A is an exploded view that illustrates principles of a sixth modification of the laser welding method according to the first embodiment of the present invention.

FIGS. 10A and B are views that illustrate a sixth modification of the principles of the first embodiment of the present invention. FIGS. 10A and B are an exploded cross-sectional view and a configuration diagram, respectively, of a principal portion of a laser welding apparatus in which a rectangular groove 4c is provided as a concave portion in the upper face of the heat generation portion 4, and in which longitudinal plate-shaped first and second plastic components 1f and 2f having a narrow width are superposed and welded together.

In FIG. 10A, the support member 3a, the first plastic component 1f, the second plastic component 2f and a pressure member 6c are shown in a separated state. The support member 3a includes the heat generation portion 4 that is made of stainless steel or the like. The rectangular groove 4c as a concave portion is provided in the upper face of the heat generation portion 4. The outer circumference of the heat generation portion 4 is surrounded by the reflection portion 14 that is made of copper or aluminum or the like. Further, the outer circumference of the reflection portion 14 is surrounded by the heat blocking portion 5 that is made of gypsum or the like. The first plastic component 1f and the second plastic component 2f are superposed and inserted, in that order, into the rectangular groove 4c of the heat generation portion 4 of the support member 3a, and the pressure member 6c is placed thereon and is pressed by a pressing source, such as an air cylinder, that is indicated by outline arrows. Thus, as shown in FIG. 10B, the heat generation portion 4 and the first plastic component if are caused to closely contact each other, and the first plastic component 1f and the second plastic component 2f are also caused to closely contact each other.

Figure 10B:
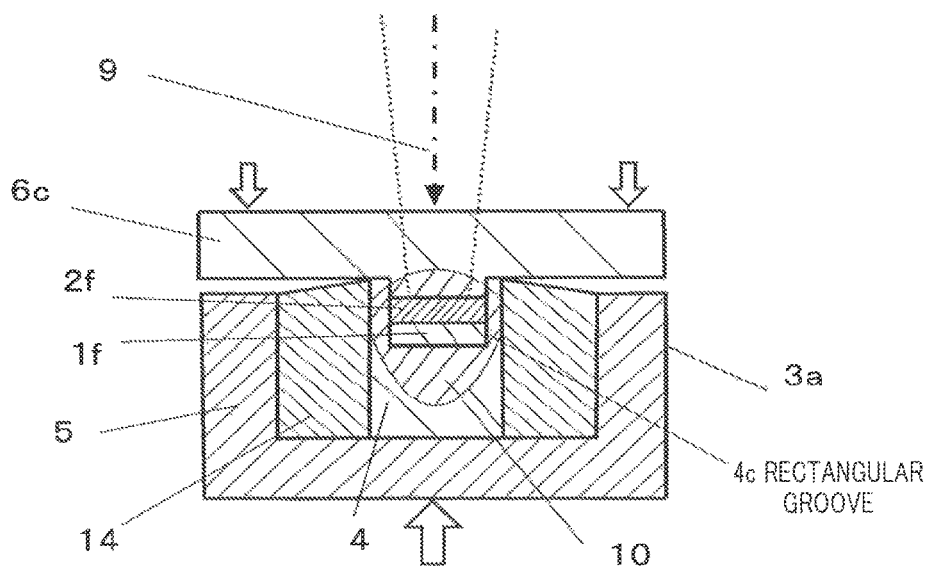
FIG. 10B is a right side-face view that illustrates principles of a sixth modification of the laser welding method according to the first embodiment of the present invention.

Next, as shown in FIG. 10B, the heat generation portion 4 receives the laser beam 9 and generates heat, and energy for melting is transmitted to the first plastic component 1f and the second plastic component 2f from the heat generation part (A) 10 of the heat generation portion 4. Vertical walls around the rectangular groove 4c of the heat generation portion 4 are positioned so that a small clearance is formed between the vertical walls and the side faces of the plate-shaped plastic components 1f and 2f. Although the vertical walls do not closely contact the side faces of the plate-shaped plastic components 1f and 2f, heat generated at the heat generation portion 4 upon receiving the laser beam 9 is transmitted thereto as radiant heat. Therefore, the plate-shaped plastic components 1f and 2f are also heated by heat from the vertical walls of the rectangular groove 4c, and melt, harden and weld together.

Thus, by forming a concave portion so as to match the shape of the plastic components in the heat generation portion 4, a greater amount of heat can be imparted from multiple directions to the plastic components, and the plastic components can be welded faster and with greater strength.

Figure 11:
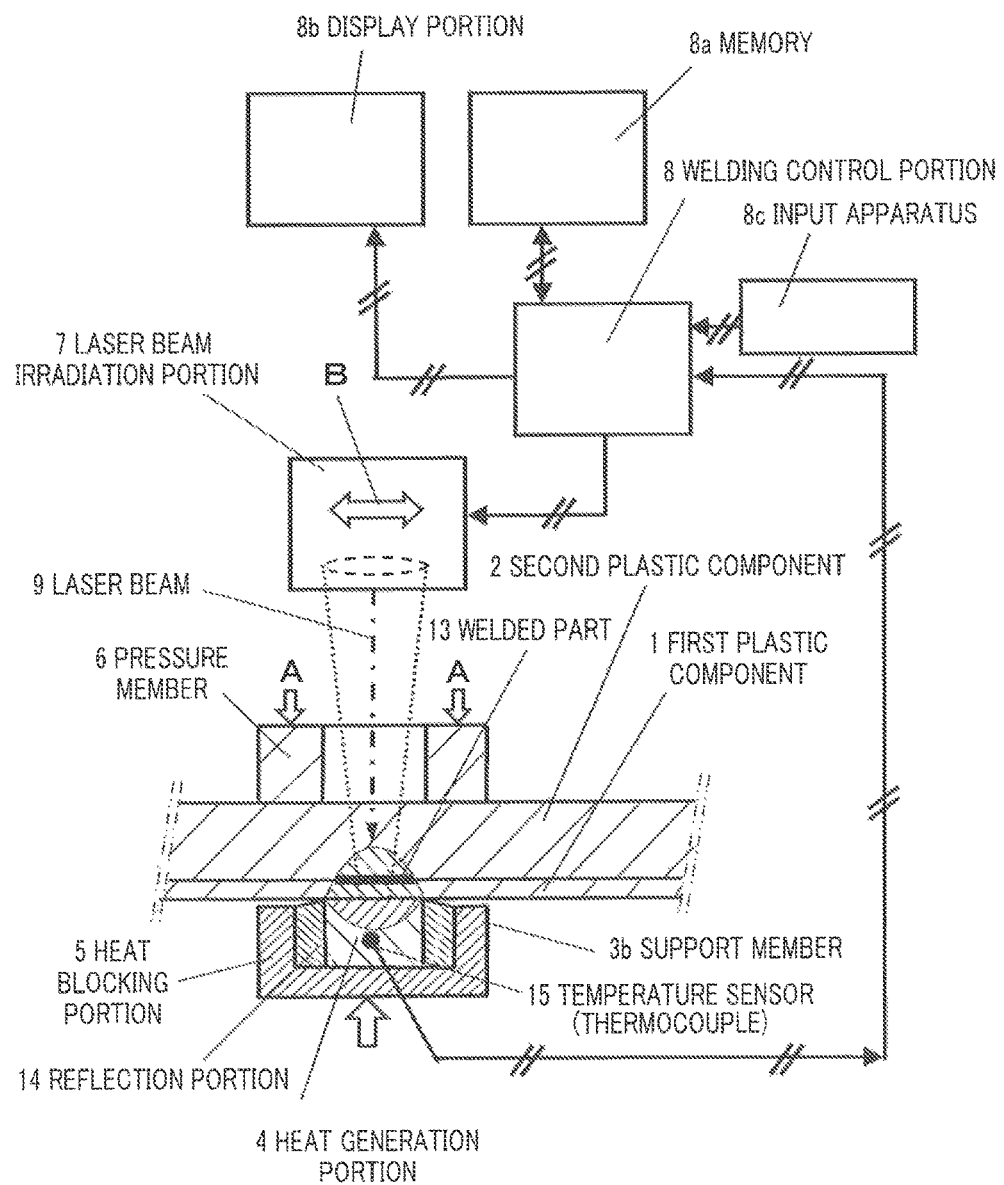
FIG. 11 is a view that illustrates principles of a seventh modification of the laser welding method according to the first embodiment of the present invention.

FIG. 11 is a view that illustrates a seventh modification of the principles of the first embodiment of the present invention. In the seventh modification, a thermocouple as a temperature sensor 15 is embedded in the heat generation portion 4 that is supported by a support member 3b, and temperature information regarding the heat generation portion 4 is fed back to the welding control portion 8 to perform temperature control.

Note that, FIG. 11 clearly illustrates that the welding control portion 8 includes a memory 8a and a display portion 8b. At a time of irradiating the laser beam 9 onto the heat generation portion 4, the welding control portion 8 reads out data of parameters which is previously stored for each welding condition in the memory 8a, and utilizes the data for welding control. In the foregoing description it was mentioned that "the size of the heat generation portion 4 is determined based on experimental values and empirical values obtained when laser welding is actually performed, taking a size that is the same as the welding area of the plurality of plastic components as the basic dimension". The welding conditions and welding results are accumulated in the memory 8a. Further, in FIG. 12 a configuration is illustrated in which "size of heat generation portion" and "size of welding area" can be stored as respective parameters. Further, the welding control portion 8 can perform work based on a single welding condition, measure the welding strength thereof by an appropriate method that is conventionally known, and register the relevant measured value in the memory 8a as an achievement ratio with respect to a desired welding strength. The display portion 8b is an interface for that purpose. The achievement ratio with respect to a welding strength for a combination of parameters of a single welding condition that is shown on the display portion 8b is registered in the memory 8a using an input apparatus 8c.

FIG. 12 illustrates an example of data for welding condition parameters that is previously stored in the memory 8a and achievement ratio data with respect to a welding strength that is registered in the memory 8a. Parameters such as the material and thickness of the first and second plastic components, the heating temperature range and the cooling temperature range are exemplified in vertical columns, and welding condition A, welding condition B and welding condition C are respectively shown in a horizontal row.

Figure 13:
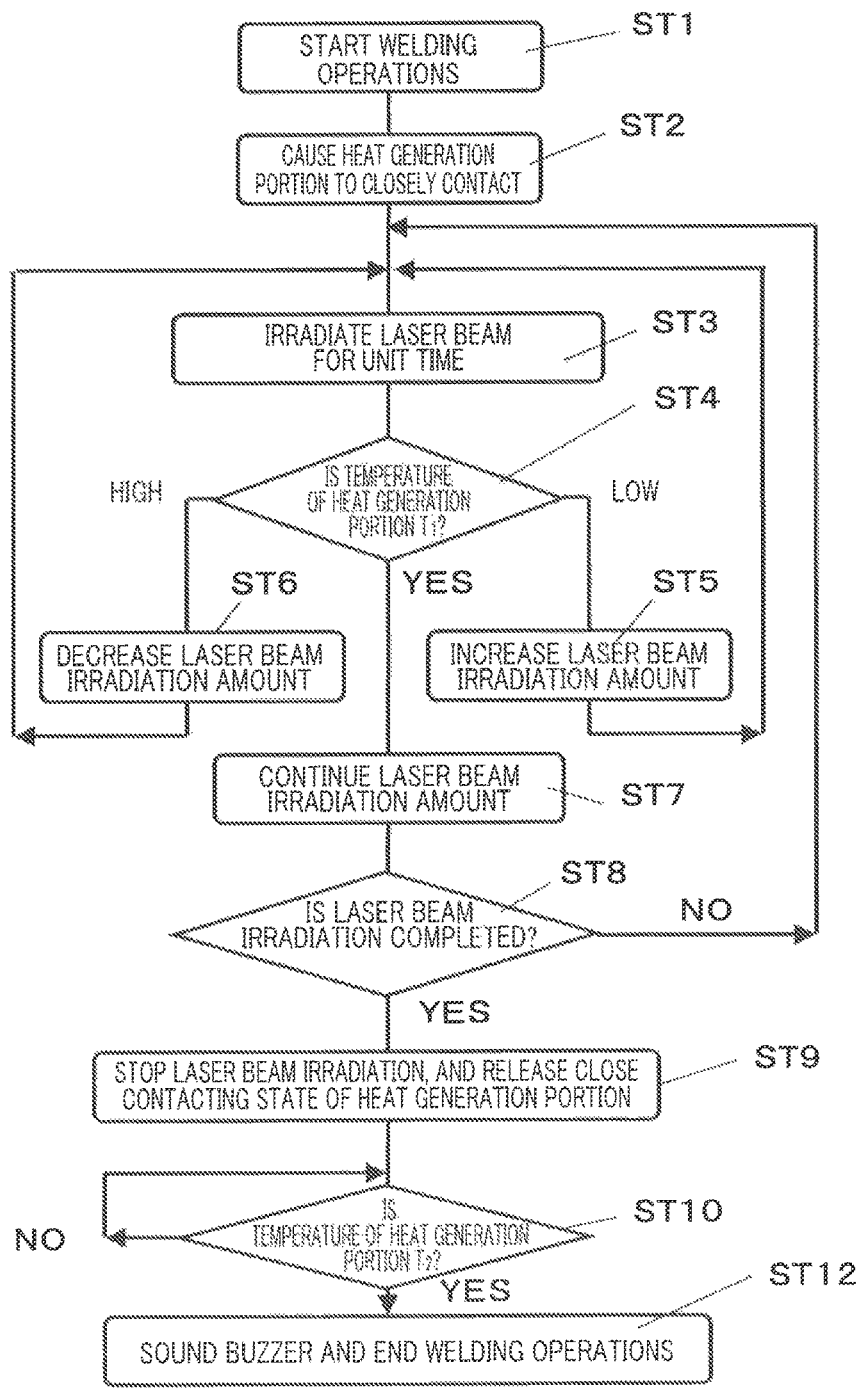
FIG. 13 is a flowchart of welding operations of the seventh modification of the laser welding method according to the first embodiment of the present invention.

FIG. 13 is a flowchart of welding operations of a seventh modification of the laser welding method according to the first embodiment of the present invention. In FIG. 13, first the welding control portion 8 is actuated, welding condition parameters are input using the input apparatus 8c, optimal welding conditions are read out from the memory 8a, and welding operations are started (step ST1). Thereupon, the pressure member 6 causes the heat generation portion 4 to closely contact the first and second plastic components 1 and 2 (step ST2). Next, the laser beam 9 is irradiated for a unit time (step ST3), and based on temperature information from the temperature sensor 15 it is determined whether the temperature of the heat generation portion 4 is within a predetermined first temperature range ($T_1$) (step ST4). If the temperature is lower than the first temperature range ($T_1$), the laser beam irradiation amount (intensity, time period) is increased (step ST5), while if the temperature is higher than the first temperature range ($T_1$), the laser beam irradiation amount is decreased (step ST6) and the operation returns to step ST3. If the temperature is within the first temperature range ($T_1$), laser beam irradiation of the laser beam irradiation amount in that state is continued (step ST7). The operation returns to step S3 until a predetermined time period in which the temperature of the heat generation portion 4 is in the first temperature range ($T_1$) elapses. On the other hand, when the predetermined time period in which the temperature of the heat generation portion 4 is in the first temperature range ($T_1$) elapses, the state at that time is taken as one in which laser beam irradiation is completed (step ST8) and hence irradiation of the laser beam 9 is stopped and the pressing force between the first and second plastic components 1 and 2 and the heat generation portion 4 is relaxed to release the state of close contact therebetween (step ST9). Subsequently, upon the temperature of the heat generation portion 4 cooling as far as a predetermined second temperature range ($T_2$) (step ST10), an unshown welding work completion buzzer is sounded and the welding work is ended (step ST12).

Note that, in step ST12, another method such as causing a lamp to flash or displaying text on a liquid crystal display may be used as a method for notifying the completion of laser welding. Further, although not shown in the operations flowchart, a step of "move the laser beam irradiation portion 7 in a direction indicated by arrow B in the transverse direction shown in FIG. 11" may be added after "continue laser beam irradiation" in step ST7. If the emitting position of the laser beam 9 is moved, the size of the face to be irradiated that the laser beam is irradiated onto expands, and hence the welding area is cumulatively enlarged and the welding strength increases.

Figure 14:
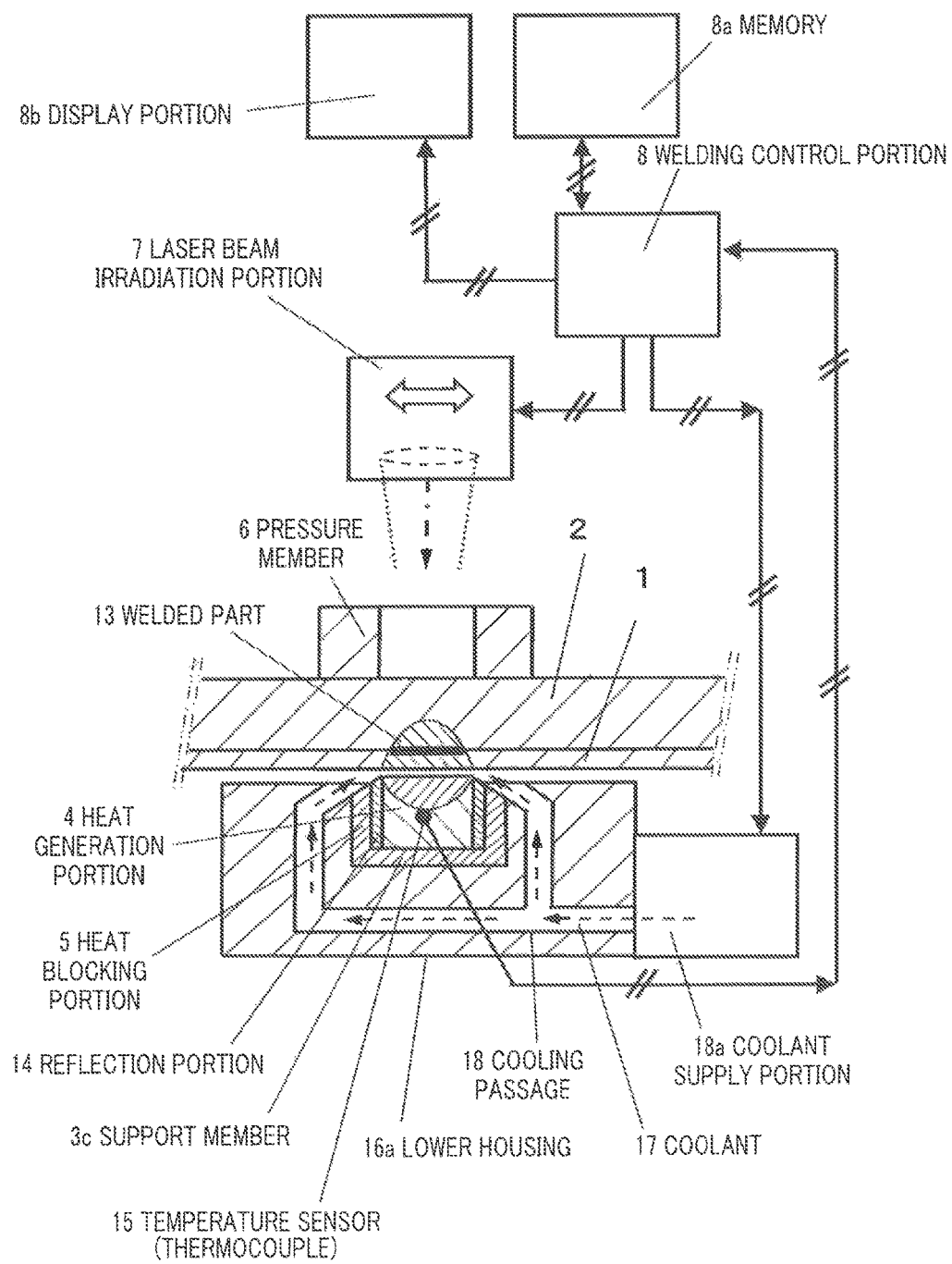
FIG. 14 is a view that illustrates principles of an eighth modification of the laser welding method according to the first embodiment of the present invention.

FIG. 14 illustrates an eighth modification of the principles of the first embodiment of the present invention. Further, FIG. 15 illustrates a flowchart of welding operations of the laser welding apparatus according to the eighth modification.

In the eighth modification, a support member 3c is attached to a lower housing 16a. In the lower housing 16a, a cooling passage 18 that opens toward the upper face of the heat generation portion 4 and feeds a coolant 17 to the upper face of the heat generation portion 4 is provided around the support member 3c. A coolant supply portion 18a such as an air pump is connected to the cooling passage 18 of the lower housing 16a, and is configured to blow the coolant 17 such as cooling air having a temperature equal to or less than ordinary temperature to the upper face of the heat generation portion 4 from the opening of the cooling passage 18.

Figure 15:
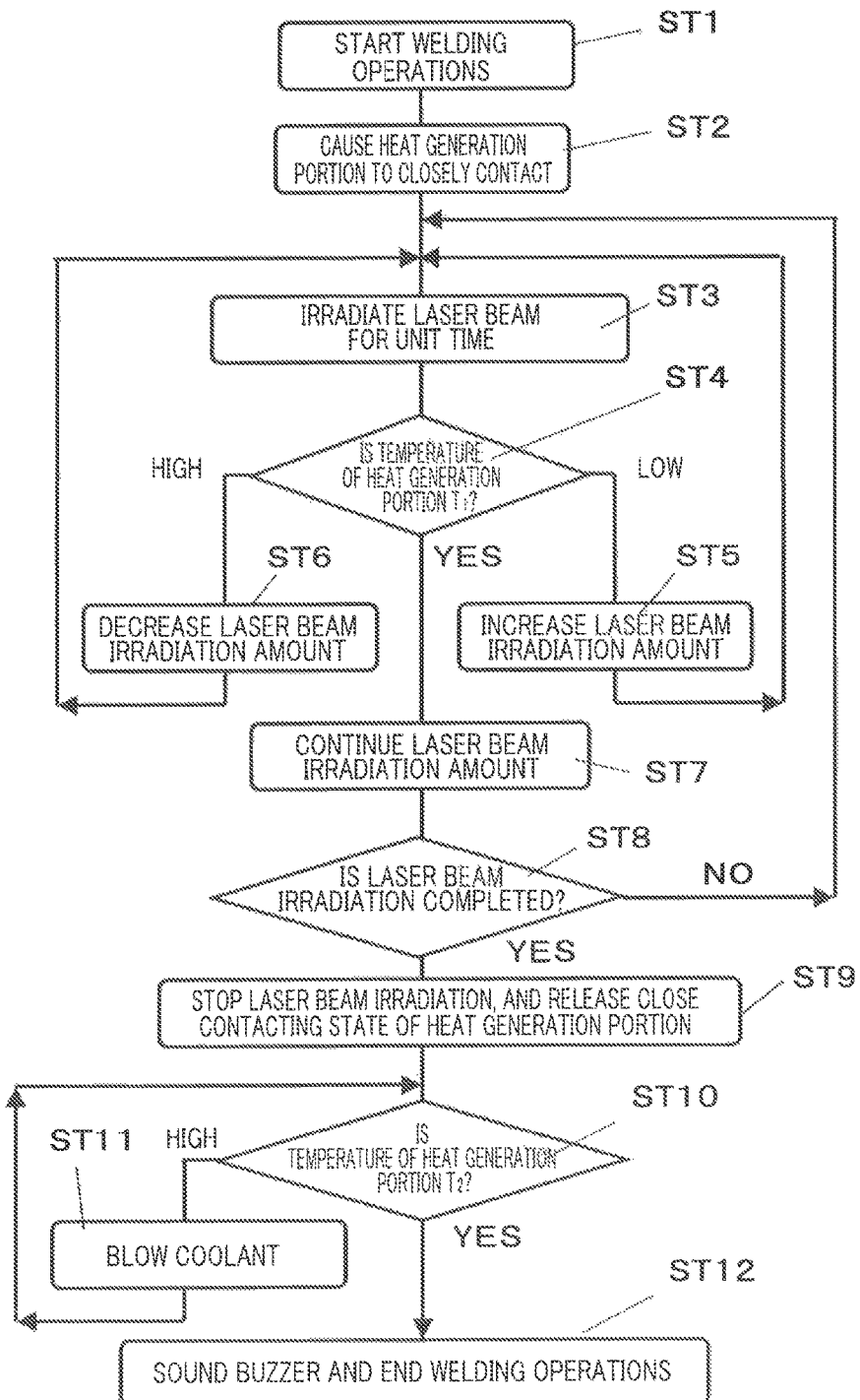
FIG. 15 is a flowchart of welding operations of the eighth modification of the laser welding method according to the first embodiment of the present invention.

The eighth modification is based on this configuration, and as shown in the flowchart of welding operations illustrated in FIG. 15, after laser beam irradiation is completed (step ST8) and after irradiation of the laser beam 9 is stopped and close contact between the heat generation portion 4 and the first and second plastic components 1 and 2 is released (step ST9), when the temperature of the heat generation portion 4 is high and has not cooled as far as a predetermined second temperature range (step ST10), the coolant 17 is forcibly blown to the upper face of the heat generation portion 4 and cools the upper face thereof (step ST11).

When the temperature of the heat generation portion 4 is forcibly cooled as far as the predetermined second temperature range after irradiation of the laser beam 9 is stopped, the work time required for the welding operation is shortened and productivity is improved. Further, by blowing the coolant 17 onto the upper face of the heat generation portion 4, there is also the effect of blowing foreign matter such as plastic powder that arises during the actual laser welding work off from the upper face of the heat generation portion 4.

Figure 16:
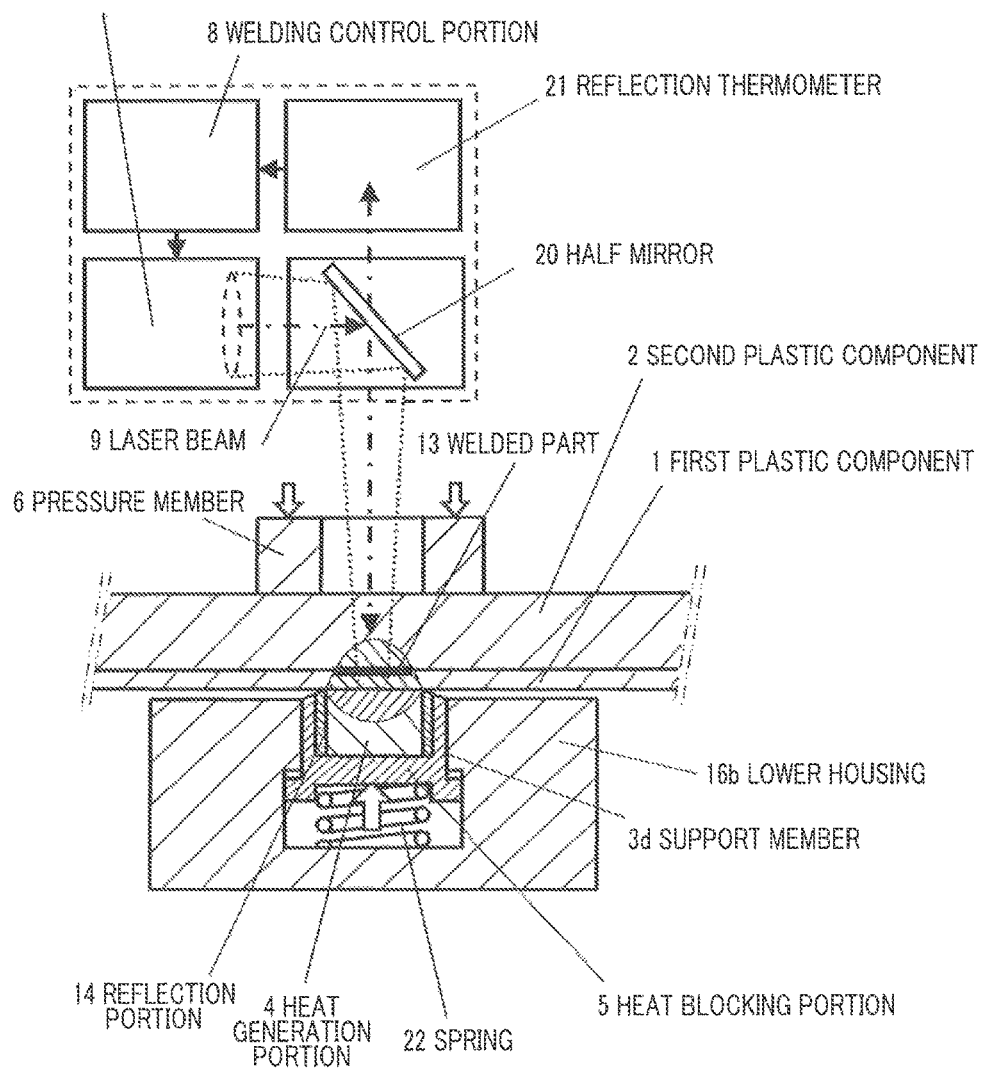
FIG. 16 is a view that illustrates principles of a ninth modification of the laser welding method according to the first embodiment of the present invention.

FIG. 16 illustrates a ninth modification of the first embodiment of the present invention. According to the ninth modification of the first embodiment of the present invention, the laser beam 9 is refracted using a half mirror 20 and irradiated, the temperature of reflected light that is reflected back from the heat generation portion 4 is detected with a reflection thermometer 21, and the temperature information is fed back to the welding control portion 8. In the ninth modification, since it is not necessary to embed a thermocouple in the heat generation portion 4, a configuration is adopted in which a support member 3d is provided so as to be vertically movable with respect to a lower housing 16b, and a spring 22 is inserted in a concave portion provided in the bottom of the support member 3d, and the upper face of the heat generation portion 4 of the support member 3d contacts against the surface of the first plastic component 1 with a constant pressure. The operation flow of the temperature control is the same as in FIG. 13. According to the ninth modification, the first and second plastic components 1 and 2 and the heat generation portion 4 can be caused to closely contact more stably at a constant pressure.

Figure 17:
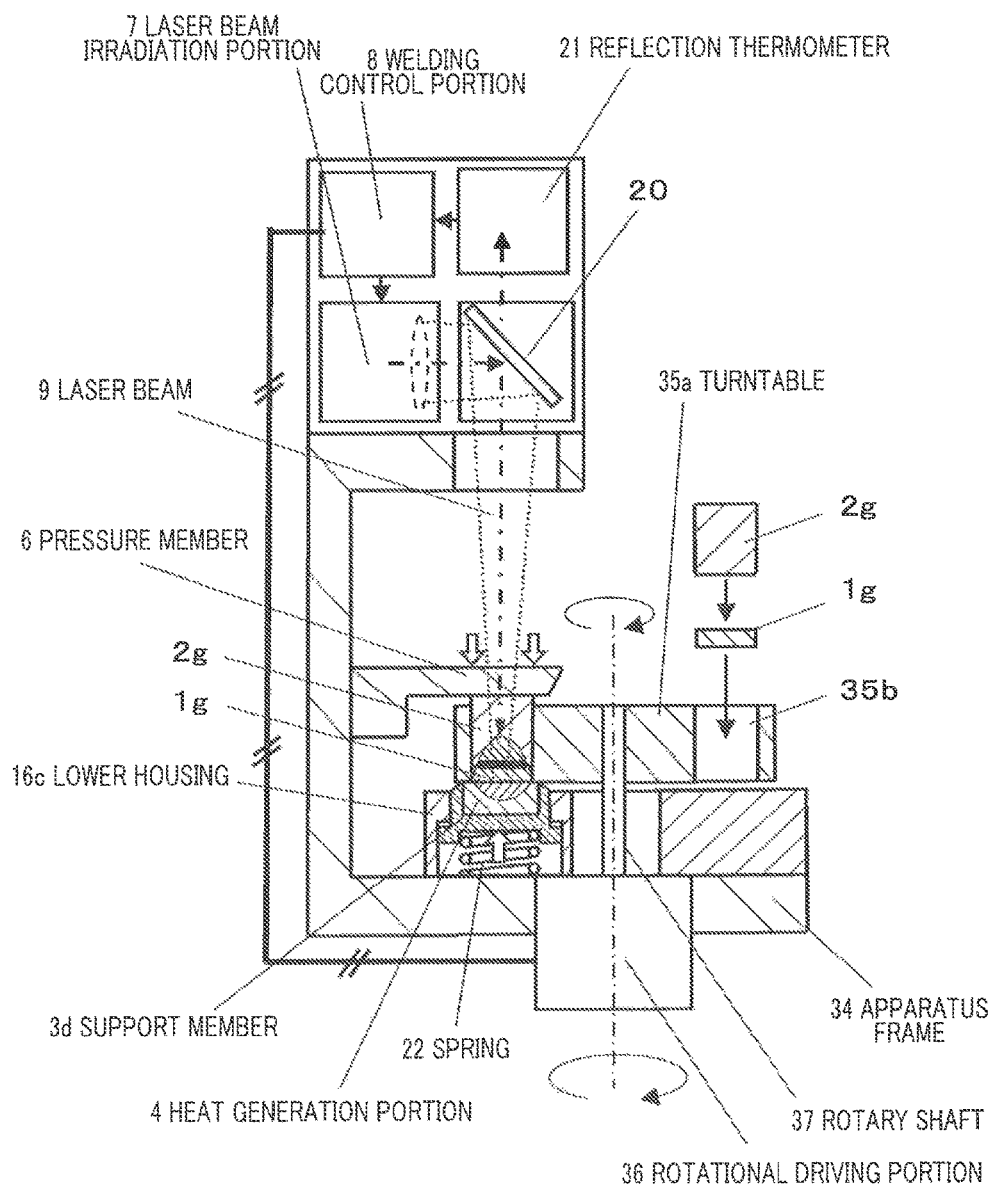
FIG. 17 is a view that illustrates principles of a tenth modification of the laser welding method according to the first embodiment of the present invention.

FIG. 17 illustrates a tenth modification of the first embodiment of the present invention. According to the tenth modification of the first embodiment of the present invention, a disk-shaped first plastic component 1g and a cylindrical second plastic component 2g are welded using a turntable 35a. In FIG. 17, a rotational driving portion 36 is provided on a base of an apparatus frame 34 that has a C-shaped cross-section. The rotational driving portion 36 can be rotated and positioned at intervals of 90 degrees. The rotational driving portion 36 rotates a rotary shaft 37 in increments of 90 degrees. A turntable 35a is attached to the tip of the rotary shaft 37. In the turntable 35a, plastic-component housing holes 35b are formed at intervals of 90 degrees like the holes in a rotary magazine, and the first and second plastic components 1g and 2g can be sequentially inserted therein from above the turntable 35a as shown in FIG. 17.

A lower housing 16c is attached between the turntable 35a and the apparatus frame 34. The heat generation portion 4 that is supported by the support member 3d which is urged upward by the spring 22 and is supported in a vertically movable manner is provided in the lower housing 16c, and a configuration is adopted so that, when the rotation angle of the turntable 35a is positioned at each interval of 90 degrees, the upper face of the heat generation portion 4 contacts against the undersurface of the first plastic component 1g. Above the heat generation portion 4, the pressure member 6 is attached to a columnar support portion of the apparatus frame 34, and presses the first and second plastic components 1g and 2g and the heat generation portion 4 to cause each of the first and second plastic components 1g and 2g and the heat generation portion 4 to closely contact. The laser beam irradiation portion 7 that irradiates the laser beam 9 onto the heat generation portion 4 via the half mirror 20, and the welding control portion 8 and the reflection thermometer 21 are disposed above the pressure member 6.

When the laser beam 9 is irradiated onto the heat generation portion 4 from the laser beam irradiation portion 7 based on control of the welding control portion 8, the heat generation portion 4 generates heat, and the generated heat is transmitted from the heat generation portion 4 to the first plastic component 1g, and transmitted from the first plastic component 1g to the second plastic component 2g. The reflection thermometer 21 detects the temperature of reflected light that is reflected back from the heat generation portion 4 and informs the welding control portion 8 of the detected temperature, and the same operation flow as described in FIG. 13 is performed. Upon notification of the completion of welding, the turntable 35a is rotated and the welded first and second plastic components 1g and 2g are taken out from the turntable 35a. The tenth modification of the first embodiment of the present invention is utilized when welding transparent small plastic components for jewelry or the like.

Note that, in the present invention, since an area in which the laser beam 9 is irradiated onto a plurality of plastic components to weld the plurality of plastic components is an area in which a laser beam is converged and irradiated, apart from a spot shape, a laser beam can also be converged and irradiated in a shape such as an elliptical shape or a linear shape depending on the converging method. Further, the welding area can be cumulatively enlarged by moving the irradiation position of the laser beam little by little. Since the principles of the laser welding method of the present invention have been described in the first embodiment, methods for cumulatively enlarging a welding area using the principles of the laser welding method of the present invention are described in the second embodiment and thereafter.

Second Embodiment

Figure 18:
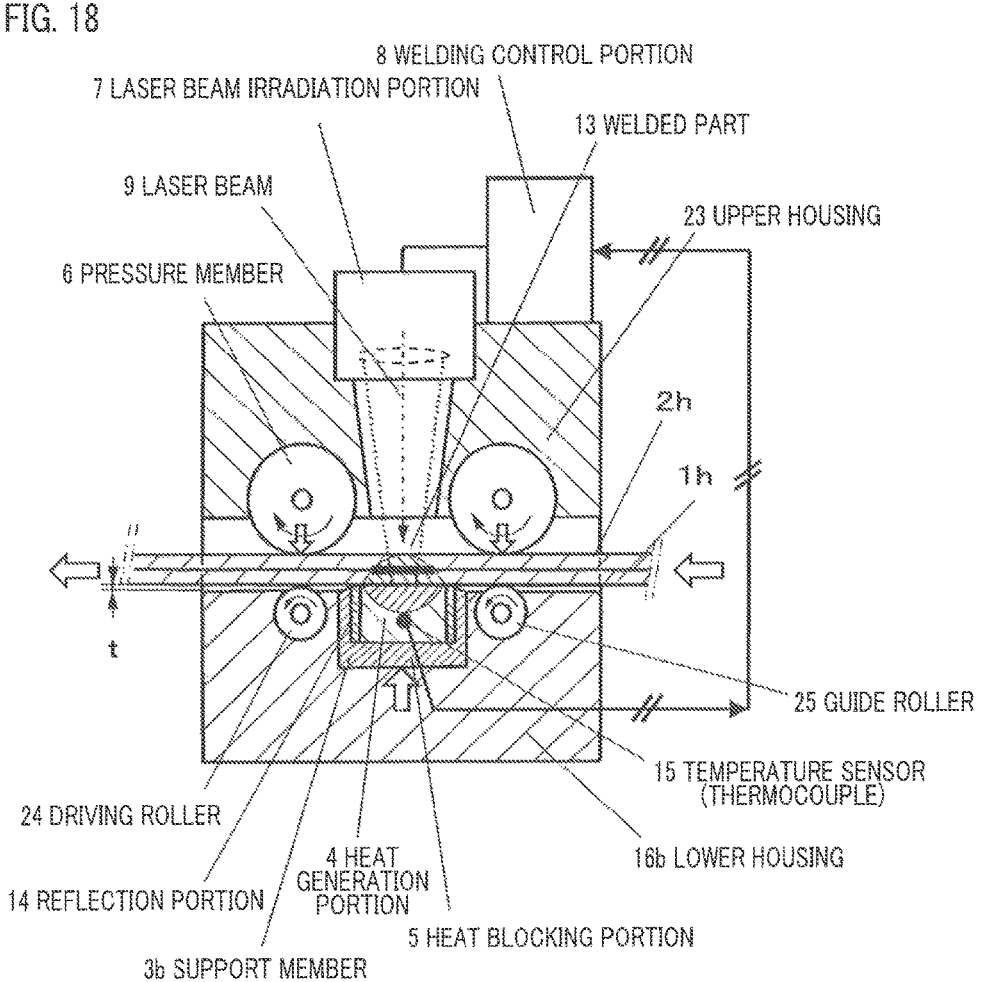
FIG. 18 is a front view that illustrates an overview of a laser welding apparatus according to a second embodiment of the present invention, in which one portion of the laser welding apparatus is omitted.
Figure 19:
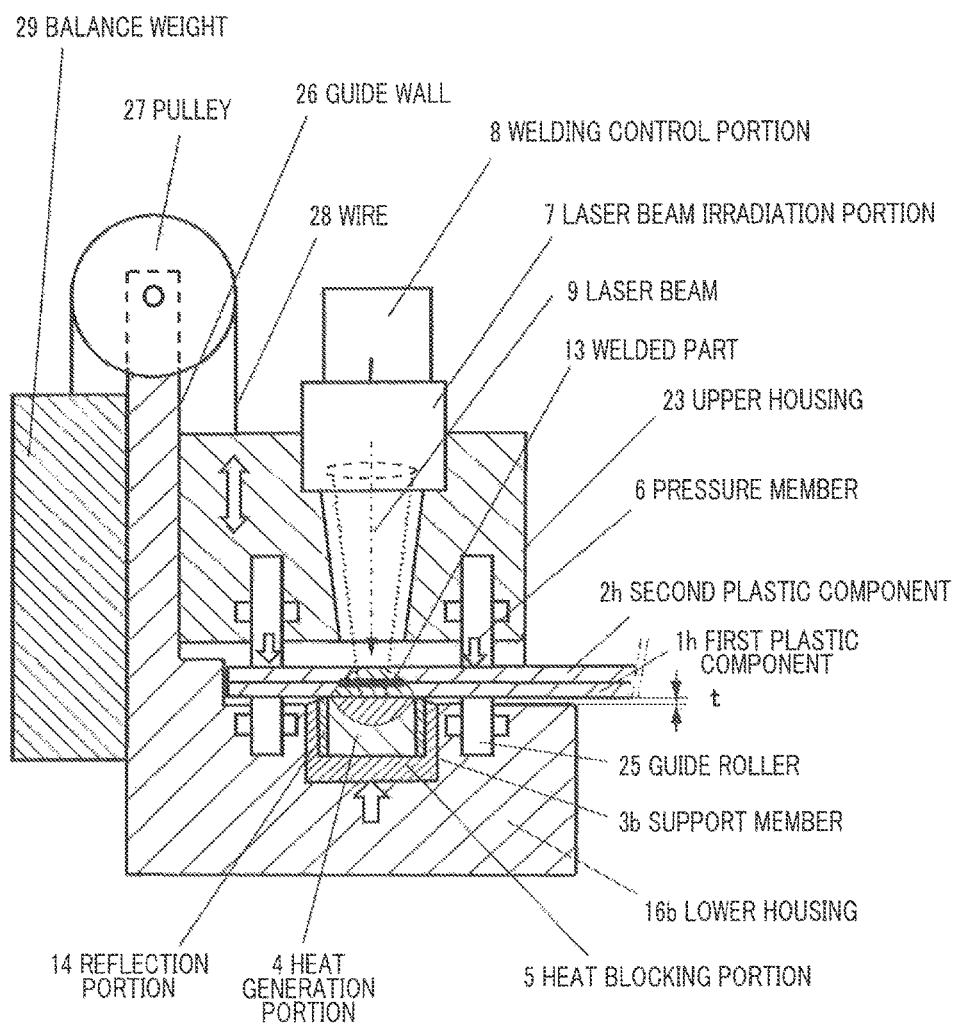
FIG. 19 is a left side-face view that illustrates an overview of the laser welding apparatus according to the second embodiment of the present invention.

In the second embodiment, a case of cumulatively enlarging the welding area by moving an irradiation position of a laser beam little by little with respect to plate-shaped first and second plastic components 1h and 2h is described. FIG. 18 is a longitudinal cross-sectional view that shows an overview of the laser welding apparatus according to the second embodiment of the present invention, and FIG. 19 is a lateral cross-sectional view. Note that, the same constituent elements as in the above described first embodiment and modifications are denoted by the same reference numerals.

In FIG. 18, the support member 3b that supports the first and second plastic components 1h and 2h is incorporated into a central upper portion of the lower housing 16b. The support member 3b is constituted by the heat generation portion 4, the reflection portion 14 and the heat blocking portion 5, with the reflection portion 14 and the heat blocking portion 5 surrounding the heat generation portion 4. The upper face of the heat generation portion 4 faces upwards. A thermocouple as the temperature sensor 15 is embedded in the heat generation portion 4. The temperature sensor 15 feeds back temperature information regarding the heat generation portion 4 to the welding control portion 8.

In the laser welding apparatus according to the second embodiment, the first and second plastic components 1h and 2h are sandwiched by rollers provided in the lower housing 16b and the upper housing 23, and thus the first and second plastic components 1h and 2h are movably supported.

More specifically, driving rollers 24 are provided to the left of the heat generation portion 4 in FIG. 18, and guide rollers 25 are provided to the right. The first and second plastic components 1h and 2h are held between the driving rollers 24 and guide rollers 25 and pressure rollers as the pressure members 6, and the driving rollers 24 are rotated by an unshown drive motor to move the first and second plastic components 1h and 2h from right to left in FIG. 18. Note that, in order to make the feeding amount constant, the driving rollers 24 are made from a hard material whose external diameter does not change, and the pressure rollers are made from an elastic material. Further, the unshown drive motor is controlled in conjunction with welding operations by the welding control portion 8.

The upper housing 23 is provided above the heat generation portion 4, and the laser beam irradiation portion 7 and the welding control portion 8 are attached thereto. The laser beam irradiation portion 7 irradiates the laser beam 9 toward the heat generation portion 4.

FIG. 19 is a transverse cross-sectional view of the laser welding apparatus according to the second embodiment as seen from downstream in the feeding direction of the plastic components to be welded. In FIG. 19, as described using FIG. 18, the guide rollers 25 and the pressure rollers as the pressure members 6 are disposed around the heat generation portion 4 of the support member 3b, and the laser beam irradiation portion 7 and the welding control portion 8 are mounted above the heat generation portion 4. The lower housing 16b is formed to have a substantially L-shaped cross-section, and has an erect guide wall 26 that allows the upper housing 23 to slide vertically. A pulley 27 is rotatably attached to the top of the guide wall 26, and a wire 28 is wound around the pulley 27. One end of the wire 28 is connected to the upper housing 23, and the other end thereof is connected to a balance weight 29 that is on the opposite side of the pulley 27. The upper housing 23 is substantially balanced in weight terms with respect to the balance weight 29, and by changing the weight of the balance weight 29 and adjusting the amount of unbalance, the first and second plastic components 1h and 2h can be held with a desired pressure between the pressure rollers and the driving rollers 24 and between the pressure rollers and the guide rollers 25, respectively. Note that, although the upper face of the heat generation portion 4 contacts the surface of the first plastic component 1h, the surrounding reflection portion 14 and heat blocking portion 5 are at a lower position than the upper face of the heat generation portion 4 and do not contact the surface of the first plastic component 1h, thus forming a clearance (t). Therefore, a pressing force generated by the pressure members is received only by the upper face of the heat generation portion 4, and hence abutting faces of the first and second plastic components 1h and 2h in the range that the upper face of the heat generation portion 4 contacts against closely contact together, and the surface of the first plastic component 1h and the upper face of the heat generation portion 4 closely contact.

In the laser welding apparatus according to the second embodiment that is configured in this manner, the first and second plastic components 1*h* and 2*h* are placed on the driving rollers 24 and the guide rollers 25 of the lower housing 16*b*, are sandwiched with the pressure rollers as the pressure members 6, abutting faces in the welding area of the first and second plastic components 1*h* and 2*h* are caused to closely contact, and the laser beam 9 is irradiated toward the heat generation portion 4 of the support member 3*b* from the laser beam irradiation portion 7 while parallely moving the first and second plastic components 1*h* and 2*h* from the right side to the left side in the drawing, that is, in the horizontal direction relative to the laser beam emitting position.

Heat that is generated at the heat generation portion 4 of the support member 3*b* is transmitted to the first plastic component 1*h* which the upper face of the heat generation portion 4 closely contacts, and is further transmitted to the second plastic component 2*h*. Subsequently, the heat generation portion 4 and heat generation parts of the first and second plastic components 1*h* and 2*h* become a high temperature and exceed the melting temperature. The abutting portions of the first and second plastic components 1*h* and 2*h* then melt. When irradiation of the laser beam 9 by the laser beam irradiation portion 7 stops, heat generation of the heat generation portion 4 stops, the heat generation parts of the first and second plastic components 1*h* and 2*h* cool and harden, and welding is completed. Although the welding principles are the same as in the first embodiment described above, in the second embodiment, while welding the first and second plastic components 1*h* and 2*h*, the plurality of plastic components 1*h* and 2*h* are moved little by little in the conveyance direction relative to the laser beam emitting position of the laser beam irradiation portion 7 while maintaining the distance between the plurality of plastic components 1*h* and 2*h* that are sandwiched by the support member 3*b* and the pressure members 6 and the laser beam emitting position of the laser beam irradiation portion 7. Therefore, the welding area and the welding strength are cumulatively increased by an amount corresponding to the amount that the first and second plastic components 1*h* and 2*h* are moved. As a result, a linearly connected area can be welded.

Figure 20:
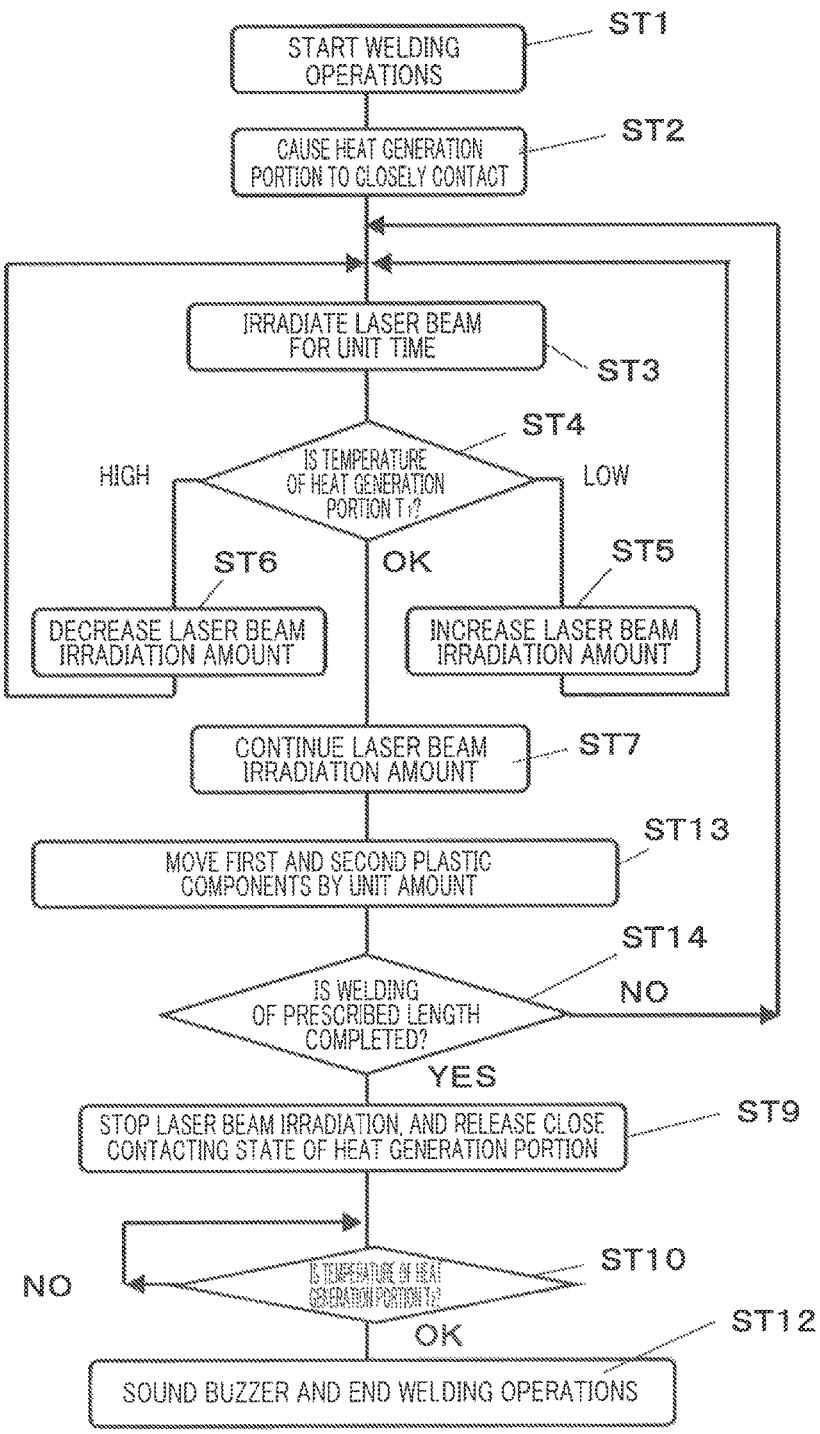
FIG. 20 is a flowchart of welding operations of the laser welding apparatus according to the second embodiment of the present invention.

FIG. 20 is a flowchart of welding operations in the second embodiment. In FIG. 20, operations from step ST1 to step 7 are the same as in FIG. 13 that is described above, and hence a description thereof is omitted here. In FIG. 20, when the temperature of the heat generation portion 4 has entered the predetermined first temperature range, laser beam irradiation is continued (step ST7), and the driving rollers 24 are turned to feed the first and second plastic components 1*h* and 2*h* by a unit amount (for example, the size of the diameter of an irradiation spot of the laser beam) (step ST13). Subsequently, when welding of a predetermined length is completed (step ST14), laser beam irradiation is stopped, the pressing force on the first and second plastic components 1*h* and 2*h* and the heat generation portion 4 is relaxed to release the state of close contact therebetween (step ST9), the heat generation portion 4 cools, and when the temperature of the heat generation portion 4 has cooled as far as a predetermined second temperature range (step ST10), a buzzer is sounded and the welding work is ended (step ST12).

In the laser welding apparatus according to the second embodiment, in addition to the effects of the first embodiment, since temperature control and the control of the feeding amount of the first and second plastic components 1*h* and 2*h* is performed by the welding control portion 8, the welding area can be cumulatively enlarged, and a long area that has a linear shape can be stably welded.

Figure 21:
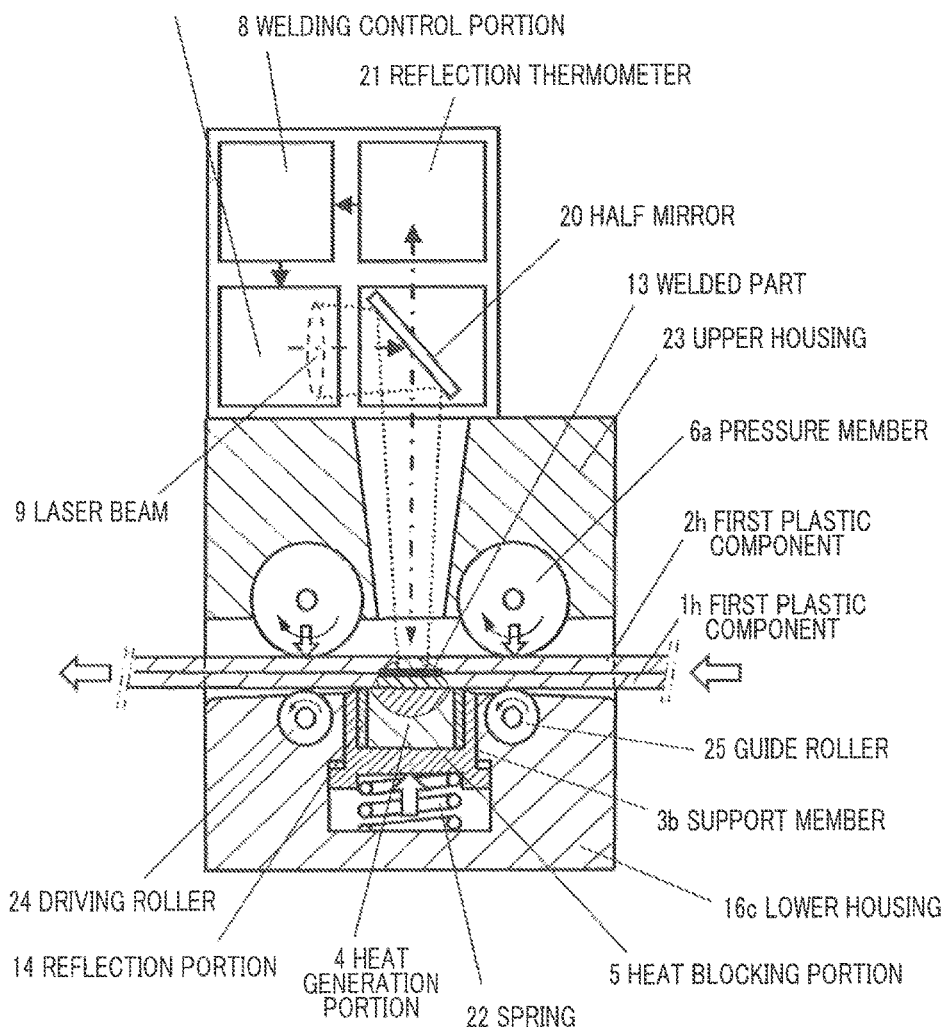
FIG. 21 is a front view that illustrates an overview of a modification of the laser welding apparatus according to the second embodiment of the present invention, in which one portion of the laser welding apparatus is omitted.

FIG. 21 illustrates a modification of the laser welding apparatus according to the second embodiment. The support member 3*d* includes the heat generation portion 4, the reflection portion 14 and the heat blocking portion 5. The heat generation portion 4 is surrounded by the reflection portion 14 and the heat blocking portion 5. The support member 3*d* contacts against the spring 22 that is housed in a concave portion in the bottom face of the heat blocking portion 5, and the heat generation portion 4 is urged upward by the spring force. When the configuration in FIG. 21 is adopted, by means of the urging force of the spring 22, the upper face of the heat generation portion 4 of the support member 3*d* can exert a pressurization force from the downward direction to the upward direction of the first and second plastic components 1*h* and 2*h*. Consequently, a pressurization force that causes the upper face of the heat generation portion 4 of the support member 3*d* to contact against the lower part of the first and second plastic components 1*h* and 2*h* can be made a stable force of a desired value by adjustment of the spring force.

Note that, since the structure is one in which the heat generation portion 4 moves vertically, temperature information of the heat generation portion 4 is fed back to the welding control portion 8 using the reflection thermometer 21 as a temperature sensor.

FIG. 19 to FIG. 21 have been used to describe a configuration in which a plastic component moving device is provided that, while keeping a distance between plastic components to be welded and a laser beam irradiation portion constant, moves the plurality of plastic components relative to the laser beam emitting position of the laser beam irradiation portion.

That is, although in the above described embodiment an example is illustrated in which the laser beam irradiation portion 7 is fixed and the plurality of plastic components 1 and 2 are held between the driving rollers 24 and the pressure rollers and moved, a configuration may also be adopted in which the plurality of plastic components are fixed, and instead, the laser beam irradiation portion 7 and the heat generation portion 4 move along the welding line of the members (workpieces) to be welded together.

Figure 22:
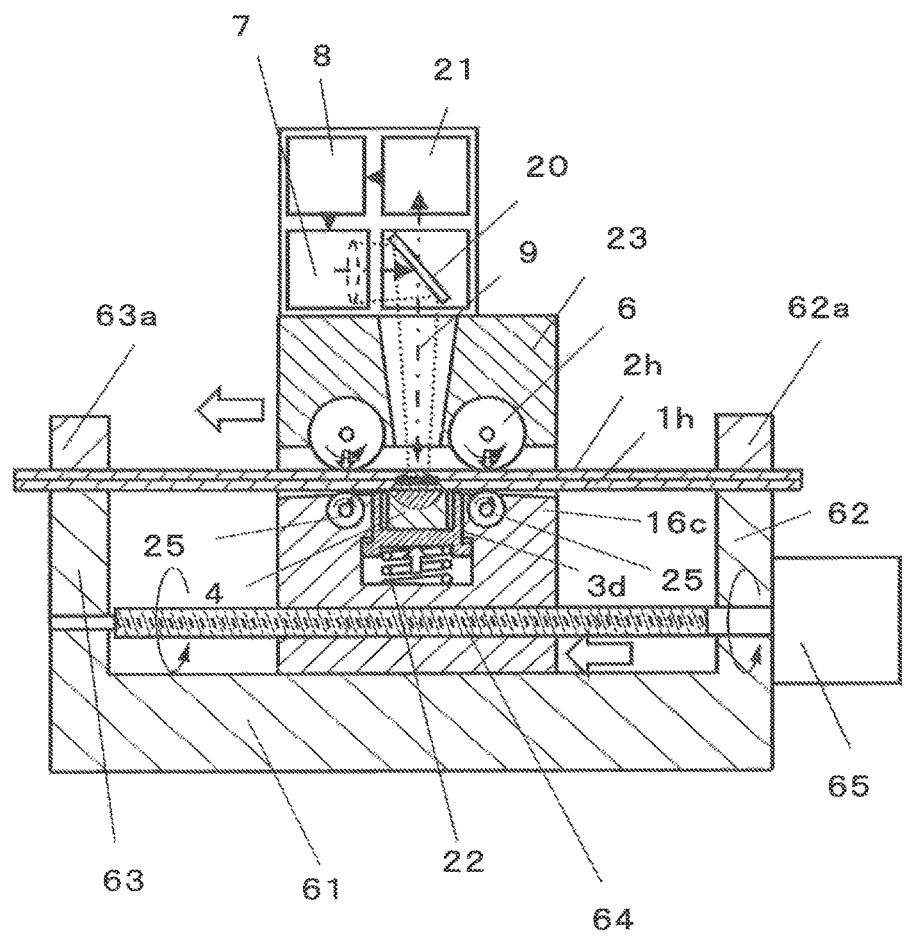
FIG. 22 is a front view that illustrates an overview of another modification of the laser welding apparatus according to the second embodiment of the present invention.

To implement this kind of laser welding apparatus, FIG. 22 illustrates another modification of the laser welding apparatus according to the second embodiment.

In FIG. 22 a configuration is illustrated in which the lower housing 16*c* in which the support member 3*d* having the heat generation portion 4 is incorporated, and the upper housing 23 in which the pressure members 6, the laser beam irradiation portion 7 and the welding control portion 8 and the like are incorporated, as described using FIG. 21, are integrated, and are slidably placed on a movement guiding base 61. Vertical walls 62 and 63 are erected at the two ends of the movement guiding base 61, respectively. A feed screw 64 that extends between the vertical walls 62 and 63 is rotatably supported in the vertical walls 62 and 63. A hole that penetrates in the horizontal direction is formed in the lower housing 16*c*, and an internal thread into which the feed screw 64 is threaded is formed in the hole. When the feed screw 64 is rotated, the lower housing 16*c* and the upper housing 23 move as one piece in the workpiece welding line direction in the transverse direction in the drawing. Reference numeral 65 denotes a rotary motor that rotates the feed screw 64. In the laser welding apparatus illustrated in FIG. 22, the plurality of plastic components 1*h* and 2*h* are superposed on top of the vertical walls 62 and 63, and clamping members 62*a* and 63*a* are attached from above the vertical walls 62 and 63 to fix the plurality of plastic components 1*h* and 2*h* in a static state on the vertical walls 62 and 63 of the movement guiding base 61.

In the laser welding apparatus illustrated in FIG. 22, the plurality of plastic components 1*h* and 2*h* are held between the pressure rollers that are the pressure members 6 and the guide rollers 25, the heat generation portion 4 of the support member 3*d* is pressed against the plurality of plastic components 1*h* and 2*h* by the spring 22, the to-be-welded abutting faces of the plurality of plastic components 1*h* and 2*h* are caused to closely contact, the heat generation portion 4 and the surface of the first plastic component 1*h* which the heat generation portion 4 abuts against are caused to closely contact, the laser beam 9 is irradiated from the laser beam irradiation portion 7 onto the heat generation portion 4 to cause the heat generation portion 4 to generate heat, and the to-be-welded portions of the plastic components 1*h* and 2*h* are welded by heat that arises at the heat generation portion 4. Information regarding the temperature of the heat generation portion 4 is obtained with the reflection thermometer 21, and a rotational amount of the rotary motor 65, that is, a feeding amount of the emitting position of the laser beam 9, is controlled to cumulatively enlarge the welding area of the plastic components 1*h* and 2*h*.

In the foregoing, an example in which a plastic component moving device is provided and an example in which a device for moving a laser beam irradiation portion is provided are described in which, while maintaining a distance between a plurality of plastic components sandwiched between support members and pressure members and a laser beam emitting position of the laser beam irradiation portion, the plurality of plastic components are parallely moved in the horizontal direction or the laser beam emitting position of the laser beam irradiation portion is parallely moved in the horizontal direction.

Third Embodiment

Figure 23:
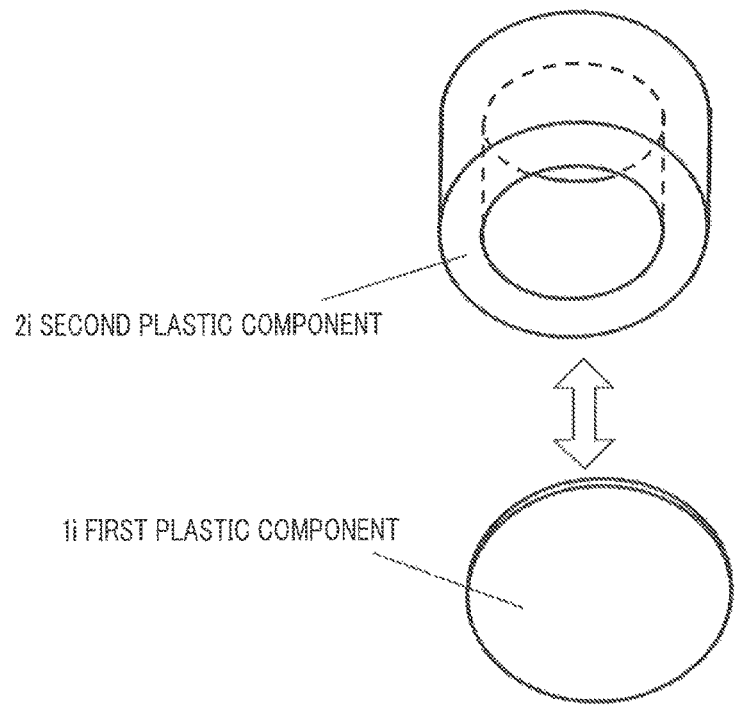
FIG. 23 is an exploded perspective view of plastic components to be welded using a laser welding apparatus according to a third embodiment of the present invention.

FIG. 23 is an exploded perspective view of plastic components that are welded by a laser welding method according to the third embodiment of the present invention. A first plastic component 1*i* is a circular sheet made of a thermoplastic resin such as a thin polyamide resin, and a second plastic component 2*i* is a hollow circular cylinder that is similarly made of a thermoplastic resin such as a thin polyamide resin. The present laser welding method is utilized, for example, when welding a thin circular thermoplastic resin sheet that is difficult to handle due to the occurrence of wrinkles or surface waviness to a narrow rigid frame made of a thermoplastic resin. The laser welding apparatus according to the third embodiment of the present invention welds a surface in the vicinity of the outer circumference of the circular sheet made of a thin thermoplastic resin that is the first plastic component 1*i* to an end face of the hollow circular cylinder made of thermoplastic resin that is the second plastic component 2*i*.

Figure 24:
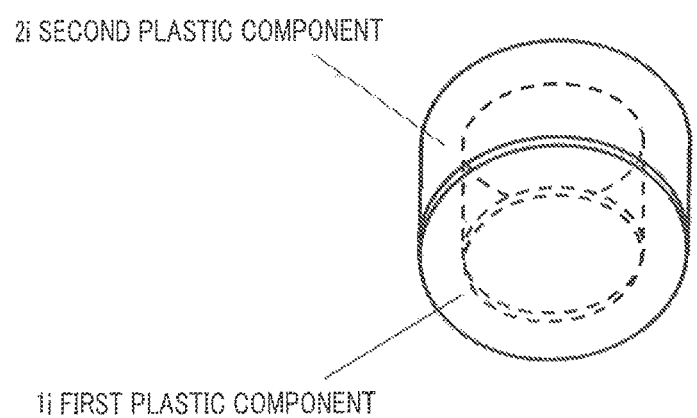
FIG. 24 is an external perspective view illustrating a state after the plastic components to be welded using the laser welding apparatus according to the third embodiment of the present invention are welded.
Figure 25:
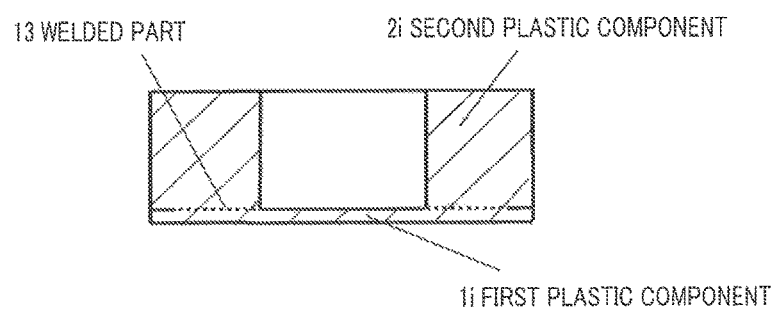
FIG. 25 is a cross-sectional view illustrating a state after the plastic components to be welded using the laser welding apparatus according to the third embodiment of the present invention are welded.

FIG. 24 is an external perspective view of the plastic components after being welded together by the laser welding method according to the third embodiment of the present invention. FIG. 25 is a cross-sectional view of the plastic components after being welded together by a laser welding apparatus according to the third embodiment of the present invention. In FIG. 25, the area of a welded part 13 which is welded by irradiation of the laser beam from the laser beam irradiation portion is indicated by a dotted line.

Figure 26:
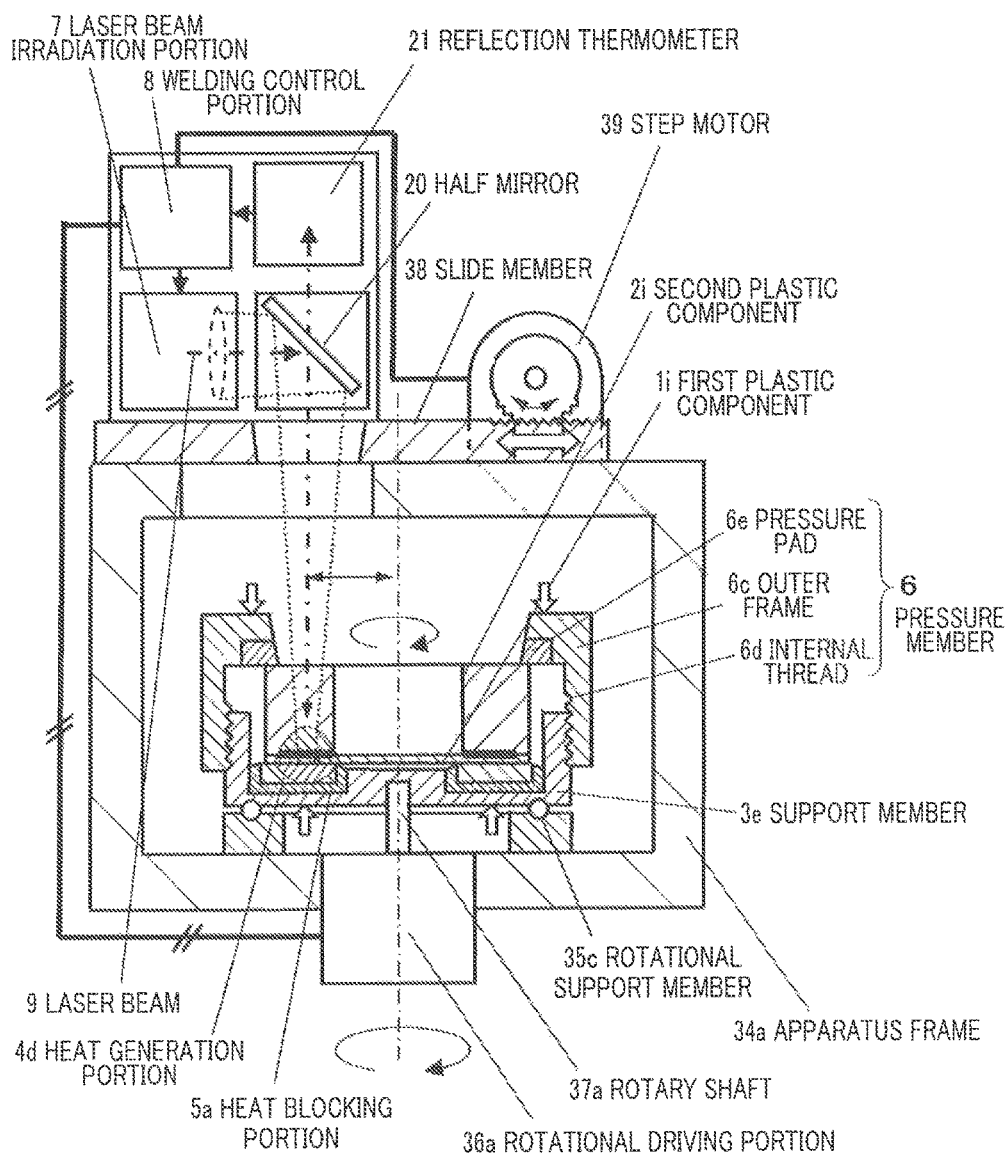
FIG. 26 is a view illustrating an overview of the laser welding apparatus according to the third embodiment of the present invention.

FIG. 26 is a view that illustrates an overview of the laser welding apparatus according to the third embodiment of the present invention. In FIG. 26, a support member 3*e* in which a heat generation portion 4*d* is formed is caused to rotate on a rotational support member 35*c* provided in the bottom of an apparatus frame 34*a*, and the first and second plastic components 1*i* and 2*i* are placed on the support member 3*e*. Thereafter, the abutting faces in the welding area of the first and second plastic components 1*i* and 2*i*, and the heat generation portion 4*d* of the support member 3*e* and the first plastic component 1*i* are caused to closely contact and are held by the pressure member 6. In the state in which the respective components are held in this manner, the laser beam 9 is converged and irradiated from the laser beam irradiation portion 7 that is mounted at an upper part of the apparatus frame 34.

Figure 27A:
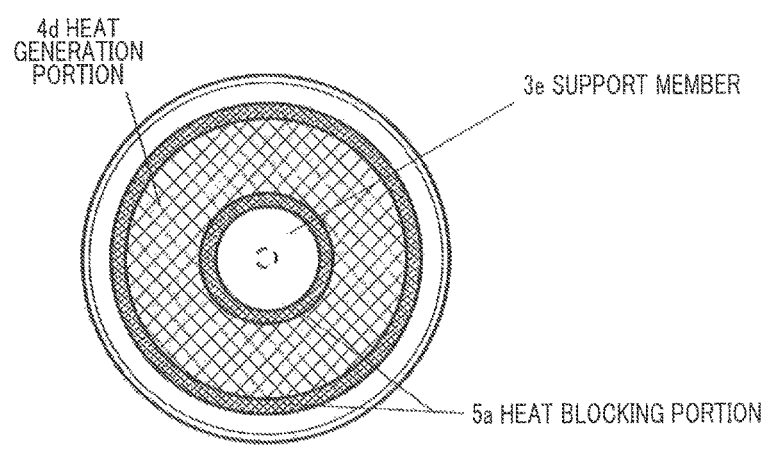
FIG. 27A is a plan view of a support member of the laser welding apparatus according to the third embodiment of the present invention.
Figure 27B:
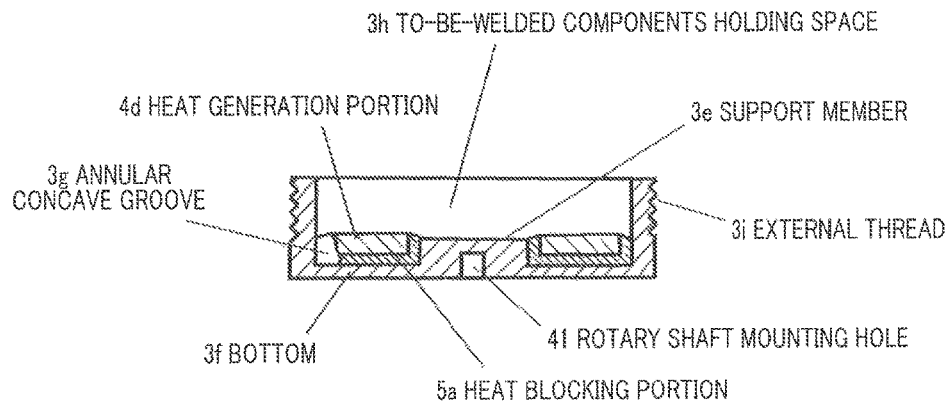
FIG. 27B is a cross-sectional view of the support member of the laser welding apparatus according to the third embodiment of the present invention.

FIG. 27A is a plan view of the support member 3*e* of the laser welding apparatus according to the third embodiment of the present invention. Faces other than the upper face of the heat generation portion 4*d* that is made of an annular stainless steel plate are surrounded by a heat blocking portion 5*a* that is made from a container made of a heat insulating material such as gypsum. FIG. 27B is a cross-sectional view of the support member 3*e* according to the third embodiment of the present invention. An annular concave groove 3*g* in which the heat generation portion 4 that is surrounded by the heat blocking portion 5*a* is mounted in formed in a bottom 3*f* of the support member. In FIG. 27B, the annular concave groove 3*g* is clearly illustrated by means of a cross-sectional view in which a part of the heat generation portion 4*d* and the heat blocking portion 5*a* is cut out.

A configuration is adopted so that a space can be formed above the heat generation portion 4*d* when the heat generation portion 4*d* that is surrounded by the heat blocking portion 5*a* is inserted into the annular concave groove 3*g*. The space is a to-be-welded components holding space 3*h* in which the first and second plastic components 1*i* and 2*i* are mounted in a superposed manner. In the bottom 3*f*, a rotary shaft mounting hole 41 into which a rotary shaft 37*a* of a rotational driving portion 36*a* is fitted is formed at a center part on the opposite side to the to-be-welded components holding space 3*h* side. An external thread 3*i* for attaching the pressure member 6 is cut in the outer circumference of the support member 3*e*.

Returning to FIG. 26, a configuration is adopted in which the support member 3*e* described using FIG. 27 is placed on the rotational support member 35*c* provided at the bottom of the apparatus frame 34*a*, and the tip of the rotary shaft 37*a* of the rotational driving portion 36*a* such as an electric motor that is provided at the bottom of the apparatus frame 34*a* is fitted and mounted in the rotary shaft mounting hole 41 of the support member 3*e*. The first plastic component 1*i* and the second plastic component 2*i* are placed on the heat generation portion 4*d* of the support member 3*e* and are covered by the pressure member 6. An internal thread 6*d* of an outer frame 6*c* of the pressure member 6 is then screwed together with the external thread 3*i* of the support member and fastened, to thereby press down the first plastic component 1*i* and the second plastic component 2*i* with a pressure pad 6*e*. Thereby, the abutting faces in the welding area of the first plastic component 1*i* and the second plastic component 2*i* are caused to closely contact. When the rotary shaft 37*a* is rotated by the rotational driving portion 36*a*, the support member 3*e* rotates and the first plastic component 1*i* and the second plastic component 2*i* rotate in a state in which the abutting faces in the welding area thereof are caused to closely contact.

A slide member 38 that slides along the upper face of the apparatus frame 34*a*, and a step motor 39 are mounted at the top of the apparatus frame 34a. When a pinion that is attached to a shaft of the step motor 39 oscillatingly rotates, the slide member 38 in which a rack is cut slides as indicated by an outline arrow. The laser beam irradiation portion 7 and the welding control portion 8 are mounted on the slide member 38, and the irradiation position of the laser beam 9 which the laser beam irradiation portion 7 irradiates moves in the radial direction relative to the shaft center of the rotary shaft of the rotational driving portion 36a in response to movement of the slide member 38. Note that, the welding control portion 8 is connected to a control wire of the rotational driving portion 36a and a control wire of the step motor 39, and the welding control portion 8 controls the rotational driving portion 36a and the step motor 39 in conjunction with the welding operations.

When the welding control portion 8 controls the laser beam irradiation portion 7 to irradiate the laser beam 9 while causing the support member 3e to be rotated by the rotational driving portion 36a, the laser beam 9 strikes the heat generation portion 4d of the support member 3e and the trajectory of the laser beam 9 draws a circle. A part of the heat generation portion 4d at which the trajectory of the laser beam 9 draws a circle absorbs the laser beam 9, and heat is generated there which welds the first and second plastic components 1i and 2i. The laser beam 9 irradiated onto the heat generation portion 4d and the heat generated at the heat generation portion 4d are blocked by the heat blocking portion 5a and do not escape to outside of the heat blocking portion 5a, and instead the energy of the laser beam 9 irradiated onto the heat generation portion 4d changes to heat.

When the welding control portion 8 uses the step motor 39 to cause the slide member 38 to slide in the radial direction relative to the shaft center of the rotary shaft 37a of the rotational driving portion 36, the size of a circle that the laser beam 9 draws on the heat generation portion 4e of the support member 3e changes, and the welding area of the first and second plastic components 1i and 2i cumulatively increases.

Figure 28:
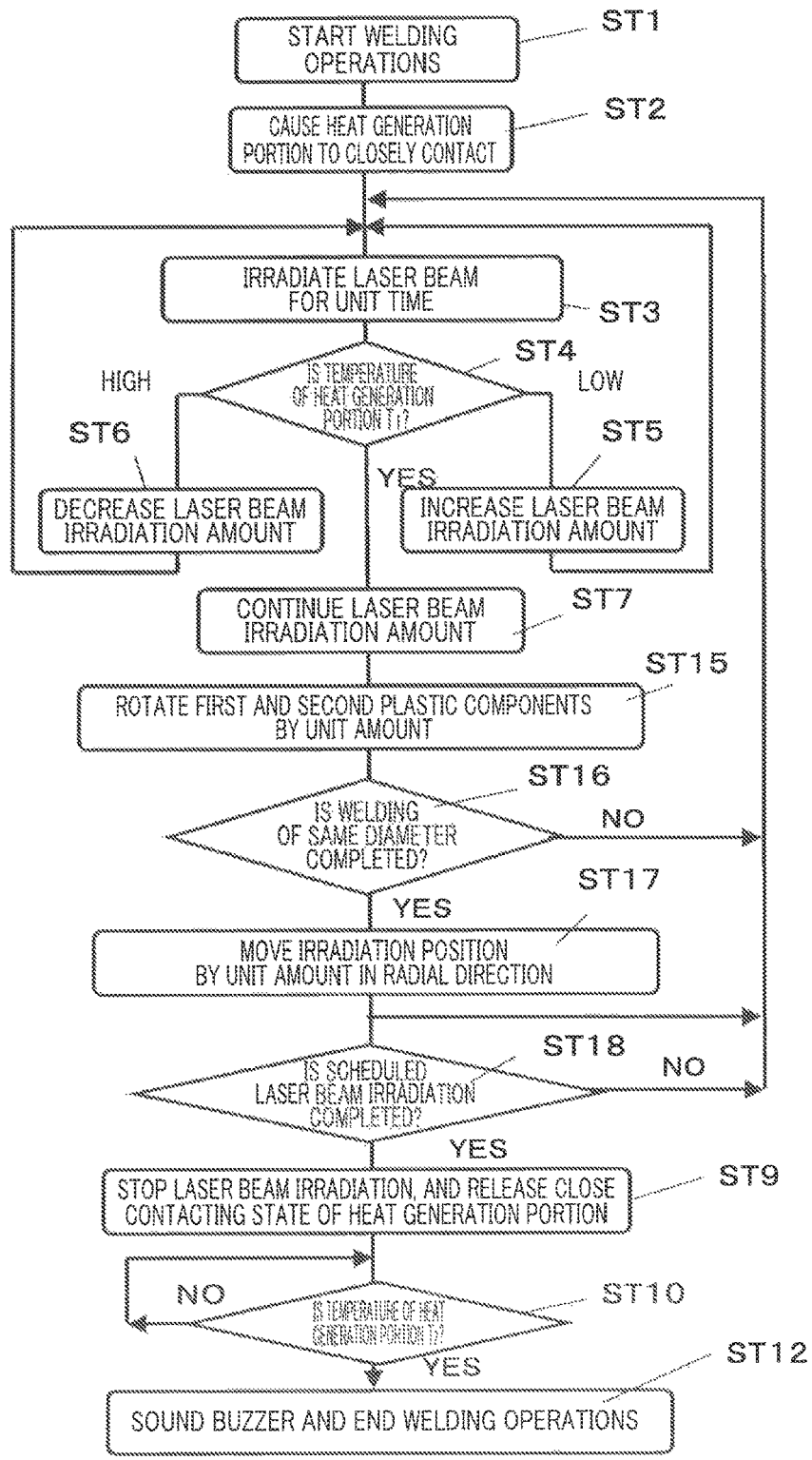
FIG. 28 is a flowchart of welding operations of the laser welding apparatus according to the third embodiment of the present invention.

FIG. 28 is a flowchart of welding operations of the laser welding apparatus according to the third embodiment. In FIG. 28, operations from step ST1 to step ST7 are the same as in FIG. 13 that is described above, and hence a description thereof is omitted here.

In FIG. 28, when the temperature of the heat generation portion 4 has entered the predetermined first temperature range, laser beam irradiation is continued (step ST7), and the first and second plastic components 1i and 2i are rotated by a unit amount by the rotational driving portion 36a (step ST15), and it is checked whether or not the first and second plastic components 1i and 2i have been rotated with respect to the same diameter, that is, the amount of one circumference for the same radius, and welded (step ST16). If it can be confirmed that the first and second plastic components 1i and 2i were rotated with respect to the amount of one circumference for the same radius and welded, the slide member 38 is actuated using the step motor 39 to thereby move the emitting position of the laser beam by a unit amount in the radial direction (step ST17). When it is confirmed that the laser beam has been irradiated with respect to a scheduled area, and laser beam irradiation with respect to the scheduled area is completed (step ST18), laser beam irradiation is stopped, the pressing force on the first and second plastic components 1i and 2i and the heat generation portion 4d is relaxed to release the state of close contact therebetween (step ST9), the heat generation portion 4d cools, and when the temperature of the heat generation portion 4d has cooled as far as a predetermined second temperature range (step ST10), a buzzer is sounded and the welding work is ended (step ST12).

Thus, with the laser welding apparatus according to the third embodiment of the present invention, the surface of a circular sheet made of a thermoplastic resin such as a thin polyamide resin that is the first plastic component 1i can be welded to the end face of a hollow circular cylinder made of a thermoplastic resin such as a polyamide resin that is the second plastic component 2i.

Fourth Embodiment

Figure 29:
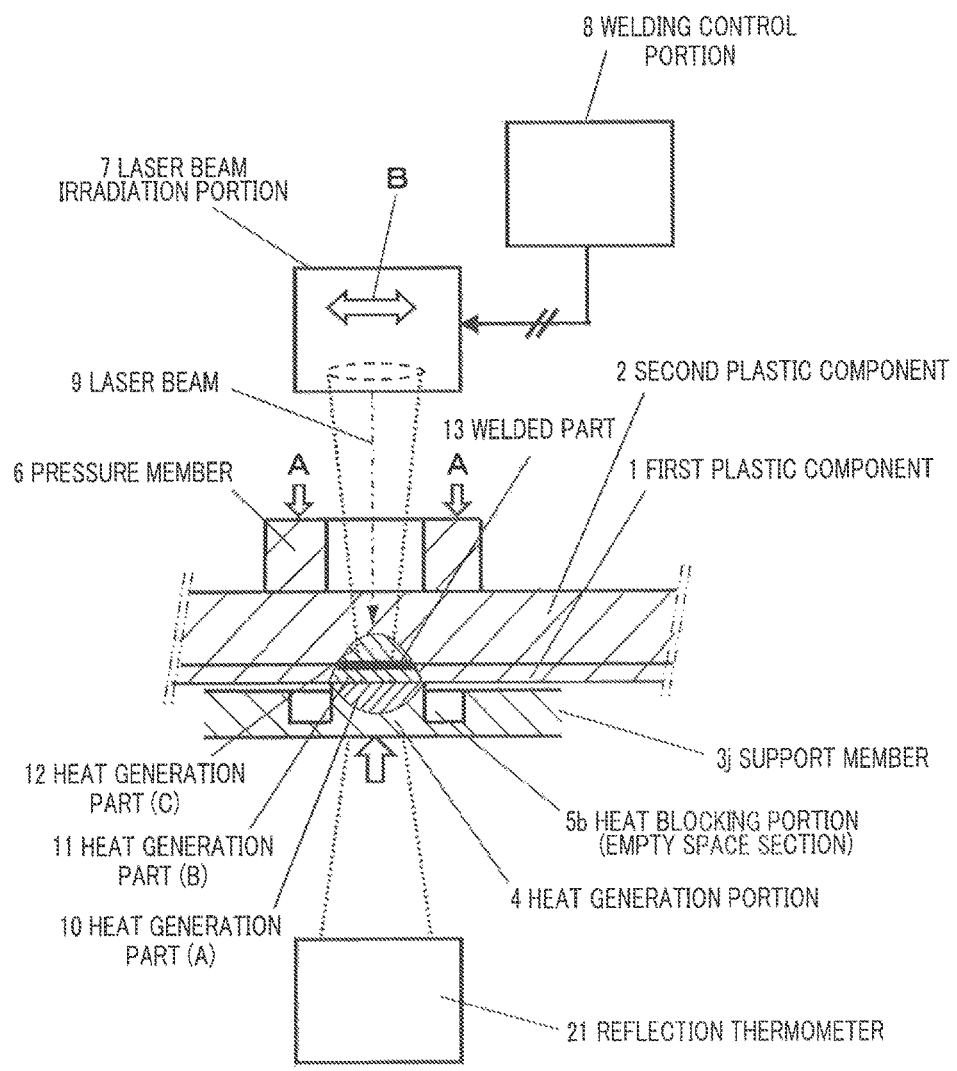
FIG. 29 is a view illustrating principles of a laser welding method according to a fourth embodiment of the present invention.

FIG. 29 illustrates principles of a laser welding method for welding first and second plastic components 1 and 2 that transmit a laser beam according to a fourth embodiment of the present invention. In the fourth embodiment of the present invention, a configuration is adopted in which a heat blocking portion 5b is formed that utilizes a heat insulation effect of an air layer by providing an empty space section in the support member 3j, to thereby ensure that heat generated at the heat generation portion 4 does not escape to outside of the heat blocking portion (empty space section) 5b.

More specifically, in the support member 3j shown in FIG. 29, the lower portion of abutting faces in the welding area of the first and second plastic components 1 and 2 is adopted as the heat generation portion 4. Further, the heat blocking portion 5b is formed by providing an empty space section by cutting away the periphery of the heat generation portion 4 in an annular shape.

The first and second plastic components 1 and 2 are placed on the support member 3j and pressed by the pressure member 6 to cause the heat generation portion 4 to closely contact with the abutting faces in the welding area of the first and second plastic components 1 and 2, and the laser beam 9 from the laser beam irradiation portion 7 is irradiated onto the heat generation portion 4 of the support member 3j from above the first and second plastic components 1 and 2.

Because the respective faces other than the upper face of the heat generation portion 4 are surrounded by the heat blocking portion 5, heat generated in the heat generation part (A) 10 of the heat generation portion 4 of the support member 3j is transmitted to the heat generation part (B) 11 of the first plastic component 1 which the upper face of the heat generation portion 4 closely contacts, and is further transmitted to the heat generation part (C) 12 of the second plastic component 2. This is the same as in the first embodiment that is described above.

Further, the heat generation part (A) 10, the heat generation part (B) 11 and the heat generation part (C) 12 of the heat generation portion 4 and the first and second plastic components 1 and 2 become a high temperature, and the temperature of the first and second plastic components 1 and 2 exceeds the melting temperature. Subsequently, the abutting portions of the first and second plastic components 1 and 2 are melted by the heat that is generated at the heat generation portion 4. When irradiation of the laser beam 9 of the laser beam irradiation portion 7 stops, heat generation in the heat generation part (A) 10 of the heat generation portion 4 stops, and the heat generation part (B) 11 and heat generation part (C) 12 of the abutting portions of the first and second plastic components 1 and 2 cool and harden to thereby complete the welding. This is the same as in the first embodiment that is already described above.

Figure 30:
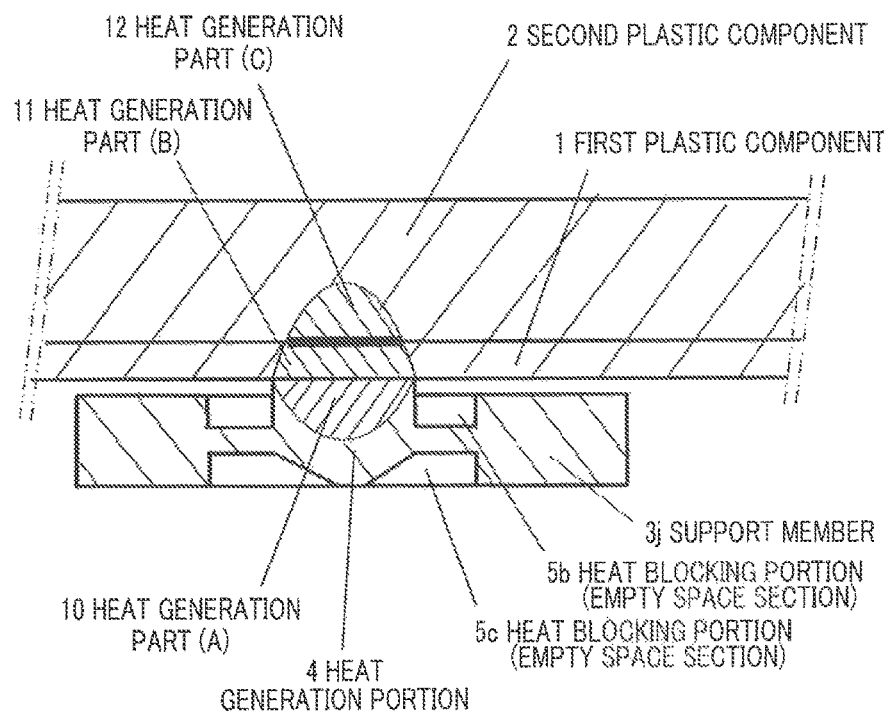
FIG. 30 is a cross-sectional view of another support member of the laser welding method according to the fourth embodiment of the present invention.
Figure 31:
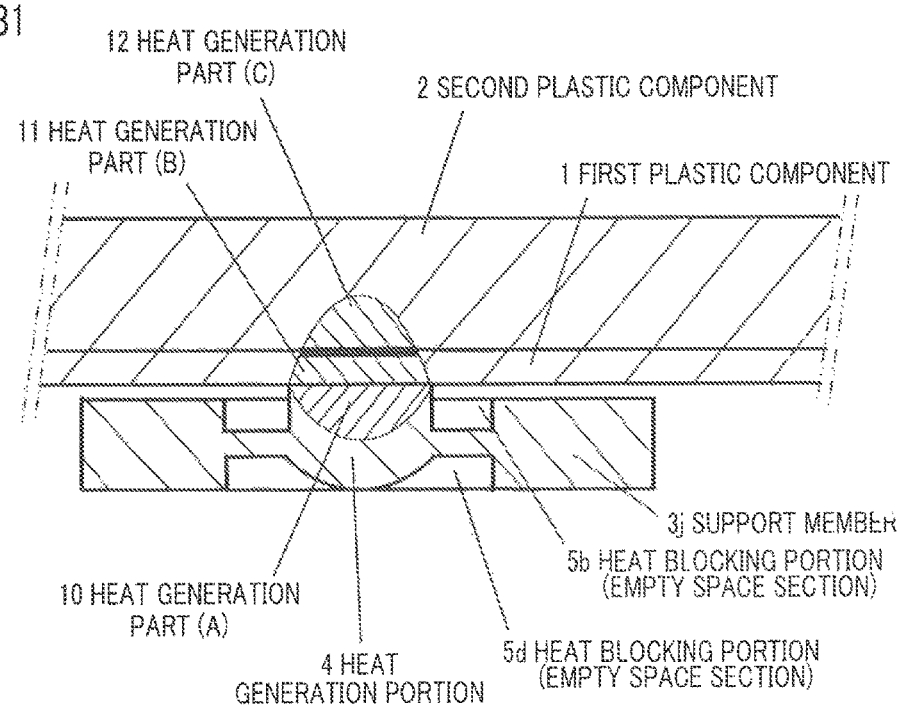
FIG. 31 is a cross-sectional view of yet another support member of the laser welding method according to the fourth embodiment of the present invention.

FIG. 30 and FIG. 31 each illustrate a modification of the shape of the empty space section at the bottom of the support member 3j. In the support member 3j shown in FIG. 30, the bottom of the heat generation portion 4 that is on the inner side of an annular heat blocking portion 5c is formed in the shape of an inverted circular truncated cone. By adopting this shape, heat can be caused to concentrate in the vicinity of the center of the heat generation portion 4 which the laser beam impinges upon.

In the support member 3j illustrated in FIG. 31, the bottom of the heat generation portion 4 that is on the inner side of an annular heat blocking portion 5d is formed in a hemispheric shape. By adopting this shape, similarly to the shape illustrated in FIG. 30, heat can be caused to concentrate in the vicinity of the center of the heat generation portion 4 which the laser beam impinges upon.

Fifth Embodiment

Figure 32:
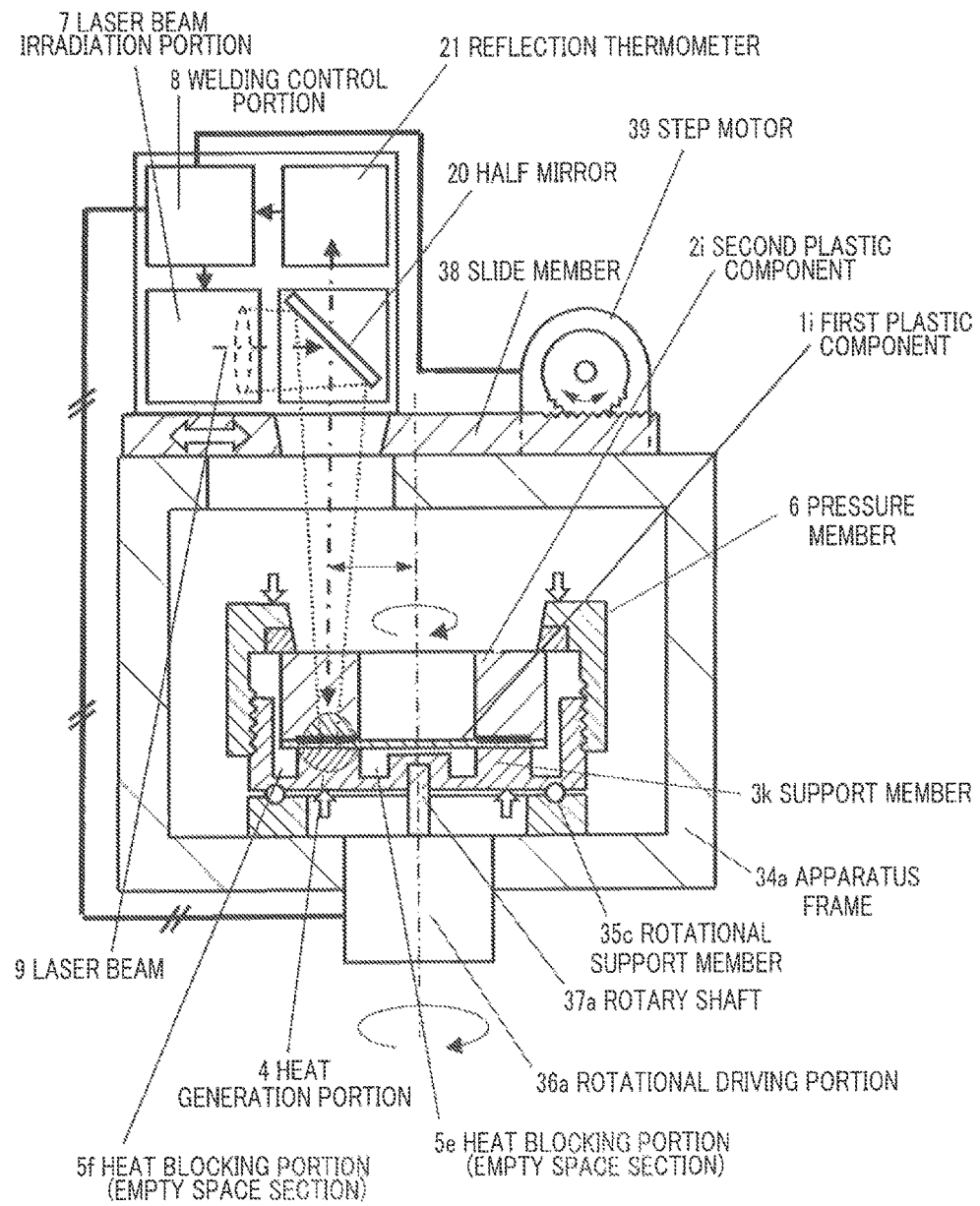
FIG. 32 is a view illustrating an overview of a laser welding apparatus according to a fifth embodiment of the present invention.

FIG. 32 is a view that illustrates an overview of a laser welding apparatus according to a fifth embodiment of the present invention. In the fifth embodiment of the present invention, similarly to the laser welding apparatus according to the third embodiment of the present invention, the surface of a circular sheet made of a thermoplastic resin such as a thin polyamide resin as the first plastic component 1i is welded to an end face of a hollow circular cylinder made of a thermoplastic resin such as a polyamide resin as the second plastic component 2i. In the laser welding apparatus according to the fifth embodiment of the present invention, heat blocking portions 5e and 5f are formed that utilize a heat insulation effect of an air layer by providing empty space sections in a support member 3k. This is the same as in the fourth embodiment of the present invention. In this connection, other constituent portions of the laser welding apparatus according to the fifth embodiment of the present invention are the same as in the laser welding apparatus according to the third embodiment of the present invention that is illustrated in FIG. 26, and hence a description of duplicate portions is omitted here.

Prior to describing operation of the laser welding apparatus according to the fifth embodiment of the present invention, the structure of a support member 3k of the laser welding apparatus according to the fifth embodiment of the present invention will be described using FIG. 33A, FIG. 33B and FIG. 33C.

Figure 33A:
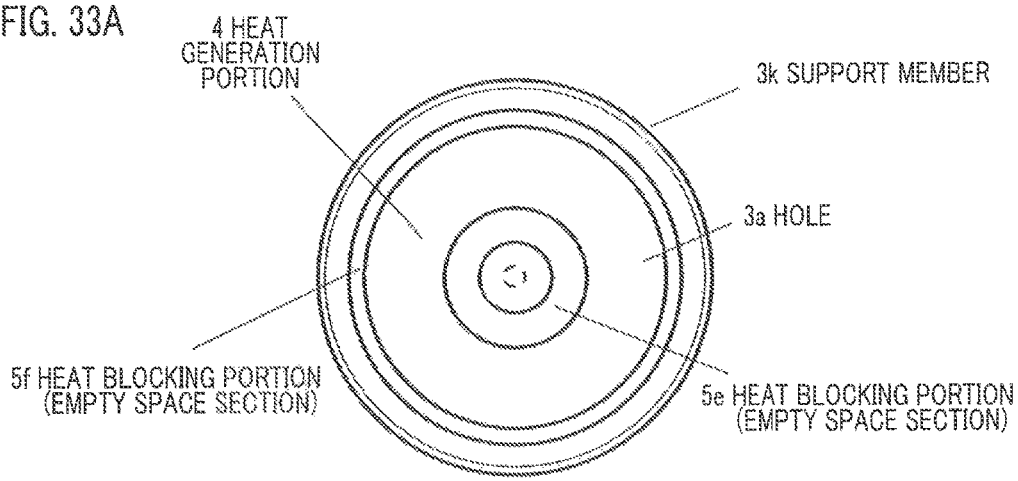
FIG. 33A is a plan view of a support member of the laser welding apparatus according to the fifth embodiment of the present invention.
Figure 33B:
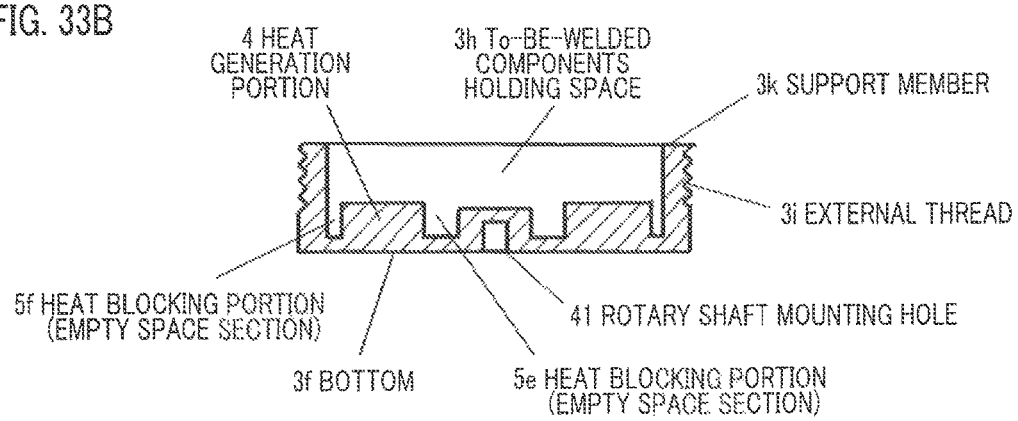
FIG. 33B is a cross-sectional view of the support member of the laser welding apparatus according to the fifth embodiment of the present invention.
Figure 33C:
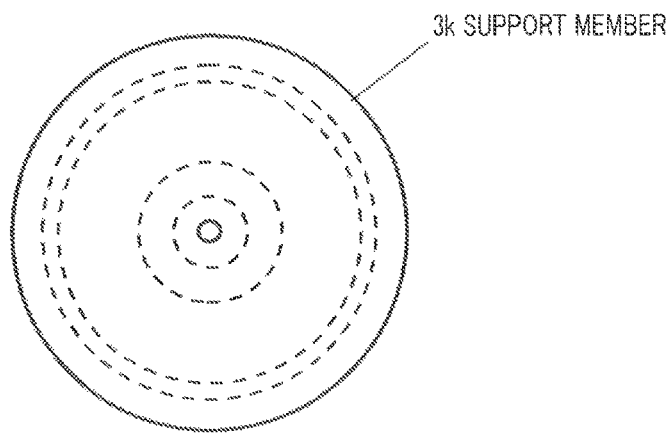
FIG. 33C is a bottom view of the support member of the laser welding apparatus according to the fifth embodiment of the present invention.

FIG. 33A is a plan view of the support member 3k, FIG. 33B is a cross-sectional view of the support member 3k, and FIG. 33C is a bottom view of the support member 3k. Heat blocking portions 5e and 5f that utilize a heat insulation effect of an air layer by cutting away material of the support member 3k to provide empty space sections are formed around the heat generation portion 4 of the support member 3k. Conversely, an annular portion that is surrounded on an inner circumferential side thereof by the heat blocking portion 5e which is formed in an annular shape, and is surrounded on an outer circumferential side by the heat blocking portion 5f which is formed in an annular shape and is concentric with the heat blocking portion 5e is utilized as the heat generation portion 4.

In the laser welding apparatus according to the fifth embodiment of the present invention, as shown in FIG. 32, the support member 3k is incorporated into the laser welding apparatus, and the welding control portion 8 rotates the support member 3k using the rotational driving portion 36a, and converges and irradiates the laser beam 9 using the laser beam irradiation portion 7 so that the trajectory of the laser beam 9 draws a circle on the heat generation portion 4 of the support member 3k. The part of the heat generation portion 4d at which the trajectory of the laser beam 9 draws a circle absorbs the laser beam 9, and heat is generated there which welds the closely contacting abutting faces of the first and second plastic components 1i and 2i. The laser beam 9 irradiated onto the heat generation portion 4 and the heat generated at the heat generation portion 4 are blocked by the heat blocking portions 5e and 5f and do not escape to outside of the heat blocking portions 5e and 5f, and instead the energy of the laser beam 9 that is irradiated onto the heat generation portion 4 changes to heat. When the welding control portion 8 causes the slide member 38 to slide, the size of the circle that the laser beam 9 draws on the heat generation portion 4 of the support member 3k changes, and the welding area of the closely contacting abutting faces of the first and second plastic components 1i and 2i cumulatively expands. Thus, in the laser welding apparatus according to the fifth embodiment of the present invention, the surface of a circular sheet made of a thermoplastic resin such as a thin polyamide resin as the first plastic component 1i can be welded to an end face of a hollow circular cylinder made of a thermoplastic resin such as a polyamide resin as the second plastic component 2i.

Sixth Embodiment

Figure 34:
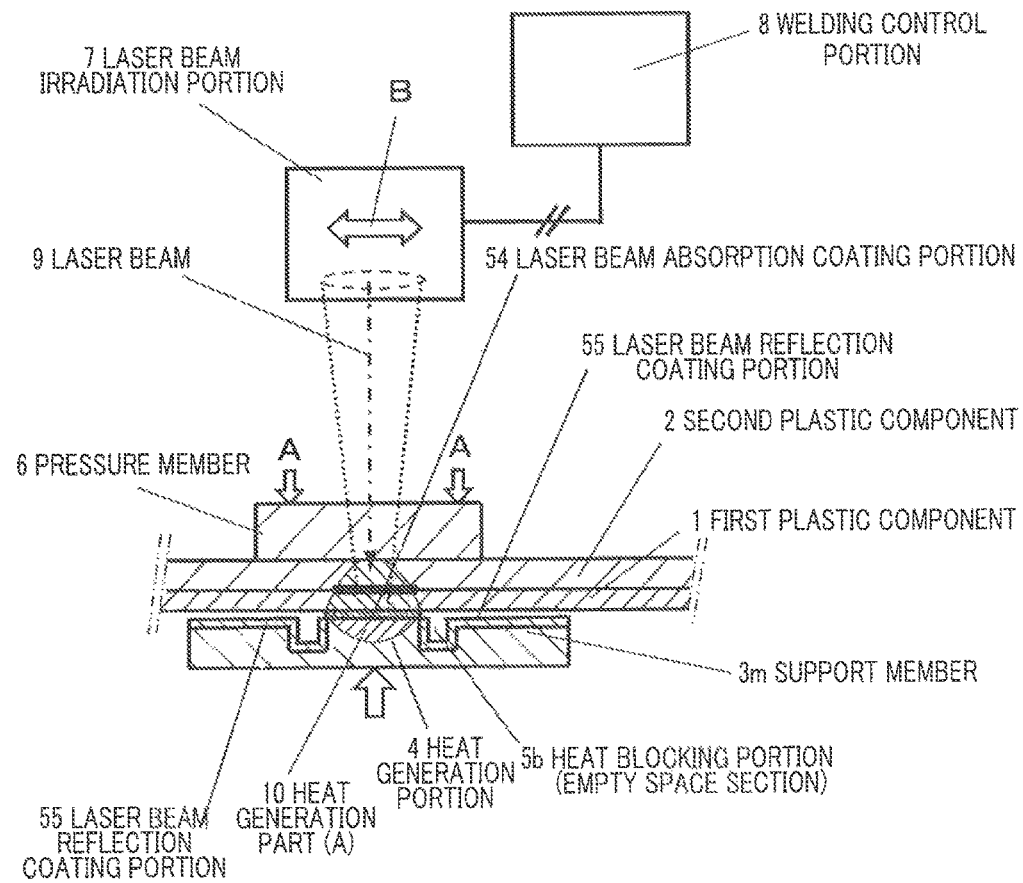
FIG. 34 is a view illustrating principles of a laser welding method according to a sixth embodiment of the present invention.

FIG. 34 is a view that illustrates principles of a laser welding method for welding first and second plastic components 1 and 2 that transmit a laser beam according to a sixth embodiment of the present invention. In the sixth embodiment of the present invention, the heat blocking portion 5b is formed that utilizes a heat insulation effect of an air layer by providing a groove-like empty space section by cutting away part of the periphery of the heat generation portion 4 of a support member 3m, and a resin that absorbs the laser beam 9 is coated onto the surface (upper face) of the heat generation portion 4 of the support member 3m to form a laser beam absorption coating portion 54. Further, a resin that reflects a laser beam is coated adjacent to the laser beam absorption coating portion 54 to form a laser beam reflection coating portion 55.

The first and second plastic components 1 and 2 are placed on the support member 3m and are pressed with the pressure member 6 to cause close contact between the abutting faces in the welding area of the first and second plastic components 1 and 2 and between the surface of the first plastic component 1 and the heat generation portion 4. The laser beam 9 is then converged and irradiated onto the heat generation portion 4 of the support member 3m by the laser beam irradiation portion 7 from above the first and second plastic components 1 and 2. In the sixth embodiment of the present invention, the laser beam absorption coating portion 54 absorbs the laser beam 9 faster than in a case where the surface of the stainless steel is not coated with resin that absorbs the laser beam 9. Therefore, at the heat generation part (A) 10 of the heat generation portion 4 of the support member 3m, laser beam energy concentrates in the vicinity of the position at which the laser beam 9 is irradiated and generates heat. The generated heat is transmitted to the first plastic component 1 which the upper face of the laser beam absorption coating portion 54 closely contacts and the second plastic component 2.

The first and second plastic components 1 and 2 that closely contact the heat generation portion 4 which includes the laser beam absorption coating portion 54 become a high temperature, and the temperature of the first and second plastic components 1 and 2 exceeds the melting temperature. Subsequently, the abutting portions of the first and second plastic components 1 and 2 are melted by the heat that is generated at the heat generation portion 4 which includes the laser beam absorption coating portion 54. When irradiation of the laser beam 9 of the laser beam irradiation portion 7 stops, heat generation of the heat generation portion 4 stops, and the first and second plastic components 1 and 2 cool and harden to thereby complete the welding.

Note that, when using a material with a favorable forming-release property such as Teflon (registered trademark) as the resin that is coated on the heat generation portion 4, there is the advantageous effect that the first and second plastic components 1 and 2 are easily peeled off from the heat generation portion 4 after welding is completed.

Figure 35:
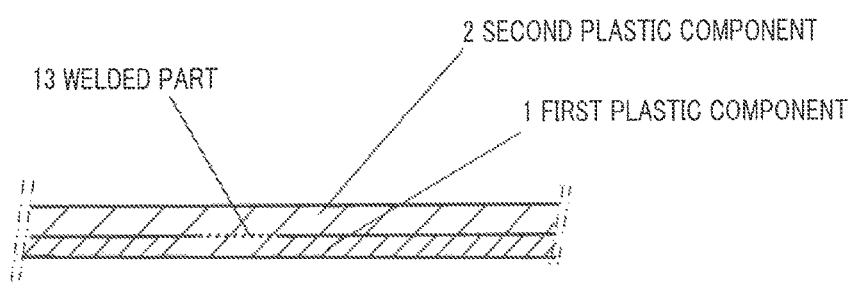
FIG. 35 is a cross-sectional view of plastic components that are welded by the laser welding method according to the sixth embodiment of the present invention.

FIG. 35 is a cross-sectional view of plastic components that were welded by the laser welding method according to the sixth embodiment of the present invention. In FIG. 35, on the abutting faces of the first and second plastic components 1 and 2, a welded part 13 which was welded by irradiation of the laser beam 9 by the laser beam irradiation portion 7 is indicated by a dotted line, and a non-welded area is indicated by a solid line to distinguish the range that is not welded from the welded part 13.

Note that, the laser beam irradiation portion 7 may be moved in directions that are orthogonal to the irradiation direction of the laser beam 9, such as being moved as indicated by an outline arrow B in the transverse direction that is shown in FIG. 34, and moved in the depth direction in FIG. 34. Further, the optical axis of the laser beam 9 may be deflected to change the irradiation angle of the laser beam 9. When the emitting position of the laser beam 9 is moved or the irradiation angle of the laser beam 9 is changed, the size of the face to be irradiated that the laser beam 9 is irradiated onto increases, and hence the welding area expands and the welding strength can be increased. This situation is the same as in the first embodiment.

Seventh Embodiment

Figure 36:
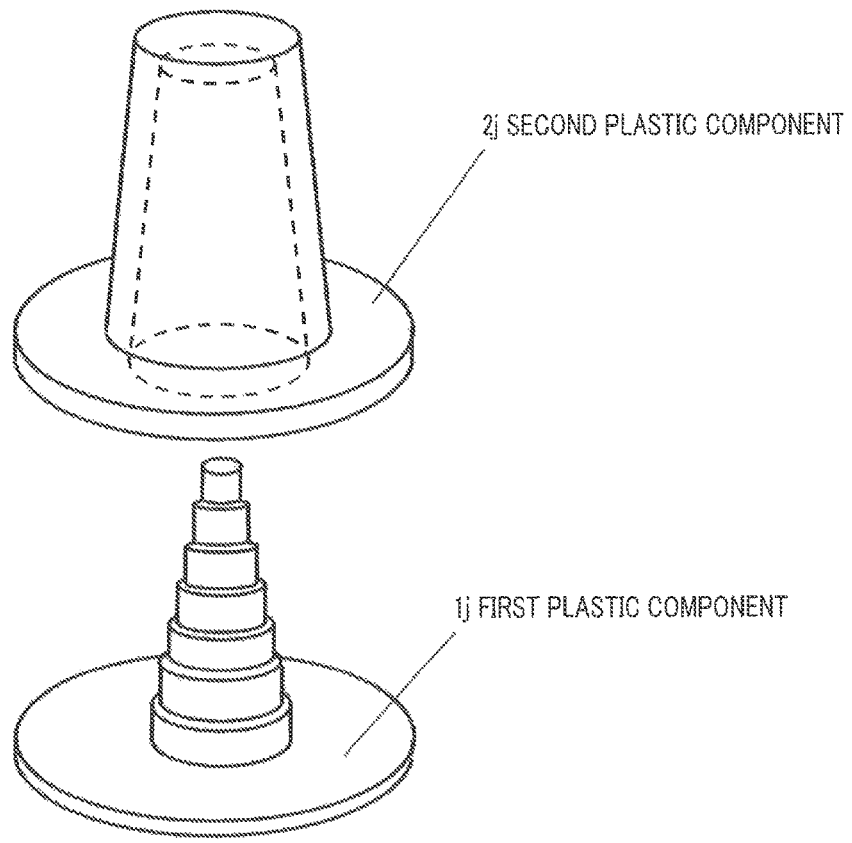
FIG. 36 is an exploded perspective view of plastic components to be welded using a laser welding apparatus according to a seventh embodiment of the present invention.
Figure 37:
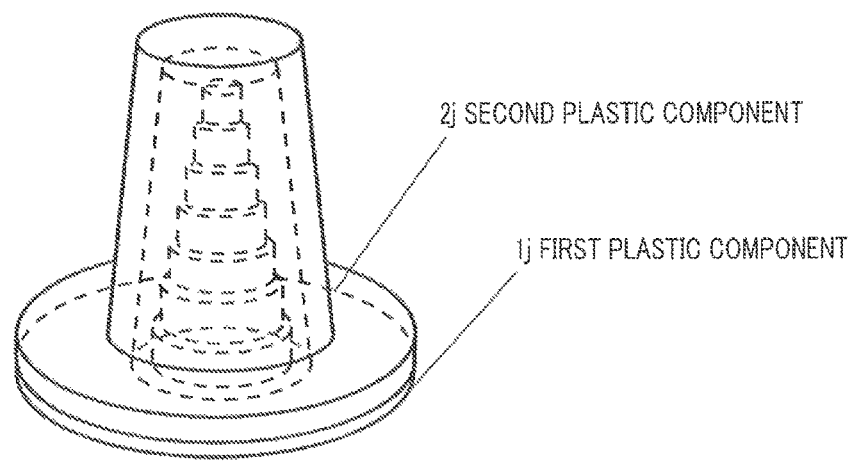
FIG. 37 is an external perspective view illustrating a state after the plastic components to be welded using the laser welding apparatus according to the seventh embodiment of the present invention are welded.
Figure 38:
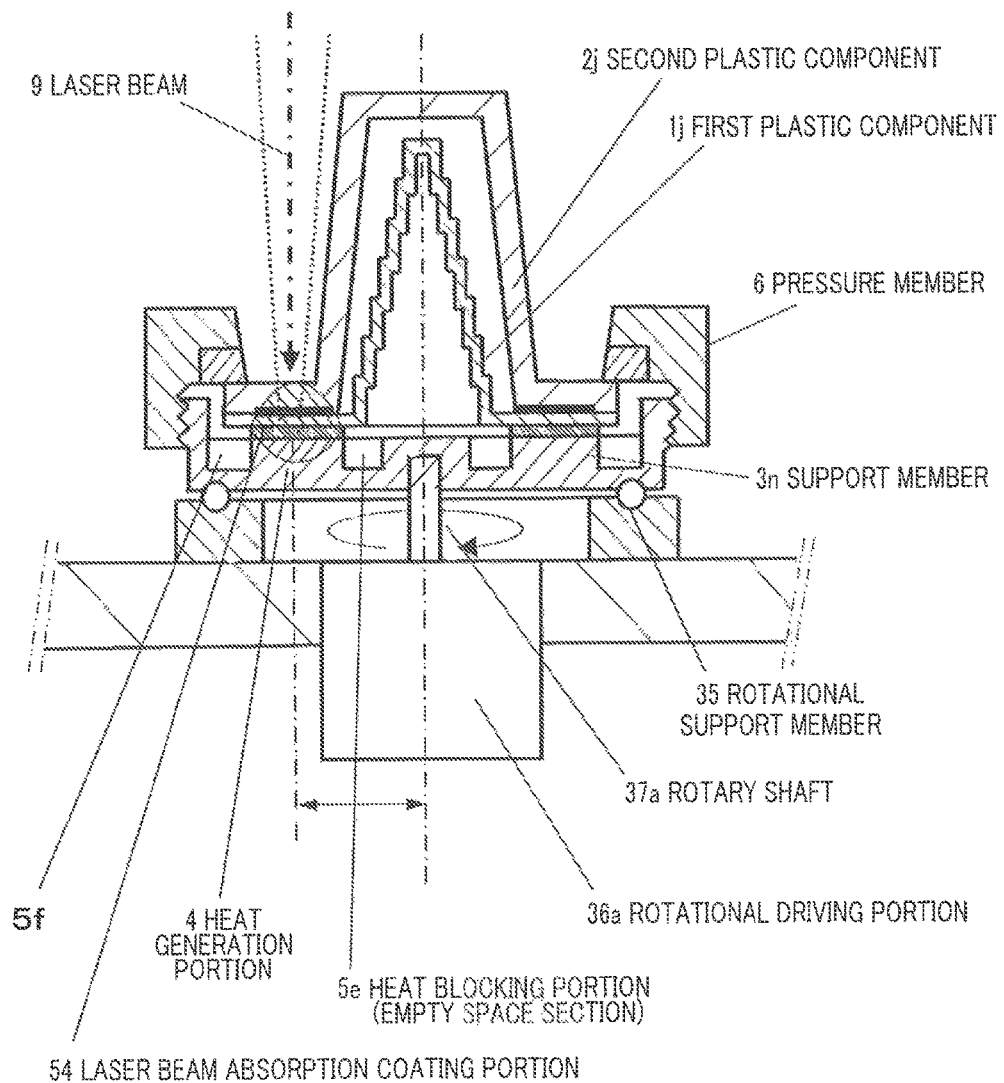
FIG. 38 is a cross-sectional view illustrating a principal portion of the laser welding apparatus according to the seventh embodiment of the present invention.

FIG. 36 is an exploded perspective view of plastic components to be welded by a laser welding apparatus according to a seventh embodiment of the present invention. FIG. 37 is an external perspective view illustrating a state after welding of the plastic components those are welded by the laser welding apparatus according to the seventh embodiment of the present invention. FIG. 38 is a view illustrating a principal portion of the laser welding apparatus according to the seventh embodiment of the present invention. Further, reference character 3n denotes a support member of the laser welding apparatus according to the seventh embodiment of the present invention.

In the seventh embodiment of the present invention, a first plastic component 1j is a stepped circular truncated cone on which a flange is formed, and a second plastic component 2j is a circular truncated cone on which a flange is formed. Each of the first and second plastic components 1j and 2j transmit a laser beam. The second plastic component 2j is covered over the first plastic component 1j, and the flanges are welded together. Further, on the abutting faces of the first and second plastic components 1j and 2j of the upper face of the heat generation portion 4 of a support member 3n, a resin that absorbs the laser beam 9 is coated onto an area corresponding to the welding area portion, to thereby form the laser beam absorption coating portion 54. In this connection, since other constituent portions of the laser welding apparatus are the same as in the laser welding apparatus according to the third embodiment of the present invention that is illustrated in FIG. 26, a description of duplicate portions is omitted here.

Figure 39A:
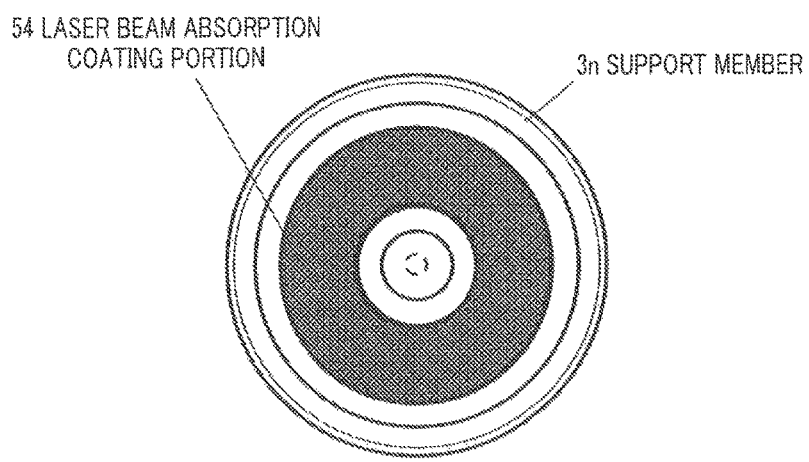
FIG. 39A is a plan view of a support member of the laser welding apparatus according to the seventh embodiment of the present invention.
Figure 39B:
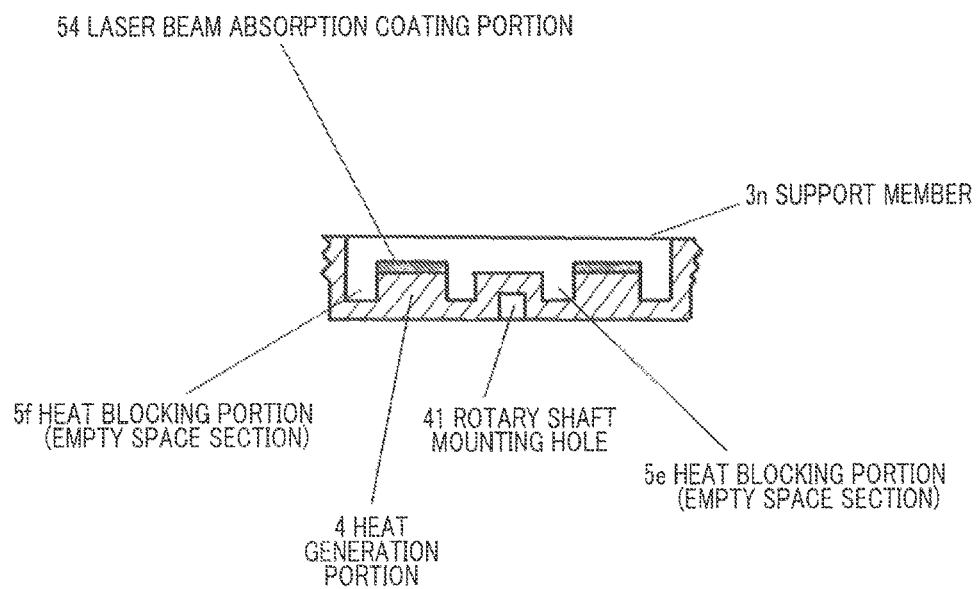
FIG. 39B is a cross-sectional view of the support member of the laser welding apparatus according to the seventh embodiment of the present invention.

FIG. 39A is a plan view of the support member 3n of the laser welding apparatus according to the seventh embodiment of the present invention. Heat blocking portions 5e and 5f are formed that utilize a heat insulation effect of an air layer by providing a groove-like empty space section by cutting away part of the periphery of the heat generation portion 4 of the support member 3n, and a resin that absorbs the laser beam 9 is coated onto the heat generation portion 4 of the support member 3n to form the laser beam absorption coating portion 54. FIG. 39B is a cross-sectional view of the support member 3n of the laser welding apparatus according to the seventh embodiment of the present invention.

Returning to FIG. 38, the welding control portion rotates the support member 3n using the rotational driving portion 36, and converges and irradiates the laser beam using the laser beam irradiation portion so that the laser beam draws a circle on the heat generation portion 4 of the support member 3n. Heat is generated at the heat generation portion 4 on which the laser beam drew the circle, and the heat welds the closely contacting abutting faces of the flanges of the first and second plastic components 1j and 2j. When the welding control portion causes a slider to slide, the emitting position of the laser beam changes from the shaft center of the rotary shaft 37a of the rotational driving portion 36a, and the size of the circle drawn by the laser beam on the heat generation portion 4 of the support member 3n changes. Further, the area of welding the closely contacting abutting faces of the flanges of the first and second plastic components 1j and 2j cumulatively expands. Thus, in the laser welding apparatus according to the seventh embodiment of the present invention, the flange of the stepped circular truncated cone as the first plastic component 1j can be welded to the flange of the circular truncated cone as the second plastic component 2j.

Eighth Embodiment

Figure 40A:
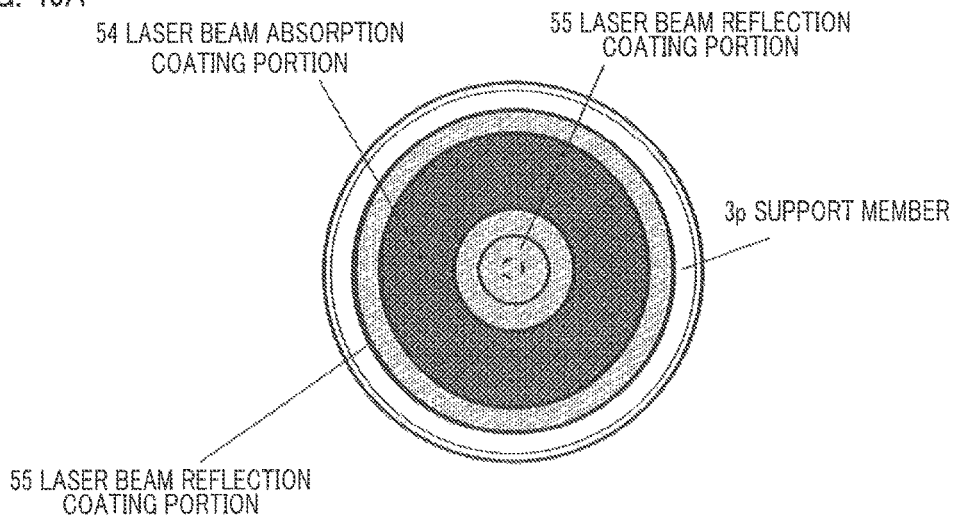
FIG. 40A is a plan view of another support member of the laser welding method according to the eighth embodiment of the present invention.
Figure 40B:
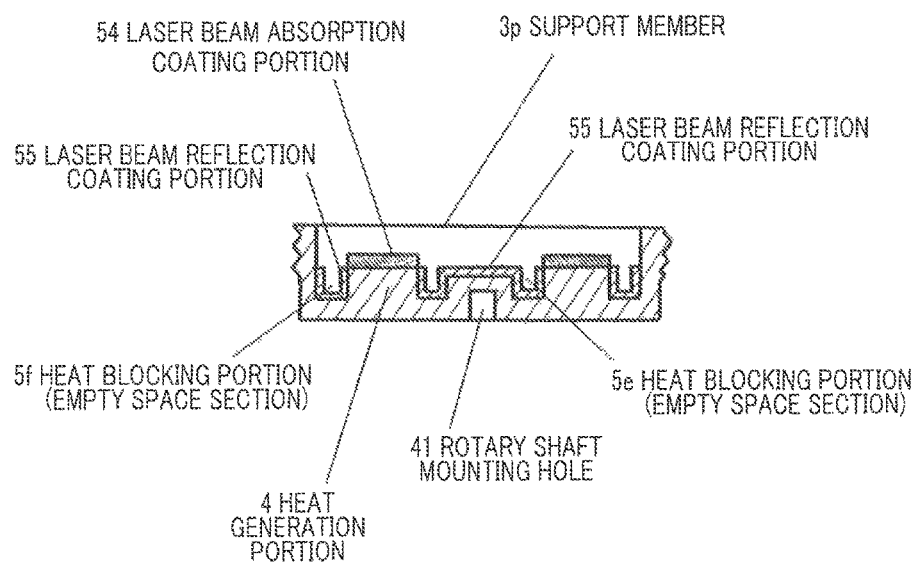
FIG. 40B is a cross-sectional view of another support member of the laser welding method according to the eighth embodiment of the present invention.

FIG. 40A and FIG. 40B are views illustrating another support member of a laser welding apparatus according to the eighth embodiment of the present invention. In the eighth embodiment of the present invention, heat blocking portions 5e and 5f are formed that utilize a heat insulation effect of an air layer by providing a groove-like empty space section by cutting away part of the periphery of the heat generation portion 4 of a support member 3p, and a resin that absorbs a laser beam is coated on the upper face of the heat generation portion 4 of the support member 3p to form the laser beam absorption coating portion 54. A laser-absorbing pigment that is an inorganic pigment such as iron oxide, or ink containing an infrared-absorbing dye, or black oil paint or the like is used as the laser beam absorbing material.

Further, a resin that reflects a laser beam is coated adjacent to the laser beam absorption coating portion 54 to form the laser beam reflection coating portion 55. Although originally, with respect to the abutting faces of the first and second plastic components, a laser beam is not irradiated outside an area corresponding to the welding area part, a configuration is adopted so that unnecessary heat generation does not occur outside an area corresponding to the abutting faces of the welding area of the first and second plastic components. There is thus the advantageous effect that efficient laser welding can be performed. FIG. 40A is a plan view of the support member 3p, and FIG. 40B is a cross-sectional view of the support member 3p.

Ninth Embodiment

Figure 41:
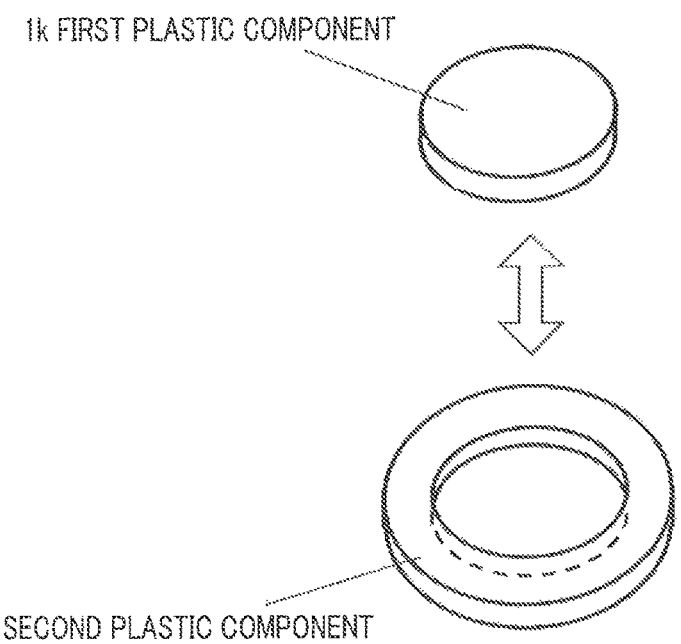
FIG. 41 is an exploded perspective view of plastic components to be welded using a laser welding apparatus according to a ninth embodiment of the present invention.
Figure 42:
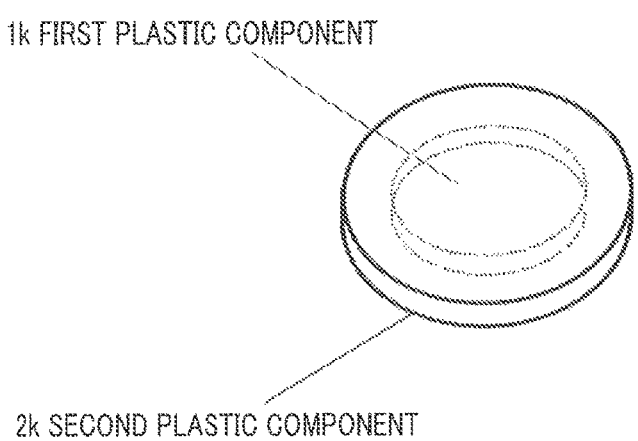
FIG. 42 is an external perspective view illustrating a state after the plastic components to be welded using the laser welding apparatus according to the ninth embodiment of the present invention are welded.

FIG. 41 is an exploded perspective view of plastic components to be welded by a laser welding method according to a ninth embodiment of the present invention. A first plastic component 1k is a thin circular plate, and a second plastic component 2k is an annular plate. The outer circumferential face of the circular plate that is the first plastic component 1k fits in the inner circumferential face of the hole of the annular plate that is the second plastic component 2k, and is fitted therein so that the outer circumferential face and the inner circumferential face closely contact with each other with a weak interference fit. In the ninth embodiment of the present invention, the outer circumferential face of the circular plate and the inner circumferential face of the hole of the annular plate are laser welded so as to be butt welded. FIG. 42 is an external perspective view of the plastic components when the plastic components were welded by the laser welding method according to the ninth embodiment of the present invention. In FIG. 42, a welded part is indicated by dotted lines. For example, when the thin circular plate of the first plastic component 1k is a material that is thin but flexible and without rigidity, the laser welding method according to the ninth embodiment of the present invention can be utilized to weld the first plastic component 1k to the outer frame of a hard material that has rigidity to form the two components into a single component that is easy to handle.

Figure 43:
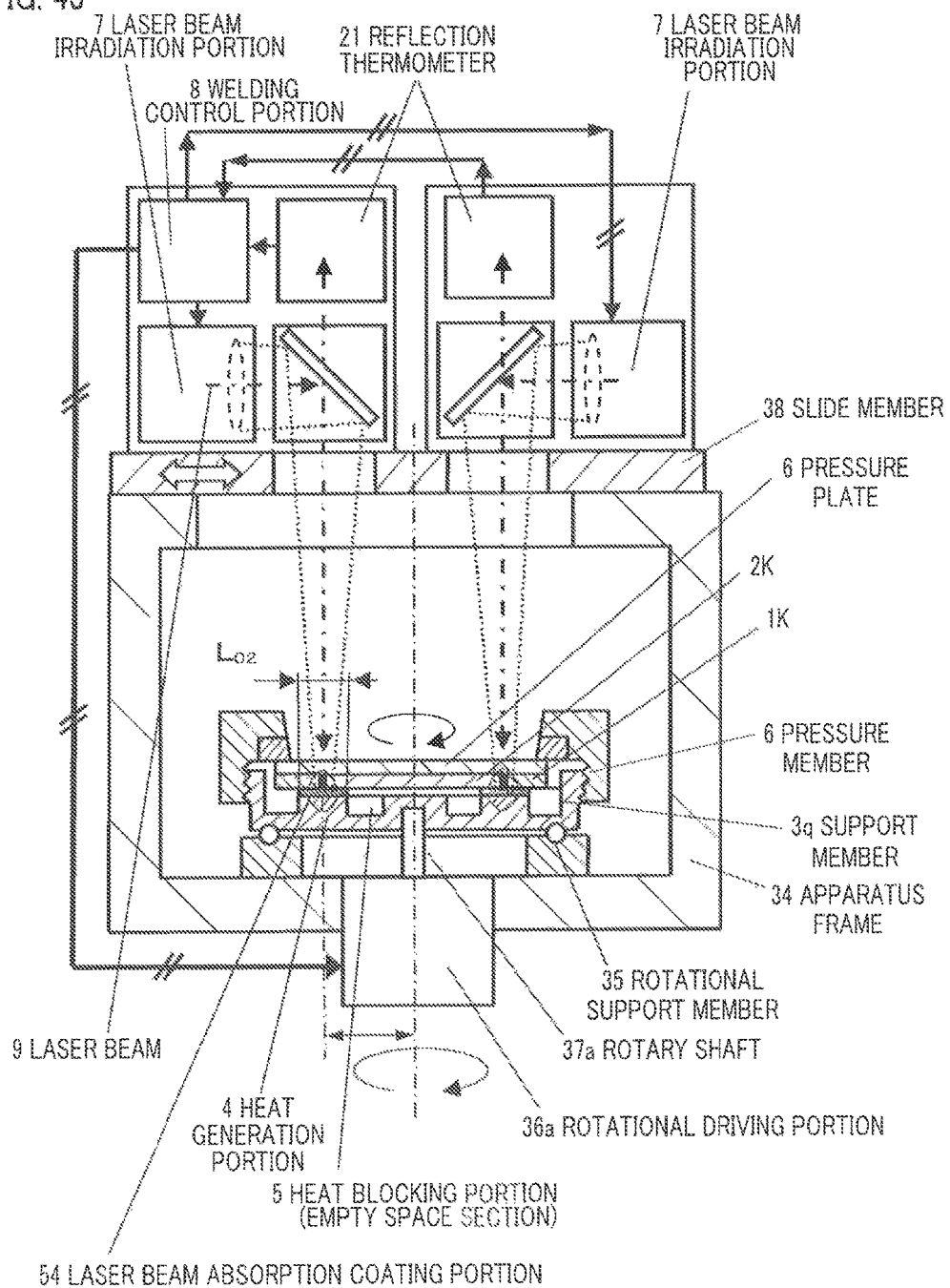
FIG. 43 is a view illustrating an overview of the laser welding apparatus according to the ninth embodiment of the present invention.

FIG. 43 is a schematic diagram of a laser apparatus of the ninth embodiment of the present invention. Two laser beam irradiation portions 7 are mounted on the apparatus frame 34 and irradiate laser beams at two places to simultaneously weld the fitting faces that are closely contacting of the first and second plastic components 1k and 2k that are shown in FIG. 41. If locations are available at which the dispose a plurality of the laser beam irradiation portions 7 in this manner, the efficiency can be raised. Note that a configuration may also be adopted so as to irradiate a laser beam from a single laser beam irradiation portion 7 at a plurality of places at the same time via a plurality of optical fibers. The configuration illustrated in FIG. 43 is the same as in the seventh embodiment described above that is illustrated in FIG. 38 with the exception that two laser beam irradiation portions 7 are provided and that laser welding is performed so as to butt weld the outer circumferential face of the circular plate of the first plastic component 1k and the inner circumferential face of the hole of the annular plate of the second plastic component 2k. Hence, a description of the respective portions and operations is omitted here.

In the foregoing a case is described in which a plastic component moving device is provided that, while maintaining a distance between a laser beam irradiation portion and a plurality of plastic components having a circular or annular shape which are sandwiched by a support member and a pressure member, rotationally moves the plurality of plastic components around the rotational axis 37a (in the horizontal direction) with respect to the laser beam emitting position of the laser beam irradiation portion.

Tenth Embodiment

Figure 44:
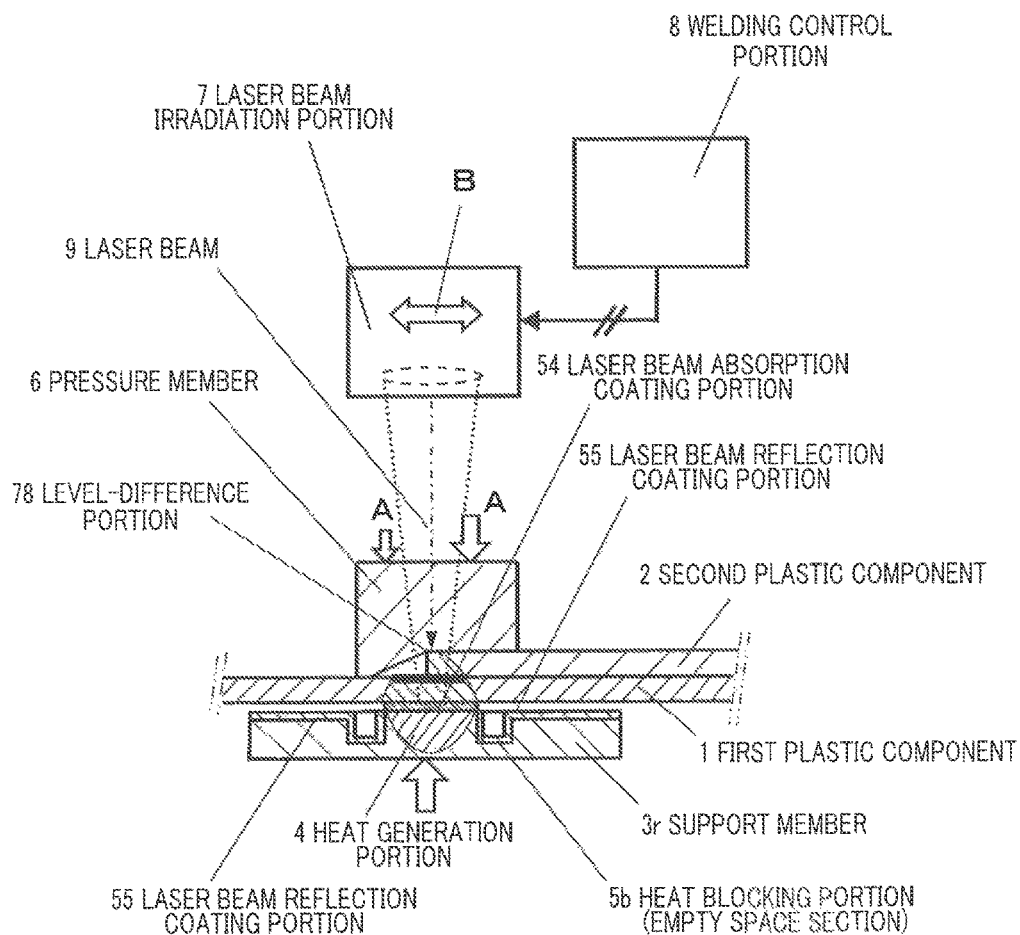
FIG. 44 is a view illustrating principles of a laser welding method according to a tenth embodiment of the present invention.

FIG. 44 is a view which relates to the tenth embodiment of the present invention and which illustrates the principles of a laser welding method for welding plate-shaped first and second plastic components 1 and 2 that transmit a laser beam. In FIG. 44, a heat blocking portion 5b is formed that utilizes a heat insulation effect of an air layer by providing a groove-like empty space section by cutting away part of the periphery of the heat generation portion 4 of a support member 3r, and a resin that absorbs the laser beam 9 is coated on an area which corresponds to the abutting faces in the welding area of the first and second plastic components 1 and 2 on the upper face of the heat generation portion 4 of the support member 3r to form the laser beam absorption coating portion 54. Further, a resin that reflects a laser beam is coated adjacent to the laser beam absorption coating portion 54 to form the laser beam reflection coating portion 55.

In the tenth embodiment of the invention, a configuration is adopted in which the pressure member 6 which is made of a material that has elasticity, for example, silicone rubber, is superposed on a level-difference portion 78 that is formed when an end portion of the second plastic component 2 is superposed on the first plastic component 1, and the first and second plastic components 1 and 2 are pressed by a pressing source indicated by arrows A so that the level-difference portion 78 and the abutting faces in the vicinity thereof of the first and second plastic components 1 and 2 closely contact.

The first and second plastic components 1 and 2 are placed on the support member 3r and are pressed with the pressure member 6 to cause the abutting faces of the first and second plastic components 1 and 2 to closely contact, and the laser beam 9 from the laser beam irradiation portion 7 is irradiated from above the first and second plastic components 1 and 2 onto the level-difference portion 78 of the laser beam absorption coating portion 54 of the heat generation portion 4 of the support member 3r, that is, the position at which the end face of the second plastic component 2 is located.

In the tenth embodiment of the present invention, the laser beam absorption coating portion 54 absorbs the laser beam 9 faster than in the case where the surface is stainless steel as it is. Therefore, in the heat generation portion 4 of the support member 3r, laser beam energy concentrates and generates heat in the vicinity of the position at which the laser beam 9 is irradiated, that is, the position of the end face of the second plastic component 2 that is the level-difference portion 78. Further, the generated heat is transmitted to the first plastic component 1 and the second plastic component 2 which the upper face of the laser beam absorption coating portion 54 is in close contact with.

The first and second plastic components 1 and 2 that are closely contacting the heat generation portion 4 having the laser beam absorption coating portion 54 become a high temperature, and the temperature exceed the melting temperature of the first and second plastic components 1 and 2. The abutting portions of the first and second plastic components 1 and 2 are then melted by the heat generated at the heat generation portion 4 having the laser beam absorption coating portion 54. At this time, since the end face of the second plastic component 2 which forms the level-difference portion 78 is pressed by the pressure member 6, the level-difference portion 78 is fused into the first plastic component 1, resulting in a smooth weld having no level difference. While performing this laser welding work, if, as described in the second embodiment, the plate-shaped first and second plastic components 1 and 2 are parally moved along the side of the level-difference portion 78, the plate-shaped first and second plastic components 1 and 2 will be welded in a form in which there is a smooth connection therebetween at the level-difference portion 78. When irradiation of the laser beam 9 of the laser beam irradiation portion 7 stops, heat generation of the heat generation portion 4 stops, and the first and second plastic components 1 and 2 cool and harden to complete the welding.

Figure 45:
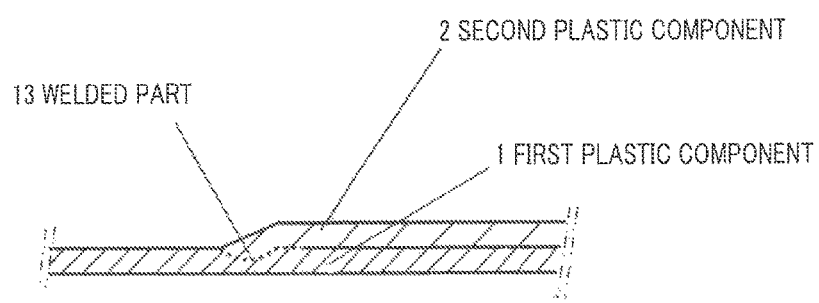
FIG. 45 is a cross-sectional view of plastic components that were welded by the laser welding method according to the tenth embodiment of the present invention.

FIG. 45 is a cross-sectional view of plastic components that were welded by the laser welding method according to the tenth embodiment of the present invention. The end face of the second plastic component 2 which forms the level-difference portion 78 is pressed by the pressure member 6 to thereby cause the level-difference portion 78 to be fused into the first plastic component 1, resulting in a smooth weld having no level difference. In FIG. 45, on the abutting faces of the first and second plastic components 1 and 2, the welded part 13 which was welded by irradiation of the laser beam 9 by the laser beam irradiation portion 7 is indicated by a dotted line, and a non-welded area is indicated by a solid line to distinguish the non-welded area from the welded part 13.

Eleventh Embodiment

Figure 46:
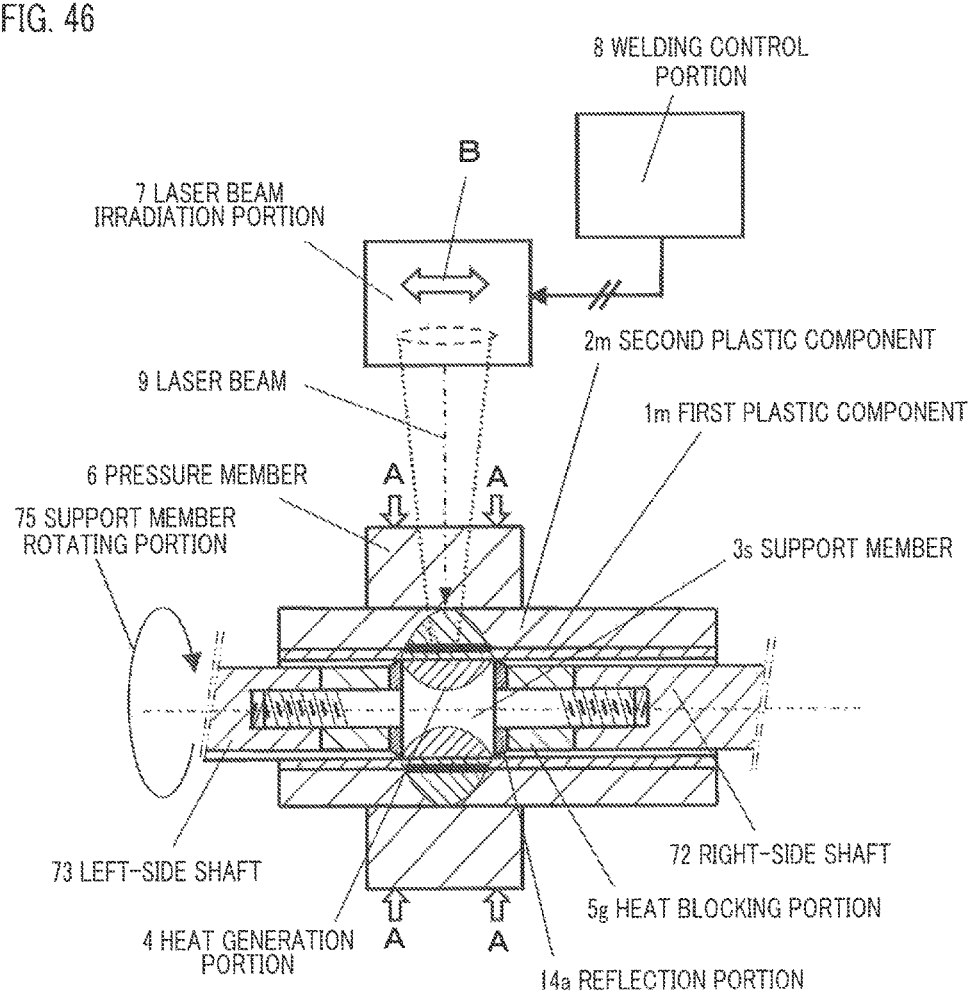
FIG. 46 is a view illustrating principles of a laser welding method according to an eleventh embodiment of the present invention.

FIG. 46 is a view illustrating principles of a laser welding apparatus according to an eleventh embodiment of the present invention. In the eleventh embodiment of the present invention, a first plastic component 1m having a tubular shape and a second plastic component 2m that similarly has a tubular shape are welded.

In FIG. 46, a support member 3s has a form which includes a cylindrical column portion at the center thereof and in which a narrow bar-shaped portion is caused to protrude from both end faces of the cylindrical column. The narrow bar-shaped portion includes a portion having a smooth outer circumference of a certain length, and threads are cut into the tips thereof. The portion having a smooth outer circumference of a certain length penetrates through reflection portions 14a that are annular plates made of reflective material that reflects a laser beam which are arranged so as to come in contact with both end faces of the cylindrical column portion, and then penetrates through heat blocking portions 5g which are formed in the shape of a hollow circular cylinder and are made of a heat insulating material such as gypsum. The thread parts that protrude after penetrating through the reflection portions 14a and the heat blocking portions 5g are screwed and fixed to a right-side shaft 72 and a left-side shaft 73 in each of which an internal thread is previously cut. Thus, in the support member 3s, the heat generation portion 4 is disposed at the center in the axial direction, the reflection portions 14a are disposed adjacent to (at two places at the respective ends of) the heat generation portion 4, and the heat blocking portions 5g are disposed (at two places on the left and right) on the outer sides of the reflection portions 14a.

As shown in FIG. 46, the first and second plastic components 1m and 2m are covered over the support member 3s in that order, and thereafter the tubular pressure member 6 that is made of elastic rubber that, when fitted, fastens the outer circumferences of the first and second plastic components 1m and 2m with an elastic force, and also transmits a laser beam is covered thereon. Because the internal diameter of the tubular pressure member 6 is smaller than the external diameter of the second plastic component, the elastic force of the pressure member serves as a pressing source as indicated by arrows A.

When the laser beam 9 is irradiated from the laser beam irradiation portion 7, the laser beam 9 is transmitted through the pressure member and the first and second plastic components 1m and 2m and is absorbed by the heat generation portion 4 of the support member 3s, and the first and second plastic components 1m and 2m can be welded by the heat of the heat generation portion 4.

Note that, the laser beam irradiation portion 7 may be moved in directions that are orthogonal to the irradiation direction of the laser beam 9, such as being moved in the axial direction of the support member 3s as indicated by an outline arrow B in the transverse direction in FIG. 46, and being moved around the axis of the support member 3s. Further, the optical axis of the laser beam 9 may be deflected to change the irradiation angle of the laser beam 9. When the emitting position of the laser beam 9 is moved or the irradiation angle of the laser beam 9 is changed, the size of the face to be irradiated that the laser beam 9 is irradiated onto increases, and consequently the welding area can be expanded and the welding strength can be increased. This situation is similar to the first embodiment.

Figure 47:
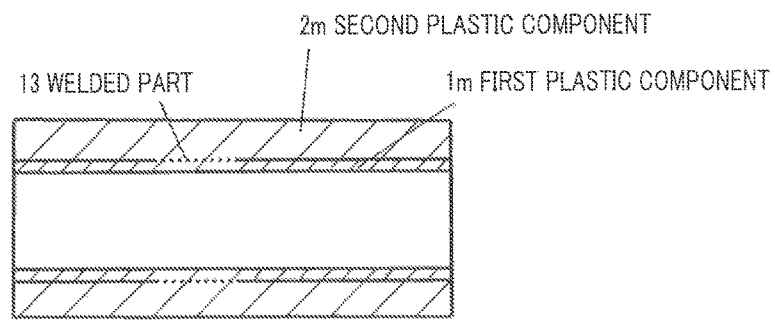
FIG. 47 is a cross-sectional view of plastic components that were welded by the laser welding method according to the eleventh embodiment of the present invention.

FIG. 47 is a cross-sectional view of plastic components having a tubular shape that were welded by the laser welding method according to the eleventh embodiment of the present invention. In FIG. 47, on the abutting faces of the first and second plastic components 1m and 2m, an area (welded part 13) which was welded by irradiation of the laser beam 9 by the laser beam irradiation portion 7 is indicated by a dotted line, and a non-welded area is indicated by a solid line to distinguish the non-welded area from the welded part 13.

Figure 48A:
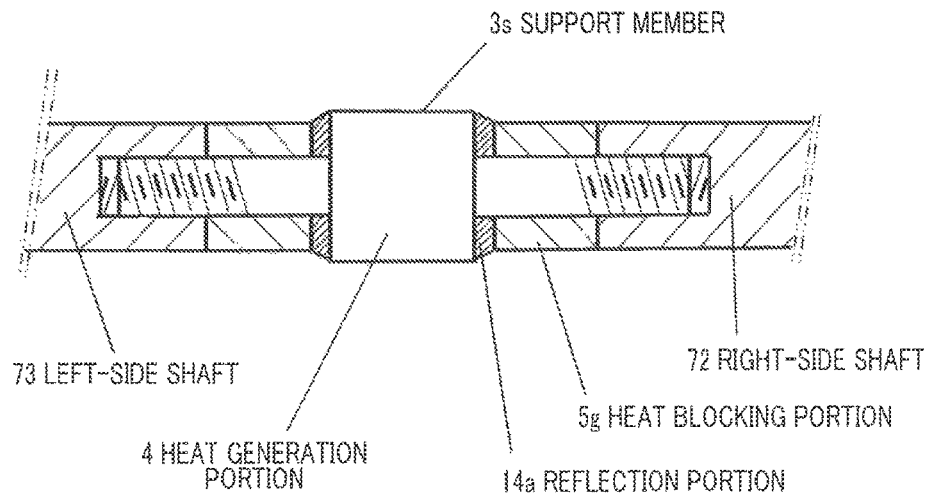
FIG. 48A is a view illustrating a configuration in which a reflection portion, a heat blocking portion, a right shaft and a left shaft are incorporated into a support member of the laser welding method according to the eleventh embodiment of the present invention.
Figure 48B:
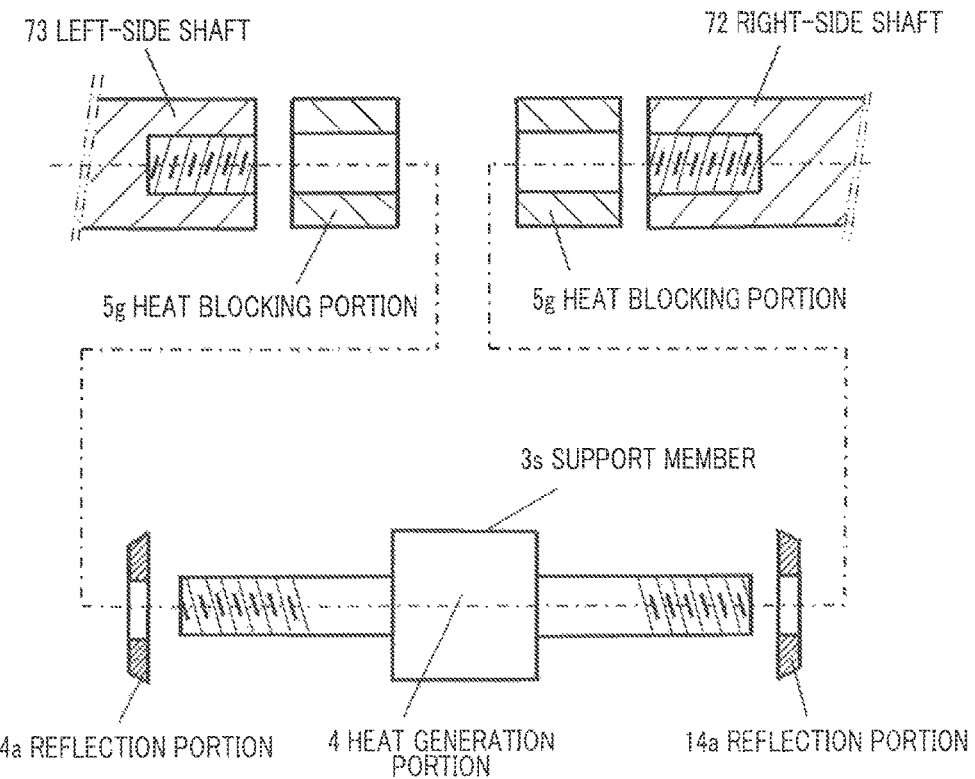
FIG. 48B is a view illustrating, in an exploded manner, a support member, a reflection portion, a heat blocking portion, a right shaft and a left shaft of the laser welding method according to the eleventh embodiment of the present invention.

To facilitate understanding of the invention, FIG. 48A is a view illustrating the shape of components in the vicinity of the heat generation portion 4, and illustrates a state in which the reflection portions 14 and the heat blocking portions 5 are attached to the right and left bar-shaped portions, respectively, that protrude at the two ends of the support member 3s having the heat generation portion 4, and the right-side shaft 72 and the left-side shaft 73 are screwed and fixed to the thread parts at the tips of the bar-shaped portions. FIG. 48B is an exploded view of these components. Since the external diameter of the heat generation portion 4 is greater than the respective external diameters of the reflection portion 14 and the heat blocking portion 5, when the first and second plastic components are fitted onto the heat generation portion 4 and pressed with the pressure member 6, the abutting faces of the first and second plastic components in the area that is supported by the heat generation portion 4 closely contact, and the heat generation portion 4 and the surface of the first plastic component that abuts against the heat generation portion 4 closely contact. The laser beam 9 is then irradiated toward the heat generation portion 4 from the laser beam irradiation portion 7. The laser beam 9 is absorbed by the heat generation portion 4 of the support member 3s, and the first and second plastic components 1 and 2 can be welded by heat of the heat generation portion 4.

Twelfth Embodiment

Figure 49:
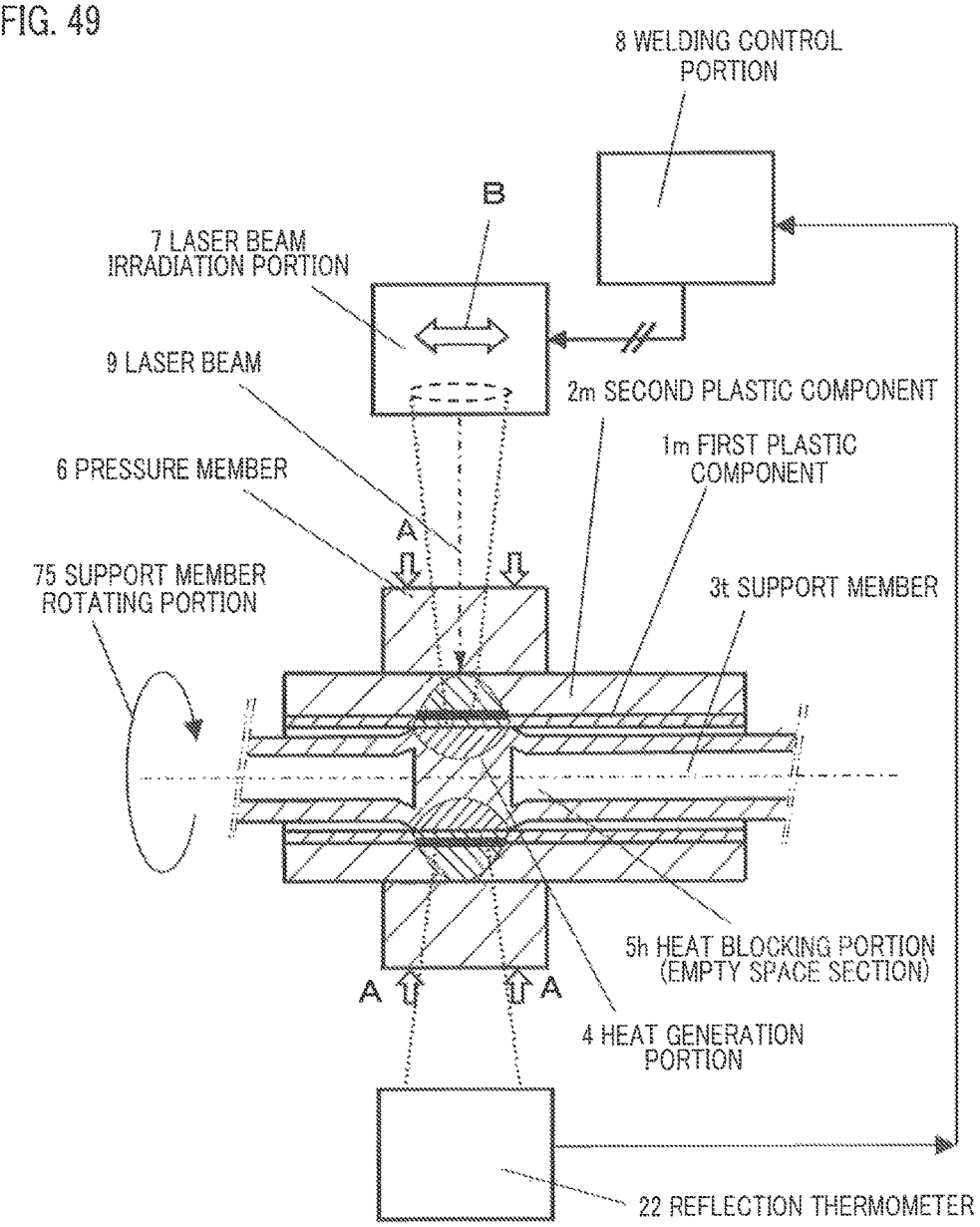
FIG. 49 is a view illustrating principles of a laser welding method according to a twelfth embodiment of the present invention.
Figure 50:
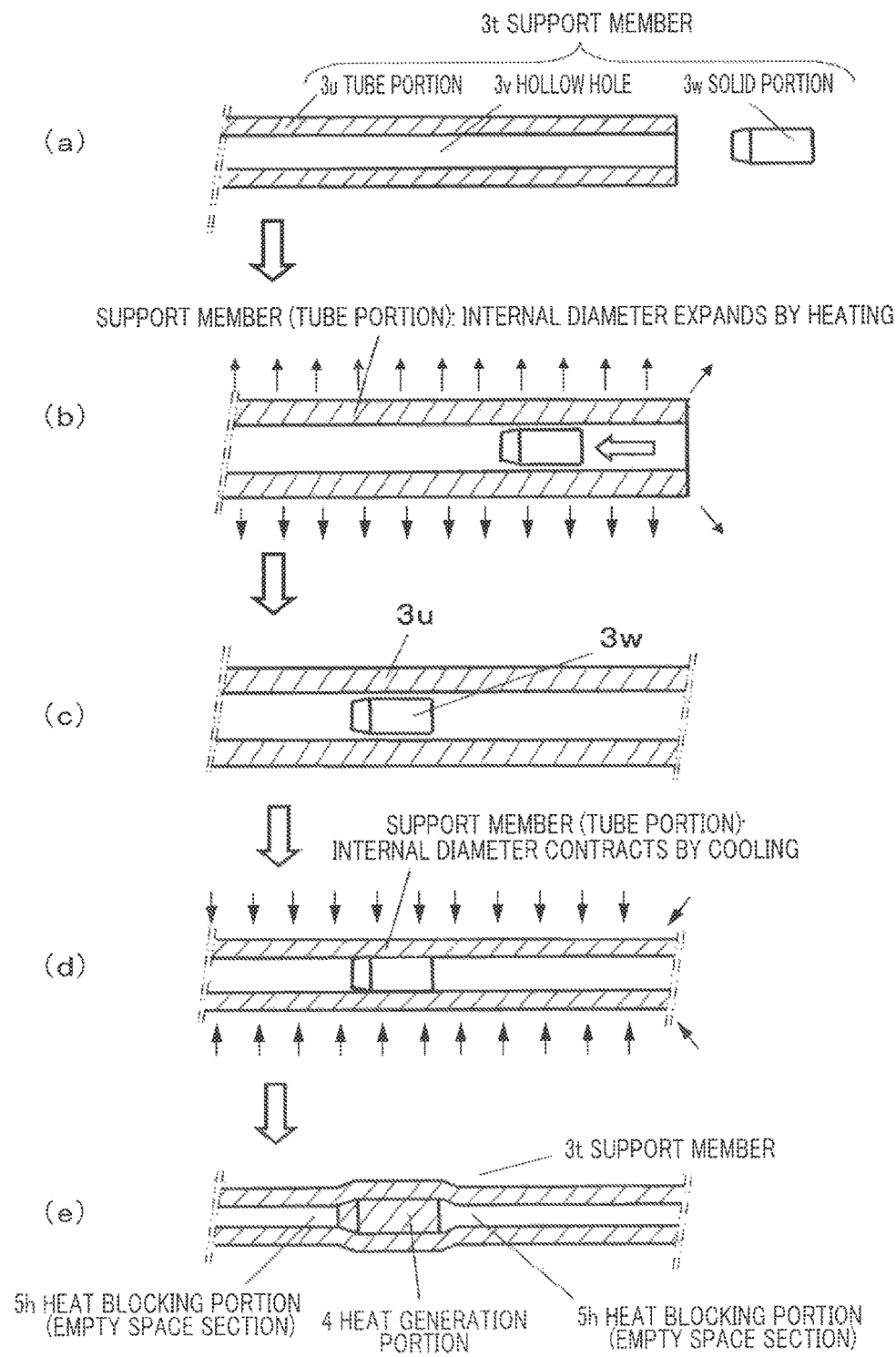
FIG. 50 is a view illustrating procedures for manufacturing a support member that is used in the laser welding method according to the twelfth embodiment of the present invention.

FIG. 49 is a view that illustrates principles of a laser welding apparatus according to a twelfth embodiment of the present invention. In the twelfth embodiment of the present invention, similarly to the eleventh embodiment, although the first plastic component 1m having a tubular shape and the second plastic component 2m that also has a tubular shape are welded, the structure of a support member 3t differs from the support member 3s of the eleventh embodiment. As described in detail later referring to FIG. 50, the support member 3t illustrated in FIG. 49 is formed by a method that subjects a solid portion 3w that is formed in a bar shape of a short length to thermal caulking in a hollow hole 3v of a tube portion 3u of the support member 3t formed in a tubular shape that has a hollow hole. The length of the solid portion 3w is approximately equal to the length of the welding area at which welding of the first and second plastic components 1m and 2m that have a tubular shape is to be performed, or as a longer length than the aforementioned length, the length of the solid portion 3w is made several-fold longer than the length of the welding area when allowing some margin to ensure secure welding.

As shown in FIG. 49, the first and second plastic components 1m and 2m are covered over the support member 3t in that order, and thereafter the pressure member 6 is covered thereon to thereby enter a state in which, on the abutting faces of the first and second plastic components 1m and 2m, areas that correspond to the heat generation portion 4 are caused to come in close contact with each other, and furthermore, the surface of the first plastic component 1m and the heat generation portion 4 are caused to closely contact. The laser beam 9 is then irradiated toward the heat generation portion 4 from the laser beam irradiation portion 7. Thereupon, the laser beam 9 is absorbed by the heat generation portion 4 of the support member 3t, and the first and second plastic components 1m and 2m can be welded by heat from the heat generation portion 4.

Note that, the laser beam irradiation portion 7 may be moved in directions that are orthogonal to the irradiation direction of the laser beam 9, such as being moved in the axial direction of the support member 3t as indicated by an outline arrow B in the transverse direction in FIG. 49, and being moved around the axis of the support member 3t. Further, the optical axis of the laser beam 9 may be deflected to change the irradiation angle of the laser beam 9. When the emitting position of the laser beam 9 is moved or the irradiation angle of the laser beam 9 is changed, the size of the face to be irradiated that the laser beam 9 is irradiated onto increases, and consequently the welding area can be expanded and the welding strength can be increased. This situation is similar to the first embodiment.

FIG. 50(a) to (e) are views that illustrate procedures for manufacturing the support member 3t that is used in the laser welding apparatus according to the twelfth embodiment of the present invention. FIG. 50(a) illustrates a state in which the tube portion 3u of the support member and the solid portion 3w are separate from each other prior to inserting the solid portion 3w into the tube portion 3u. FIG. 50(b) illustrates a state in which the tube portion 3u is heated to expand and enlarge the internal diameter of the hollow hole 3v, and the solid portion 3w is inserted from one end into the hollow hole 3v by pushing in the solid portion 3w with an unshown narrow rod or the like. FIG. 50(c) illustrates a state in which the solid portion 3w is pushed in as far as a predetermined position in the hollow hole 3v and heating of the tube portion 3u is stopped. FIG. 50(d) illustrates a state in which the tube portion 3u cools, and the internal diameter of the hollow hole 3v contracts and the tube portion 3u grips the outer surface of the solid portion 3w. FIG. 50(e) illustrates a state in which, while the solid portion 3w remains gripped by the tube portion 3u, the tube portion 3u completely cools and the solid portion 3w is integrally fixed inside the hollow hole 3v of the tube portion 3u.

In the support member 3t in which the solid portion 3w is integrally fixed inside the hollow hole 3v as described above, the part at which the solid portion 3w is inserted fulfills the function of the heat generation portion 4 of the support member 3t, and the hollow hole 3v on both sides of the heat generation portion 4 functions as the heat blocking portion 5h that blocks heat of the heat generation portion 4.

Figure 51:
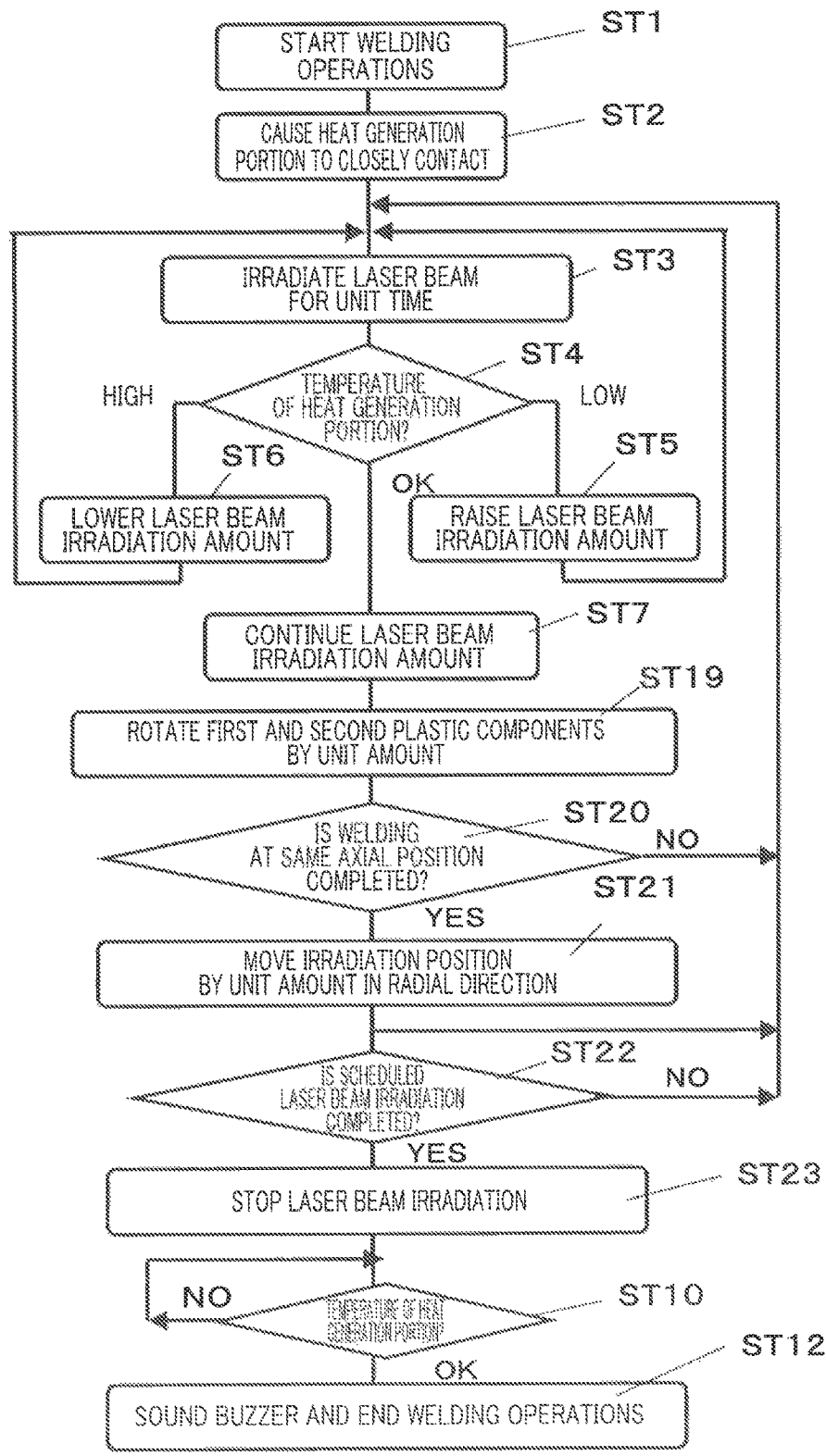
FIG. 51 is a flowchart of welding operations of the laser welding method according to the twelfth embodiment of the present invention.

FIG. 51 is a flowchart of welding operations of the laser welding apparatus according to the twelfth embodiment of the present invention. In FIG. 51, operations from step ST1 to step 7 are the same as in FIG. 13 that is described above, and hence a description thereof is omitted here. In FIG. 51, when the temperature of the heat generation portion 4 has entered the predetermined first temperature range, laser beam irradiation is continued (step ST7), and the support member 3t and the first and second plastic components 1m and 2m are rotated by a unit amount (for example, a ¼ rotation or a ⅓ rotation) by a support member rotating portion 75 (step ST19). Subsequently, upon the support member 3t and the first and second plastic components 1m and 2m being rotated for a predetermined number of rotations required for welding at the same axial position (predetermined position in the axial direction), it is regarded that welding at the same axial position is completed (step ST20), and the emitting position of the laser beam is moved by a unit amount (for example, an amount corresponding to the size of a diameter of a spot of irradiation of the laser beam) in the axial direction (step ST21). Subsequently, upon the end of the scheduled movement in the axial direction, it is regarded that the scheduled irradiation of the laser beam is completed (step ST22), and the laser beam irradiation is stopped (step ST23). The heat generation portion 4 then cools, and upon the temperature of the heat generation portion 4 cooling as far as a predetermined second temperature range (step ST10), a buzzer is sounded and the welding work is ended (step ST12).

In this way, the laser welding apparatus according to the twelfth embodiment of the present invention welds first and second plastic components that have a tubular shape.

Thirteenth Embodiment

FIG. 52 is a view illustrating procedures for inserting a heat insulating material into a support member of a laser welding apparatus according to a thirteenth embodiment of the present invention. In the thirteenth embodiment of the present invention, a heat insulating material 86 such as glass fiber is used that is packed into both ends of the heat generation portion of the support member 3t that supports tubular first and second plastic components.

FIG. 52(a) to (c) are views that illustrate procedures for putting the heat insulating material into the support member 3t that is used in the laser welding apparatus according to the thirteenth embodiment of the present invention. FIG. 52(a) illustrates a state in which the support member 3t and the heat insulating material 86 are separate from each other prior to inserting the heat insulating material 86 into the tube portion 3u of the support member 3t. FIG. 52(b) illustrates a state during a process of pushing the heat insulating material 86 into the hollow hole 3v and disposing the heat insulating material 86 in the vicinity of the heat generation portion 4 using a thin rod or the like that is not shown in the drawings. FIG. 52(c) illustrates a state in which the heat insulating material 86 is disposed in the vicinity of the heat generation portion 4. By pushing the heat insulating material 86 such as glass fiber in as far as positions that are adjacent to the heat generation portion 4 from openings of the hollow hole 3v to thereby arrange the heat insulating material 86 at both end faces of the heat generation portion 4 in this way, a heat insulation effect of glass fiber or the like can be achieved and a function as a heat blocking portion can be obtained.

Fourteenth Embodiment

In the fourteenth embodiment of the present invention, a resin that absorbs a laser beam is coated on an area corresponding to abutting faces of a welding area of first and second plastic components on the upper face of the heat generation portion 4 of a support member 3x to form a laser beam absorption coating portion 96.

Figure 53A:
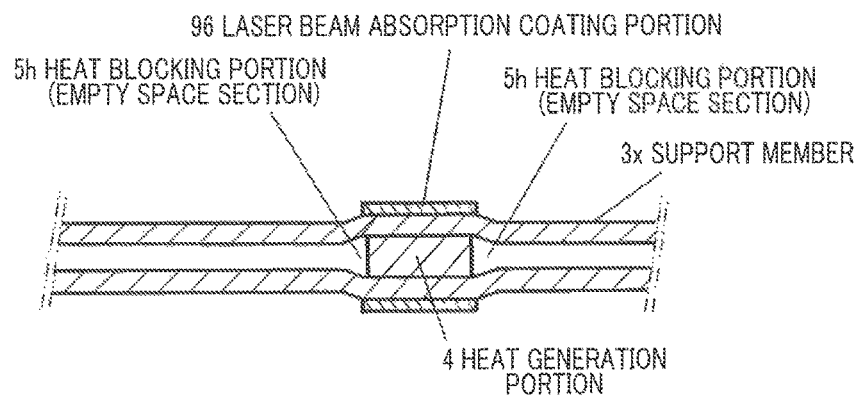
FIG. 53A is a cross-sectional view of a support member that is used in a laser welding method according to a fourteenth embodiment of the present invention.
Figure 53B:
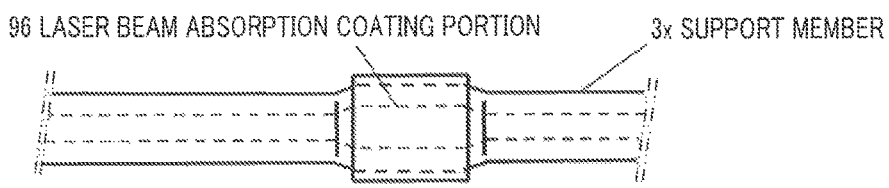
FIG. 53B is an external view of the support member that is used in the laser welding method according to the fourteenth embodiment of the present invention.

FIG. 53A is a cross-sectional view of the support member 3x that is used in a laser welding apparatus according to the fourteenth embodiment of the present invention. FIG. 53B is an external view of the support member 3x that is used in the laser welding apparatus according to the fourteenth embodiment of the present invention.

The aforementioned support member 3x is used instead of the support member 3t of the twelfth embodiment of the present invention illustrated in FIG. 49 that has been described above, and the first and second plastic components and the pressure member are covered over the support member 3x in that order. When a laser beam is irradiated from the laser beam irradiation portion, the laser beam is absorbed by the heat generation portion 4 from the laser beam absorption coating portion 96 of the support member 3x, and the first and second plastic components 1 and 2 can be welded by heat of the heat generation portion 4.

Fifteenth Embodiment

In the fifteenth embodiment of the present invention, as shown in FIG. 54, a resin that absorbs a laser beam is coated on an area corresponding to abutting faces of a welding area of first and second plastic components on the upper face of the heat generation portion 4 of a support member 3y to form the laser beam absorption coating portion 96. Further, a resin that reflects a laser beam is coated at two places that are adjacent on the left and right to the laser beam absorption coating portion 96 to form laser beam reflection coating portions 97.

Figure 54A:
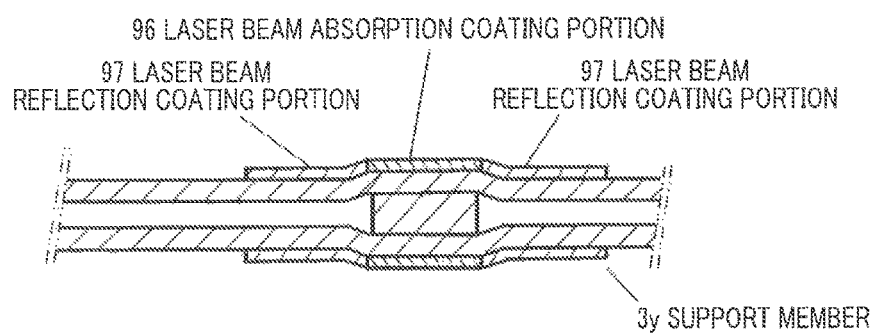
FIG. 54A is a cross-sectional view of a support member that is used in a laser welding method according to a fifteenth embodiment of the present invention.
Figure 54B:
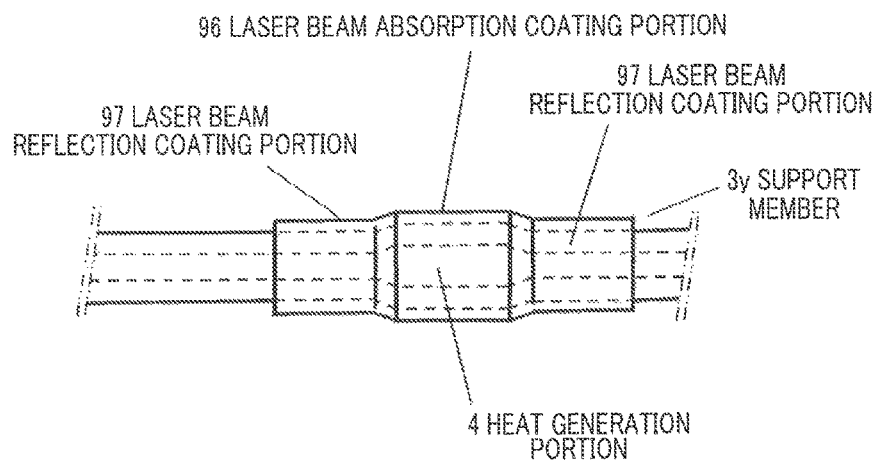
FIG. 54B is an external view of the support member that is used in the laser welding method according to the fifteenth embodiment of the present invention.

FIG. 54A is a cross-sectional view of the support member 3y that is used in a laser welding apparatus according to the fifteenth embodiment of the present invention. FIG. 54B is an external view of the support member 3y that is used in the laser welding apparatus according to the fifteenth embodiment of the present invention.

The support member 3y illustrated in FIG. 54 is used instead of the support member 3x illustrated in FIG. 53 that is described above, and the first and second plastic components and the pressure member are covered over the support member 3y in that order. When a laser beam is irradiated from the laser beam irradiation portion, the laser beam is absorbed by the heat generation portion 4 from the laser beam absorption coating portion 96 of the support member 3y, and the first and second plastic components can be welded by heat of the heat generation portion 4. Further, by forming the laser beam reflection coating portions 97, it is possible to ensure that unnecessary heat generation does not occur at portions adjacent to the heat generation portion 4, that are portions which the laser beam is originally not scheduled to be irradiated onto.

Sixteenth Embodiment

Figure 55:
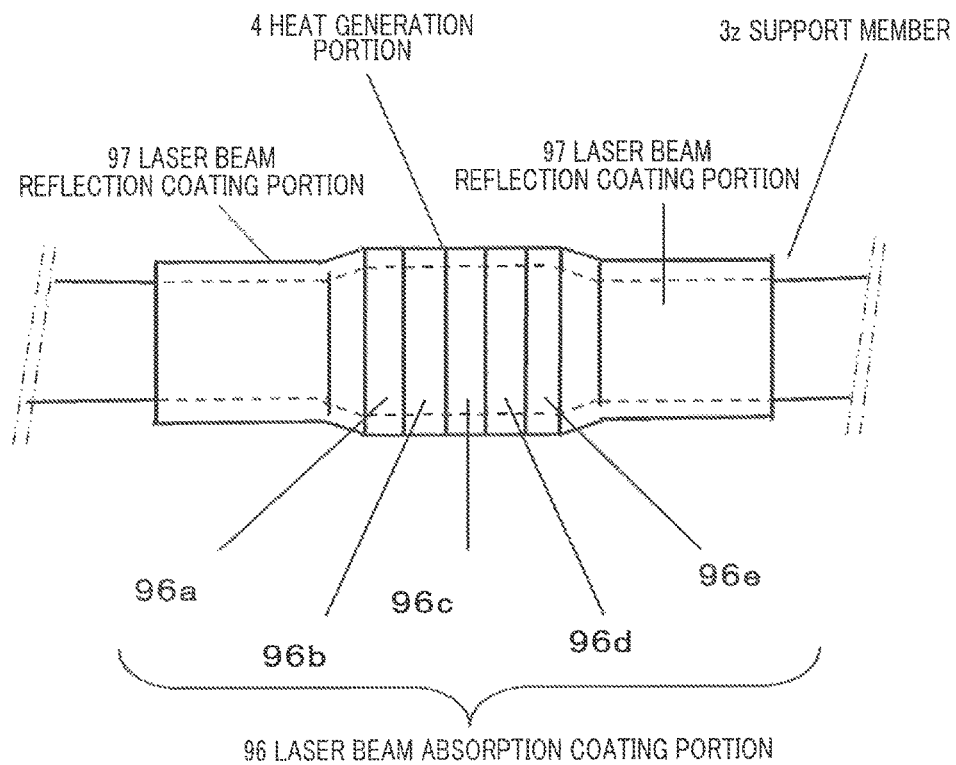
FIG. 55 is a partial enlarged view of the outer appearance of a support member of a laser welding method according to a sixteenth embodiment of the present invention.

In the sixteenth embodiment of the present invention, as shown in FIG. 55, an area corresponding to abutting faces of a welding area of first and second plastic components on the upper face of the heat generation portion 4 of a support member 3z is divided into a plurality of regions (for example, 96a to 96e) in the axial direction, and resins having different laser beam absorptivities are coated on the respective regions to thereby form a laser beam absorption coating portion 96. Further, as shown in FIG. 56, in the laser beam absorption coating portion 96, it is possible to select and utilize a heat generation portion having, as a pattern A, a tendency such that the laser beam absorptivity of the region 96a is low, the laser beam absorptivity of the region 96b is medium, the laser beam absorptivity of the region 96c is high, the laser beam absorptivity of the region 96d is medium, and the laser beam absorptivity of the region 96e is low, or to select a heat generation portion having the tendency of pattern B or pattern C. FIG. 56 shows combinations of the laser beam absorptivities of the regions 96a to 96e of pattern A, pattern B and pattern C in the form of a table. Further, in FIG. 57, combinations of the laser beam absorptivities of the regions 96a to 96e of pattern A, pattern B and pattern C are visually illustrated. That is, in pattern A the absorptivity at the center of the heat generation portion is high in a manner that forms a chevron shape, in pattern B the absorptivity in the vicinity of the center of the heat generation portion is high on average, and in pattern C the absorptivity at both ends of the heat generation portion is high.

Thus, since a desired tendency can be applied with respect to the laser beam absorptivity of the heat generation portion, the degree of welding can be made strong or weak depending on the position.

Seventeenth Embodiment

Figure 58:
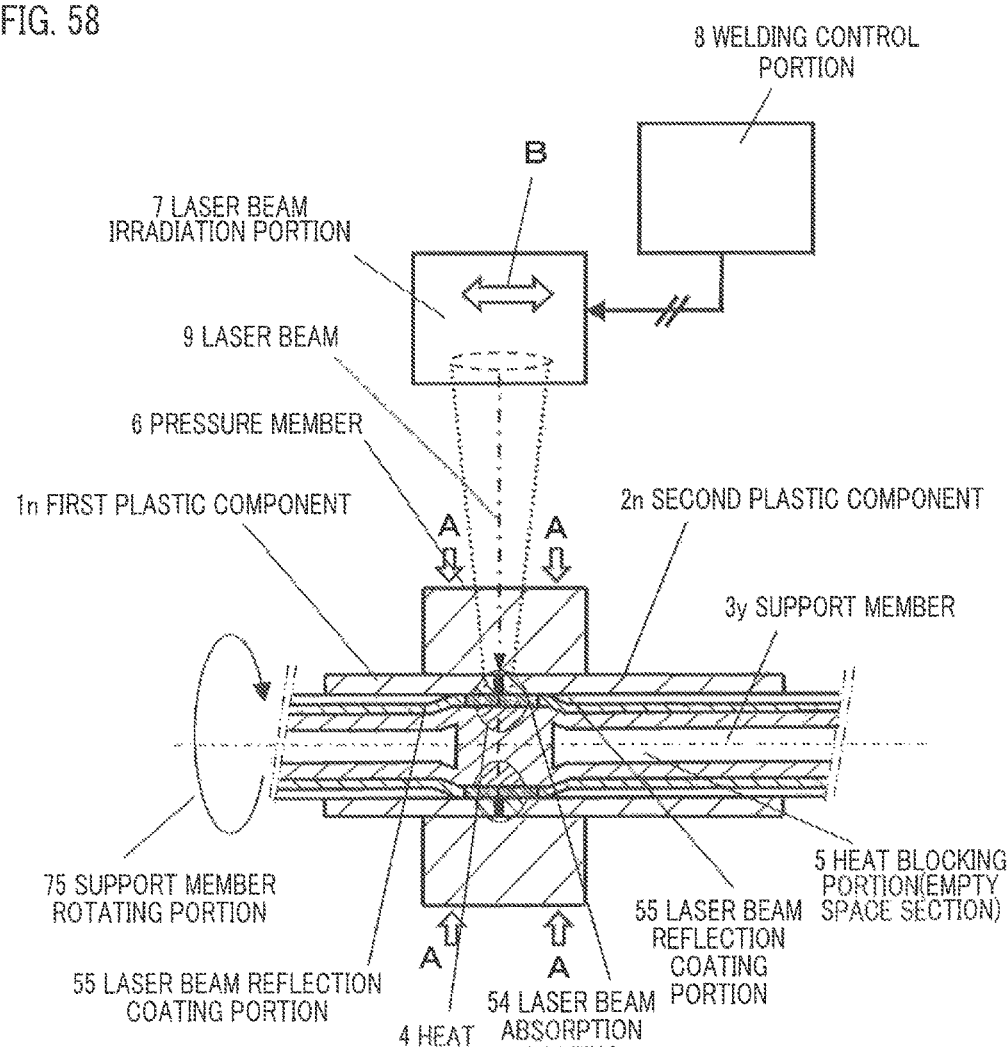
FIG. 58 is a view that illustrates principles of a laser welding method according to a seventeenth embodiment of the present invention.

FIG. 58 is a view that illustrates principles of a laser welding method according to a seventeenth embodiment of the present invention. In FIG. 58, with respect to the middle position of the heat generation portion of the support member 3y, a first plastic component 1n having a tubular shape is covered over the left side of the support member 3y, a second plastic component 2n having a tubular shape is covered over the right side of the support member 3y, the respective end faces of the first and second plastic components 1n and 2n are butted together, and the vicinity centered on the butted end faces is pressed with the tubular pressure member 6 that transmits a laser beam to cause the end faces that are abutting faces to closely contact. Reference numeral 75 denotes an unshown rotating portion of the support member 3y. An end of the support member 3y that is formed in a pipe shape is held by a chuck or the like, and the support member 3y is rotated around its own axis by the rotating portion 75.

When the rotating portion 75 of the support member 3y and the laser beam irradiation portion 7 are controlled by the welding control portion 8 so that the laser beam 9 is irradiated by the laser beam irradiation portion 7 onto the abutting portion of the end faces of the first and second plastic components 1n and 2n while rotating the first and second plastic components 1n and 2n, the heat generation portion 4 of the support member 3y absorbs the laser beam and generates heat to thereby weld the closely contacting end faces of the first and second plastic components 1n and 2n.

Note that, the laser beam irradiation portion 7 may be moved in directions that are orthogonal to the irradiation direction of the laser beam 9, such as being moved in the axial direction of the support member 3s as indicated by an outline arrow B in the transverse direction in FIG. 58, and being moved around the axis of the support member 3s. Further, the optical axis of the laser beam 9 may be deflected to change the irradiation angle of the laser beam 9. When the emitting position of the laser beam 9 is moved or the irradiation angle of the laser beam 9 is changed, the size of the face to be irradiated that the laser beam 9 is irradiated onto increases, and consequently the welding area can be expanded and the welding strength can be increased. This situation is similar to the first embodiment.

Figure 59:
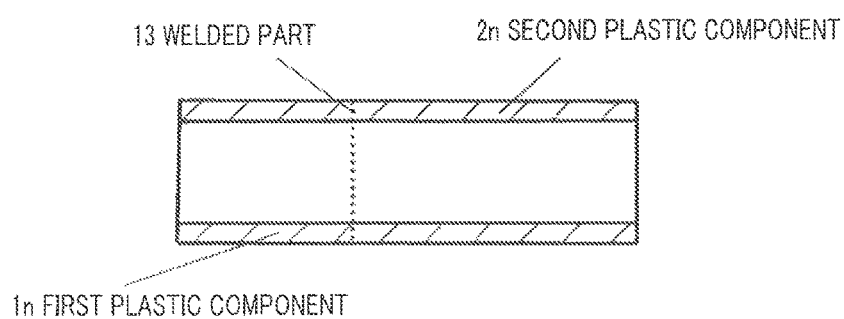
FIG. 59 is a cross-sectional view of plastic components that are welded by the laser welding method according to the seventeenth embodiment of the present invention.

FIG. 59 is a cross-sectional view of plastic components that were welded by the laser welding method according to the seventeenth embodiment of the present invention. The dotted line indicates that the abutting faces where the end face of the first plastic component $1n$ on the left side and the end face of the second plastic component $2n$ on the right side were butted together are welded.

Eighteenth Embodiment

Figure 60:
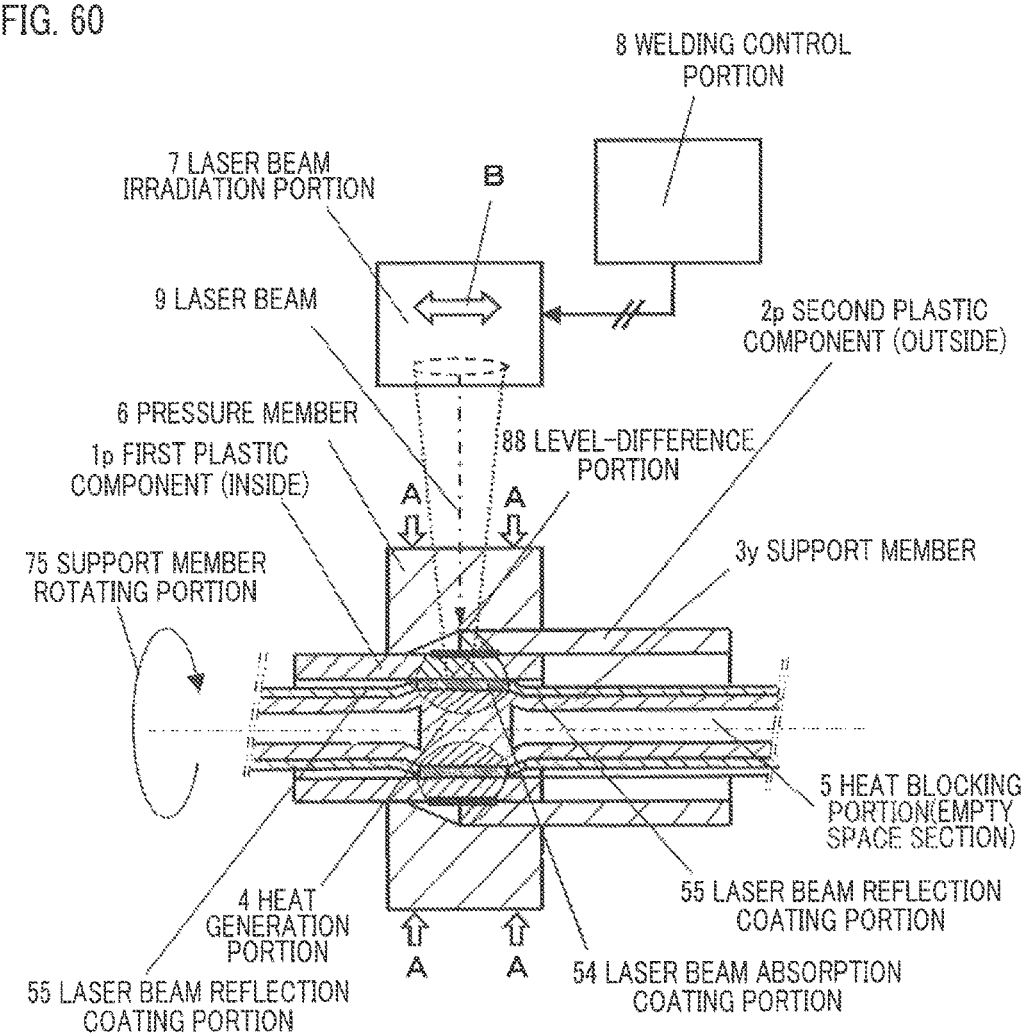
FIG. 60 is a view that illustrates principles of a laser welding method according to an eighteenth embodiment of the present invention.

FIG. 60 is a view that illustrates principles of a laser welding method according to an eighteenth embodiment of the present invention. In the eighteenth embodiment of the present invention a configuration is adopted so as to perform laser welding of a level-difference portion 88 that is formed when an end portion of a second plastic component $2p$ having a tubular shape is superposed on the circumferential face of a first plastic component $1p$ having a tubular shape, and also to perform laser welding of the vicinity of the level-difference portion 88.

When the rotating portion 75 of the support member $3y$ and the laser beam irradiation portion 7 are controlled by the welding control portion 8 so that the laser beam 9 is irradiated by the laser beam irradiation portion 7 onto the level-difference portion 88 that is formed when the end portions of the first and second plastic components $1p$ and $2p$ are superposed with respect to each other and onto the vicinity of the level-difference portion 88 while rotating the first and second plastic components $1p$ and $2p$, the heat generation portion 4 of the support member $3y$ absorbs the laser beam 9 and generates heat to thereby weld the level-difference portion 88 at which the first and second plastic components $1p$ and $2p$ are closely contacting as well as the vicinity thereof.

Note that, the laser beam irradiation portion 7 may be moved in directions that are orthogonal to the irradiation direction of the laser beam 9, such as being moved in the axial direction of the support member $3y$ as indicated by an outline arrow B in the transverse direction in FIG. 60, and being moved around the axis of the support member $3y$. Further, the optical axis of the laser beam 9 may be deflected to change the irradiation angle of the laser beam 9. When the emitting position of the laser beam 9 is moved or the irradiation angle of the laser beam 9 is changed, the size of the face to be irradiated that the laser beam 9 is irradiated onto increases, and consequently the welding area can be expanded and the welding strength can be increased. This situation is similar to the first embodiment.

Figure 61:
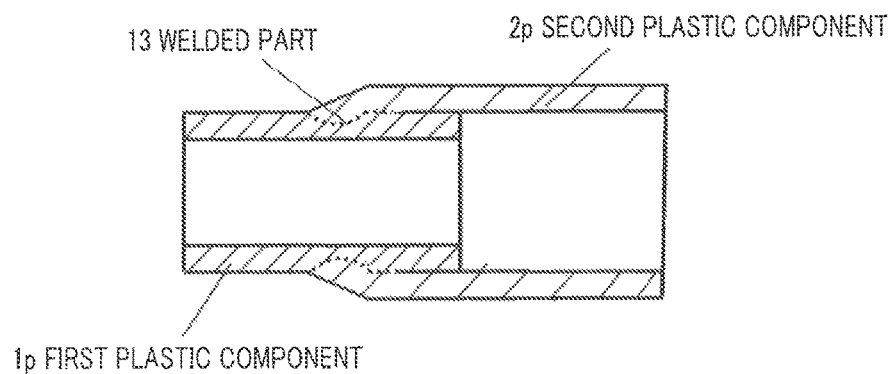
FIG. 61 is a cross-sectional view of plastic components that are welded by the laser welding method according to the eighteenth embodiment of the present invention.

FIG. 61 is a cross-sectional view of plastic components having a tubular shape that were welded by the laser welding method according to the eighteenth embodiment of the present invention. In FIG. 61, on the abutting faces of the first and second plastic components $1p$ and $2p$, a welded part 13 which was welded by irradiation of the laser beam 9 by the laser beam irradiation portion 7 is indicated by a dotted line, and a non-welded area is indicated by a solid line to distinguish the non-welded area from the welded part 13.

Examples of welding a first plastic component that has a tubular shape and a second plastic component that similarly has a tubular shape have been described above in the eleventh to eighteenth embodiments of the present invention. The ability to weld first and second plastic components that have a tubular shape means that, for example, laser welding can be used to weld together catheter tubes for medical use or, similarly, to weld together a catheter tube and a balloon catheter for medical use. Therefore, it is anticipated that the present invention will also be useful for a wide variety of other cases in which laser welding is performed to directly weld together a plurality of plastic components which transmit a laser beam that are to be used in the medical equipment field.

In the foregoing, cases have been described in which a plastic component moving device is provided that, while maintaining a distance between a laser beam emitting position of a laser beam irradiation portion and a plurality of plastic components that are held between a support member and a pressure member, rotates the plurality of plastic components around an axis perpendicular to a direction in which a laser beam is irradiated towards a heat generation portion.

Nineteenth Embodiment

Figure 62:
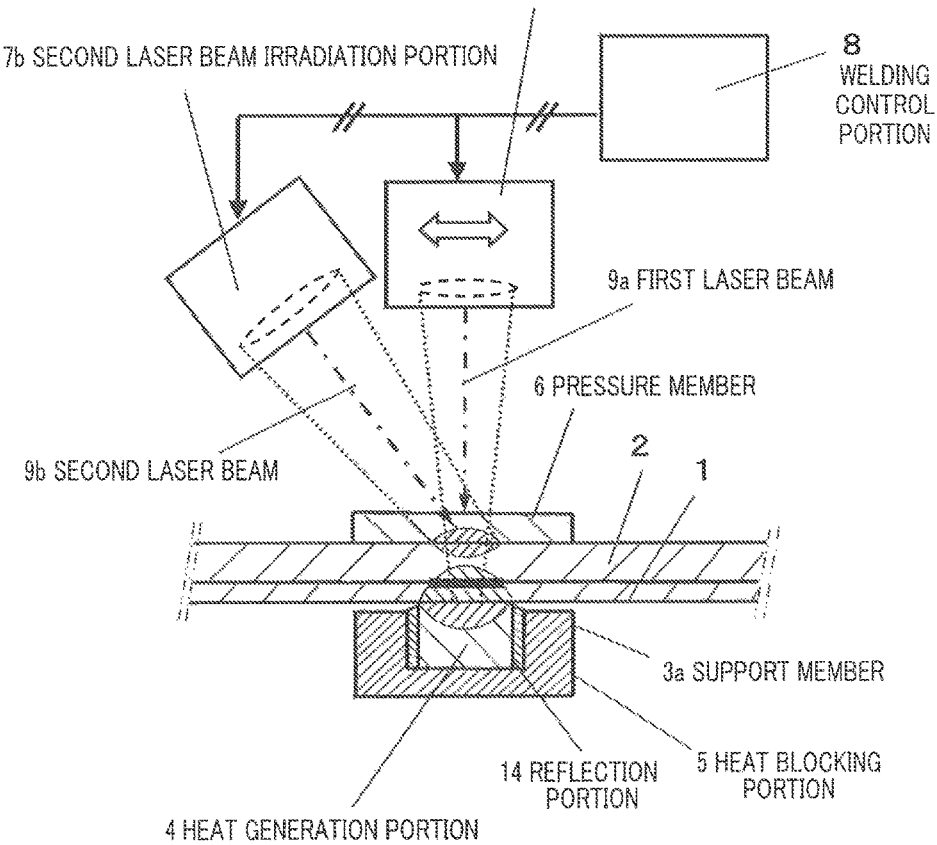
FIG. 62 is a view that illustrates principles of a laser welding method according to a nineteenth embodiment of the present invention.

FIG. 62 is a view illustrating principles of a laser welding method for welding first and second plastic components 1 and 2 as a method for laser welding of a plurality of plastic components that transmit a laser beam according to a nineteenth embodiment of the present invention. In FIG. 62, reference numerals 1 and 2 denote first and second plastic components to be welded together. Note that, a case in which three plastic components are to be welded together is described later using FIG. 63.

In the laser welding apparatus illustrated in FIG. 62 according to the nineteenth embodiment of the invention, the pressure member 6, a first laser beam (near-infrared laser beam) $9a$ that is transmitted through the first and second plastic components and a second laser beam (far-infrared laser beam) $9b$ of a different wavelength to the first laser beam $9a$ are used in combination, and a material (for example, silicone rubber) that transmits the first laser beam (near-infrared laser beam) $9a$ but absorbs the second laser beam (far-infrared laser beam) $9b$ is used as the material of the pressure member 6.

A first laser beam irradiation portion $7a$ is, for example, a semiconductor laser, and is configured to irradiate the first laser beam $9a$ transmitted through the pressure member 6 and the first and second plastic components 1 and 2 and onto the surface of the heat generation portion 4 that is supported by the support member $3a$. The wavelength of the first laser beam $9a$ is in a range of 700 nm to 1200 nm, and preferably a range of 800 nm to 1000 nm.

A second laser beam irradiation portion $7b$ is, for example, a $CO_2$ laser, and irradiates a far-infrared laser beam as the second laser beam $9b$. The wavelength of the second laser beam $9b$ is, for example, 10640 nm. The second laser beam $9b$ irradiated by the second laser beam irradiation portion $7b$ is irradiated onto the abutting faces of pressure member 6 and the first plastic component 1. Because the second laser beam $9b$ is irradiated diagonally with respect to the abutting faces of the pressure member 6 and the first plastic component 1, the second laser beam $9b$ is converged in advance in an elliptical shape so that the minor diameter side thereof extends to form a circle when the second laser beam $9b$ is irradiated onto the abutting faces of the pressure member 6 and the first plastic component 1.

When the first laser beam $9a$ is irradiated, heat is generated at the heat generation portion 4 of the support member $3a$. Further, when the second laser beam $9b$ is irradiated, heat is generated at the pressure member 6. When the first and second laser beams $9a$ and $9b$ are simultaneously irradiated, heat is generated at both of the heat generation portion 4 of the support member $3a$ on the lower face side and the pressure member 6 on the upper face side that sandwich the first and second plastic components 1 and 2. In the nineteenth embodiment, using the heat generated at the heat generation portion 4 of the support member 3a by the first laser beam 9a and the heat generated at the pressure member 6 by the second laser beam 9b, of the abutting faces of the first and second plastic components 1 and 2, an area that closely contacts with the heat generation portion 4 is welded by heat from both the side at which the first and second plastic components 1 and 2 are being supported and the side that is being pressed by the pressure member 6. In particular, since the second plastic component 2 is heated by the second laser beam 9b, there is the advantageous effect that the first and second plastic components 1 and 2 can be rapidly welded even in a case where the thickness of the second plastic component 2 is thick.

FIG. 62 illustrates a configuration in which the second laser beam irradiation portion 7b is added to the configuration illustrated in FIG. 5, and the second laser beam 9b is irradiated from a diagonally left upper position onto the abutting faces of the pressure member 6 and the second plastic component 2 located thereunder. In this case, the pressure member 6 generates heat as a result of irradiate of the second laser beam 9b. Although heat on the surface of the pressure member 6 diffuses to the surrounding area and the heat is radiated, heat is accumulated between the pressure member 6 and the second plastic component 2. As the second laser beam irradiation portion 7b continues laser beam irradiation, heat is accumulated between the pressure member 6 and the second plastic component 2 and the amount of heat grows and reaches the abutting faces of the first and second plastic components 1 and 2. The heat then combines with the heat from the heat generation portion 4, and the abutting faces of the first and second plastic components 1 and 2 melt, cool, harden and are welded in the area at which the abutting faces are closely contacted by the heat generation portion 4.

Figure 63:
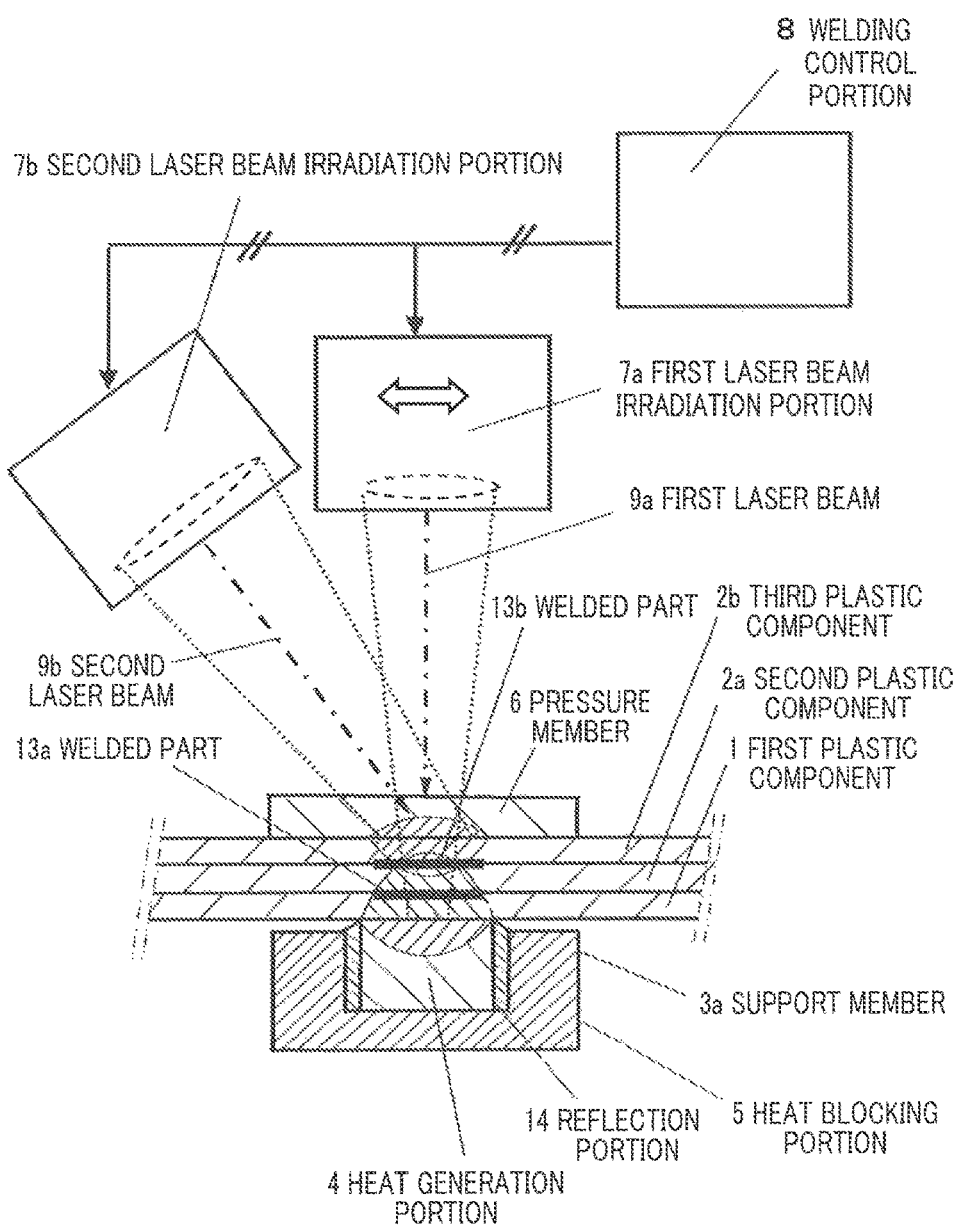
FIG. 63 is a view that illustrates a modification of the principles of the laser welding method according to the nineteenth embodiment of the present invention.

FIG. 63 is a view that illustrates a modification of the principles of the laser welding method according to the nineteenth embodiment of the present invention. In this modification, a case is illustrated in which three plastic components 1, 2a and 2b are welded by means of the first and second laser beams 9a and 9b. When the first laser beam 9a is transmitted through the three plastic components 1, 2a and 2b and irradiated onto the heat generation portion 4, heat is generated at the heat generation portion 4. On the other hand, when the second laser beam 9b is irradiated onto the pressure member 6, heat is generated at the pressure member 6. The heat generated at the heat generation portion 4 is transmitted to the abutting faces of the welding area at which the first plastic component 1 and the second plastic component 2a closely contact. Further, the heat generated at the pressure member 6 is transmitted to the abutting faces of the welding area at which the second plastic component 2a and the third plastic component 2b closely contact. As irradiation of the first and second laser beams 9a and 9b continues, the abutting faces of the respective welding areas of the three plastic components 1, 2a and 2b melt. Irradiation of the first and second laser beams 9a and 9b is then stopped, the abutting faces cool and harden, and the first plastic component 1 and the second plastic component 2a are welded and the second plastic component 2a and the third plastic component 2b are also welded.

When the energy of the first and second laser beams 9a and 9b that are irradiated from the first and second laser beam irradiation portions is sufficiently greater than the thermal energy necessary for welding the three plastic components 1, 2a and 2b, the three plastic components 1, 2a and 2b are welded at the welding area. Thus, according to the present invention, laser welding of a plurality of plastic components can be efficiently performed.

Twentieth Embodiment

Figure 64:
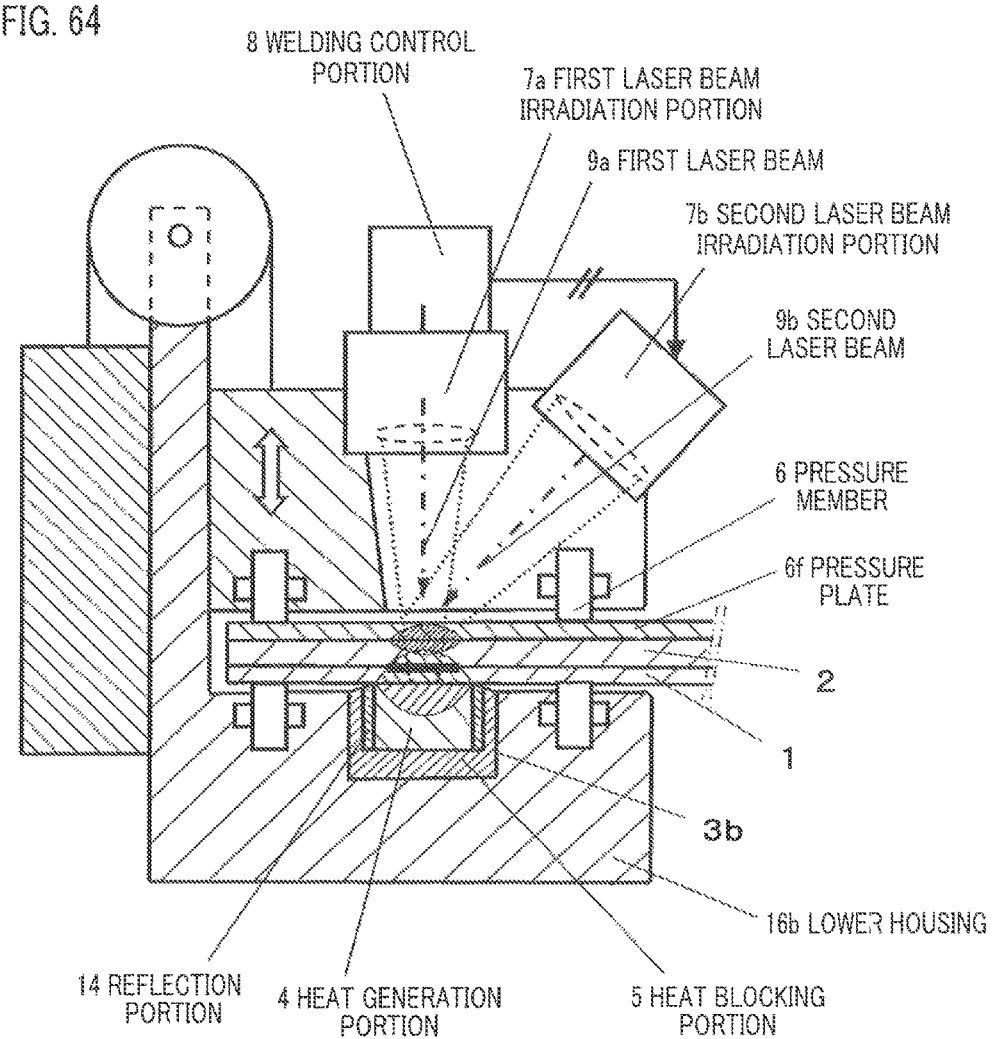
FIG. 64 is a view that illustrates an overview of a laser welding apparatus according to a twentieth embodiment of the present invention.

FIG. 64 is a view illustrating an overview of a laser welding apparatus according to a twentieth embodiment of the present invention. In the laser welding apparatus according to the twentieth embodiment of the present invention, the first laser beam (near-infrared laser beam) 9a that is transmitted through the first and second plastic components 1 and 2 and the second laser beam (far-infrared laser beam) 9b that is of a different wavelength to the first laser beam 9a are used in combination, and, as a pressure member, a pressure plate 6f that uses a material (for example, silicone rubber) that transmits the first laser beam (near-infrared laser beam) 9a but absorbs the second laser beam (far-infrared laser beam) 9b is covered over the top of the second plastic component 2.

FIG. 64 illustrates a configuration in which the second laser beam irradiation portion 7b is added to the configuration illustrated in FIG. 19, the pressure plate 6f as a pressure member that transmits the first laser beam (near-infrared laser beam) 9a but absorbs the second laser beam (far-infrared laser beam) 9b is covered over the top of the second plastic component 2, and the second laser beam 9b is irradiated thereon from a diagonally right upper position.

When the first and second laser beams 9a and 9b are simultaneously irradiated, heat is generated at both of the heat generation portion 4 of the support member 3a on the lower face side and the pressure plate 6f on the upper side that sandwich the first and second plastic components 1 and 2. In the twentieth embodiment, using the heat generated at the heat generation portion 4 of the support member 3a by the first laser beam 9a and the heat generated at the pressure plate 6f by the second laser beam 9b, the abutting faces of the first and second plastic components 1 and 2 are melted by heat from both the side at which the first and second plastic components 1 and 2 are being supported and the side that is being pressed by the pressure plate 6f.

Twenty-First Embodiment

Figure 65:
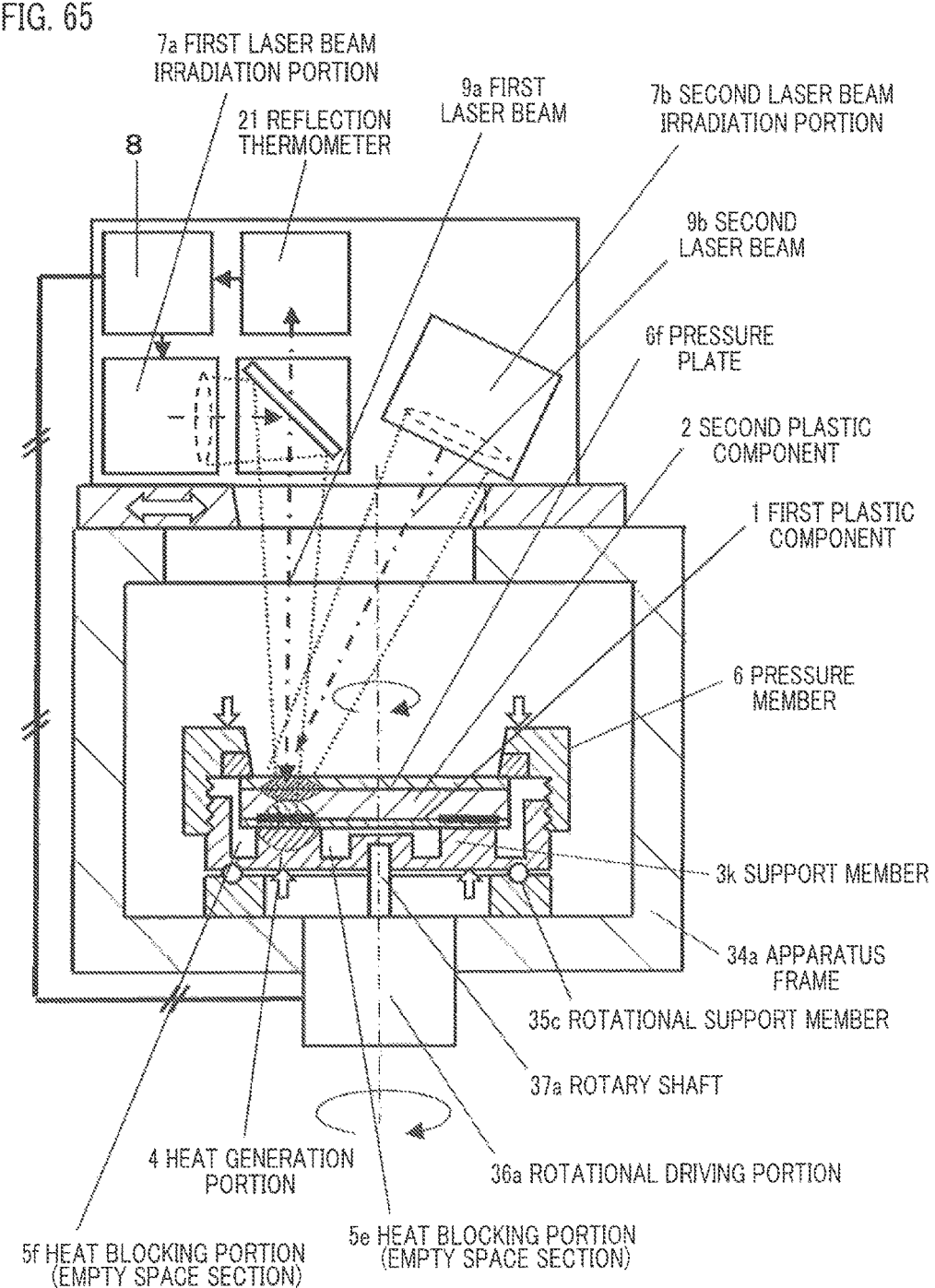
FIG. 65 is a view that illustrates an overview of a laser welding apparatus according to a twenty-first embodiment of the present invention.

FIG. 65 is a view illustrating an overview of a laser welding apparatus according to a twenty-first embodiment of the present invention. In the laser welding apparatus according to the twenty-first embodiment of the present invention, the first laser beam (near-infrared laser beam) 9a that is transmitted through the first and second plastic components 1 and 2 and the second laser beam (far-infrared laser beam) 9b of a different wavelength to the first laser beam 9a are used in combination, and, as a pressure member, the pressure plate 6f that uses a material (for example, silicone rubber) that transmits the first laser beam (near-infrared laser beam) 9a but absorbs the second laser beam (far-infrared laser beam) 9b is covered over the top of the second plastic component 2.

FIG. 65 illustrates a configuration in which the second laser beam irradiation portion 7b is added to the configuration illustrated in FIG. 32, the pressure plate 6f as a pressure member that transmits the first laser beam (near-infrared laser beam) 9a but absorbs the second laser beam (far-infrared laser beam) 9b is covered over the top of the second plastic component 2, and the second laser beam 9b is irradiated thereon from a diagonally right upper position.

When the first and second laser beams 9a and 9b are simultaneously irradiated, heat is generated at both of the heat generation portion 4 of the support member on the lower side and the pressure plate 6f on the upper side that sandwich the first and second plastic components 1 and 2. In the twenty-first embodiment, using the heat generated at the heat generation portion 4 of the support member 3k by the first laser beam 9a and the heat generated at the pressure plate 6f by the second laser beam 9b, the abutting faces of the first and second plastic components 1 and 2 are melted by heat from both the lower side at which the first and second plastic components 1 and 2 are being supported and the upper side that is being pressed by the pressure plate 6f.

Twenty-Second Embodiment

Figure 66:
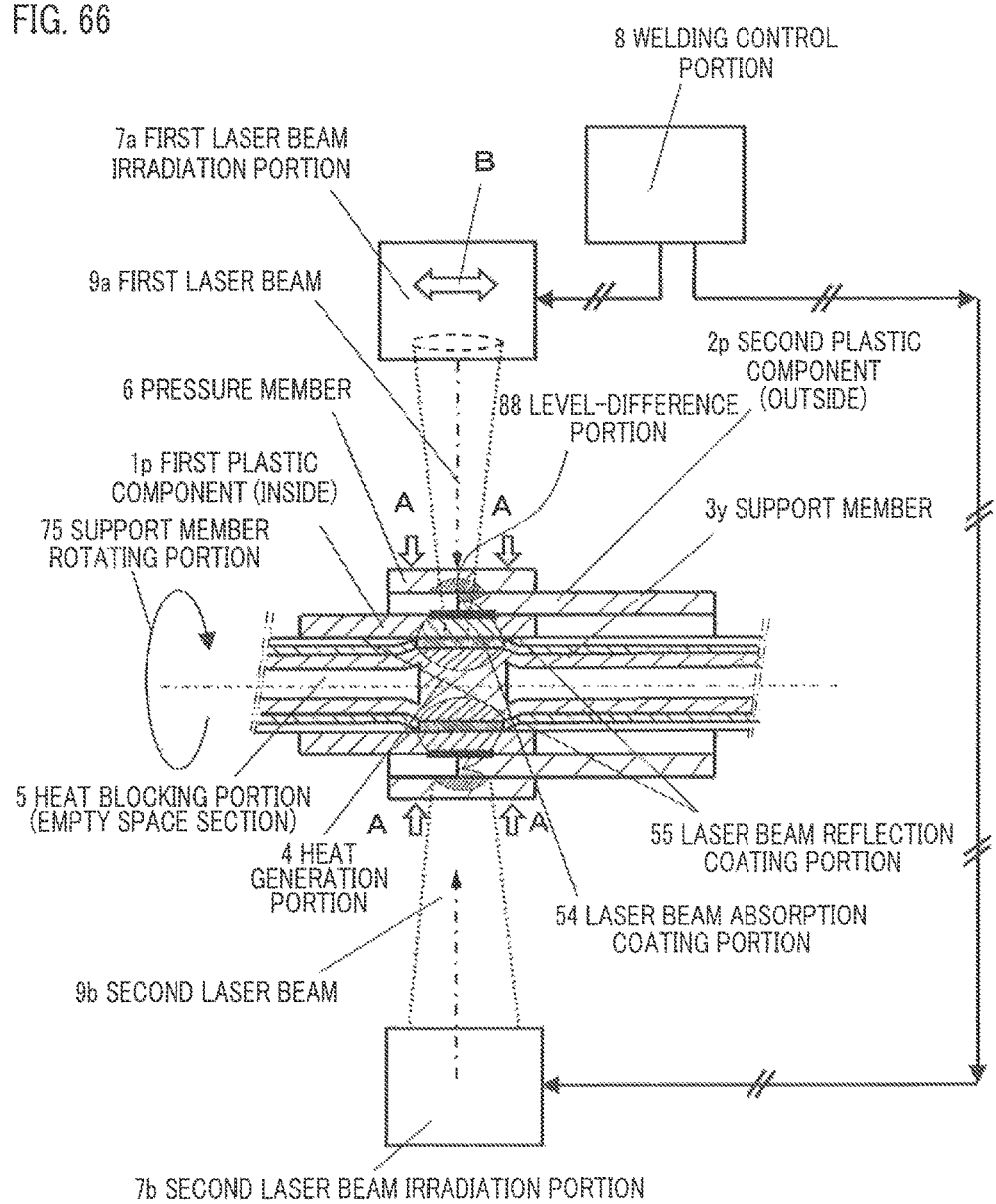
FIG. 66 is a view that illustrates an overview of a laser welding method according to a twenty-second embodiment of the present invention.

FIG. 66 is a view illustrating an overview of a laser welding apparatus according to a twenty-second embodiment of the present invention. In the laser welding apparatus according to the twenty-second embodiment of the present invention, the first laser beam (near-infrared laser beam) 9a that is transmitted through the first and second plastic components 1p and 2p and the second laser beam (far-infrared laser beam) 9b of a different wavelength to the first laser beam 9a are used in combination, and a material, such as silicone rubber, that absorbs the second laser beam 9b is used as the material of the pressure member 6.

FIG. 66 illustrates a configuration in which the second laser beam irradiation portion 7b is added to the configuration shown in FIG. 58, and the second laser beam 9b is irradiated from a different position to the first laser beam irradiation portion 7a, for example, from the opposite side to the first laser beam irradiation portion 7a, with respect to a rotational axis of the support member 3y. Because the internal diameter of the tubular pressure member 6 is smaller than the external diameter of the second plastic component 2p, an elastic force of the pressure member 6 serves as a pressing source that presses the first and second plastic components 1p and 2p to the central axis side.

When the first and second laser beams 9a and 9b are simultaneously irradiated, heat is generated at both of the heat generation portion 4 of the support member 3y that sandwiches the first and second plastic components 1 and 2 from the inner side and the pressure member 6 that sandwiches the first and second plastic components 1 and 2 from the outer side. In the twenty-second embodiment, using the heat generated at the heat generation portion 4 of the support member 3y by the first laser beam 9a and the heat generated at the pressure member 6 by the second laser beam 9b, the areas of the abutting faces of the first and second plastic components 1p and 2p that are being closely contacted by the heat generation portion 4 are welded by means of heat from both the inner side on which the first and second plastic components 1p and 2p are being supported and the outer side that is being pressed by the pressure member 6.

In the foregoing description of the first embodiment to the twenty-second embodiment, cases have mainly been described of performing laser welding of first and second plastic components. However, a configuration may also be adopted in which three or more plastic components are mounted in a superimposed manner on a heat generation portion of a support member, a certain portion of abutting faces in the welding area and the heat generation portion are caused to overlap, the plastic components are pressed by a pressure member and caused to closely contact, a laser beam is converged and irradiated to cause the heat generation portion to generate heat, and the abutting faces in the welding area of the three or more plastic components are welded using the heat generated by the heat generation portion. This is because three or more plastic components can be welded as long as a thickness to which the three or more plastic components overlap is in a range in which a heat quantity required for welding at the respective abutting faces or more is reached, that is taken as a range in which the heat of the heat generation portion of the support member welds. In particular, when the number of plastic components to be superposed is large, or when the thickness of plastic components to be superposed on the heat generation portion is thick, welding in which the first laser beam (near-infrared laser beam) 9a and the second laser beam (far-infrared laser beam) 9b are simultaneously irradiated to heat the abutting faces of the welding area, as described in the nineteenth embodiment to the twenty-second embodiment, is preferable.

Twenty-Third Embodiment

Figure 67:
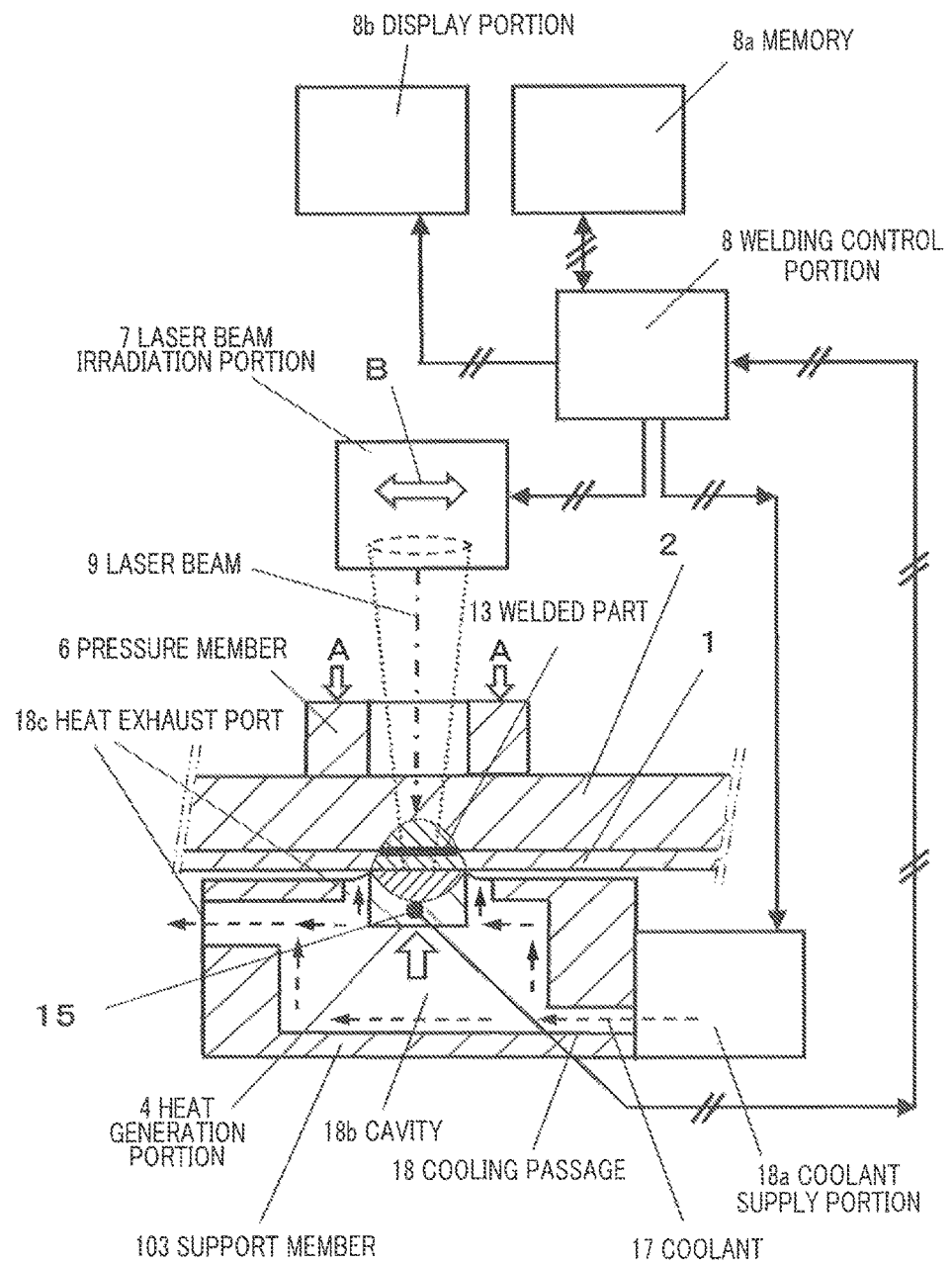
FIG. 67 is a view that illustrates an overview of a laser welding method according to a twenty-third embodiment of the present invention.

FIG. 67 is a view that illustrates principles of a twenty-third embodiment of the present invention. In FIG. 67, because a lower housing is used as a support member 103, the upper face of the heat generation portion 4 is supported in an exposed state. A cavity 18b as one part of a cooling passage 18 that allows the coolant 17 to pass therethrough is formed inside the support member 103, and heat exhaust ports 18c from the cavity 18b are opened at the periphery of the heat generation portion 4 and in a side face of the support member 103. A coolant supply portion 18a is attached to the support member 103. The coolant 17 is fed from the coolant supply portion 18a into the cavity 18b through the cooling passage 18. The coolant 17 passes along the bottom face and side faces of the heat generation portion 4 to thereby take heat from and cool the heat generation portion 4. The heat taken from the heat generation portion 4 is released to outside from the heat exhaust ports 18c at the periphery of the heat generation portion 4 and in the side face of the support member 103. The remaining configuration is the same as in FIG. 14, and therefore a description thereof is omitted here.

Figure 68:
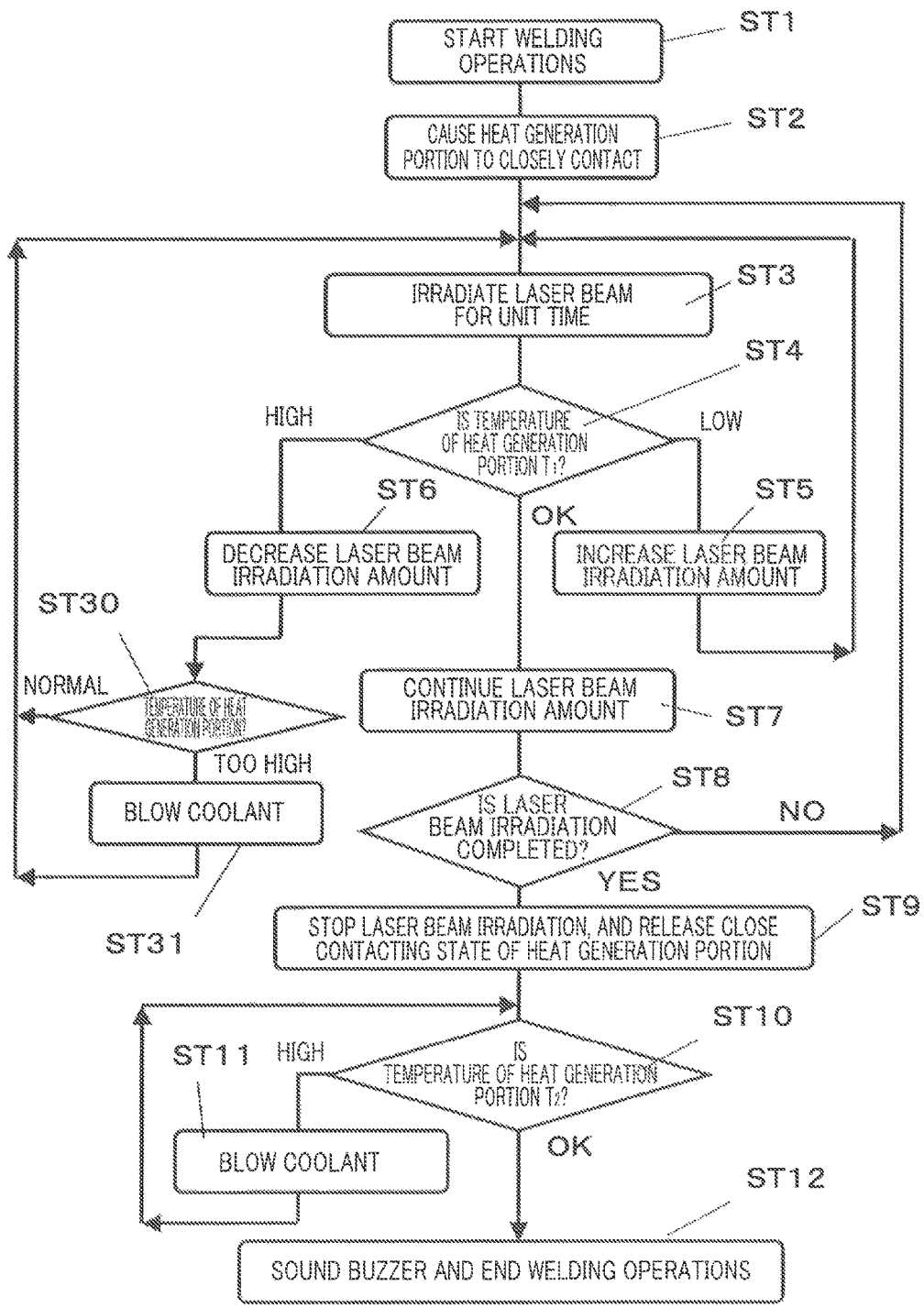
FIG. 68 is a flowchart of welding operations of the laser welding method according to the twenty-third embodiment of the present invention.

FIG. 68 illustrates a flowchart of the twenty-third embodiment that has been described referring to FIG. 67. In FIG. 68, when it is determined in step ST4 that the temperature of the heat generation portion is higher than a first temperature range, the laser beam irradiation amount is decreased in step ST6, and thereafter it is determined whether the level of the height of the temperature of the heat generation portion is a level (normal) that is sufficiently reduced by only decreasing the laser beam irradiation amount in step ST6 or is a level (too high) that is not sufficiently reduced by only decreasing the laser beam irradiation amount in step ST6 (step ST30). If the level of the height of the temperature of the heat generation portion is a level (too high) that is not sufficiently reduced by only decreasing the laser beam irradiation amount, the coolant 17 is fed from the cooling passage 18 to the cavity 18b to take heat from the bottom face and side face of the heat generation portion 4 and thereby cool the heat generation portion 4, and the heat that is taken is released to outside from the heat exhaust ports 18c at the periphery of the heat generation portion 4 and in the side face (step ST31). Thereby, the heat generation portion 4 is cooled and the temperature is kept within a desired temperature range. When it is determined that the level of the height of the temperature of the heat generation portion 4 is such that the temperature can be sufficiently reduced by only reducing the laser beam irradiation amount, the laser beam is irradiated without blowing the coolant 17 at the heat generation portion 4 (step ST3). The remaining parts of the flowchart are the same as in FIG. 15, and hence a description thereof is omitted here.

Figure 69:
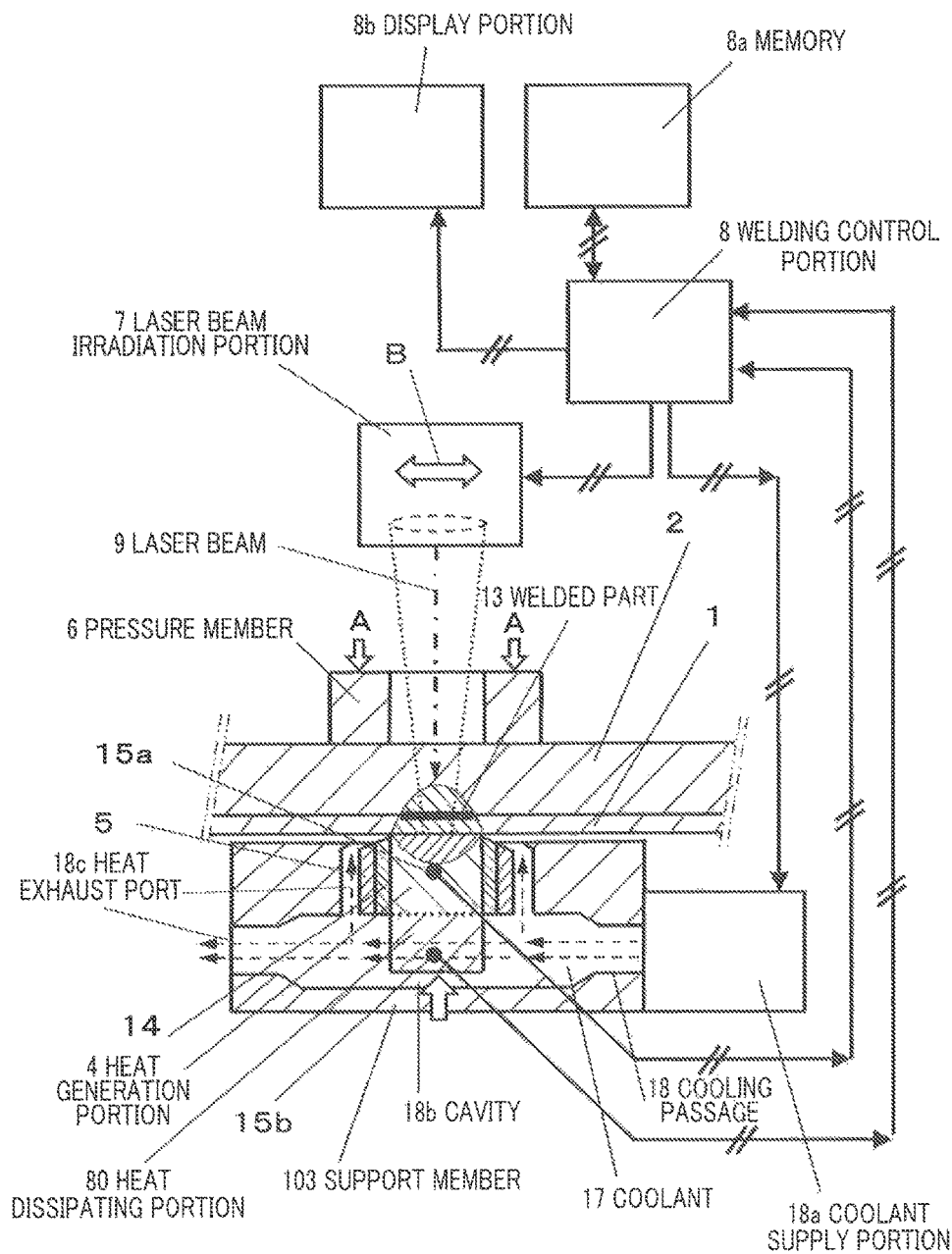
FIG. 69 is a view that illustrates a modification of the laser welding method according to the twenty-third embodiment of the present invention.

FIG. 69 illustrates a modification of the principles of the twenty-third embodiment of the present invention. In FIG. 69, an upper half of the side face of the heat generation portion 4 is surrounded by the reflection portion 14, and the outer side thereof is surrounded by the heat blocking portion 5. A lower half of the side face as well as the bottom face of the heat generation portion 4 are exposed in the cavity 18b inside the support member 103a. A first temperature sensor 15a is provided in the upper half of the heat generation portion 4, and a second temperature sensor 15b is provided in the lower half of the heat generation portion 4. The first and second temperature sensor 15a and 15b are configured to send temperature information for the upper half of the heat generation portion 4 and temperature information for the lower half thereof, respectively, to the welding control portion 8. When the coolant 17 is fed by the coolant supply portion 18a into the cavity 18b, the coolant 17 takes heat from the lower half of the side face as well as the bottom face of the heat generation portion 4 that are exposed in the cavity 18b, and releases the heat that is taken therefrom to the outside from the heat exhaust ports 18c. Therefore, the lower half of the heat generation portion 4 that is exposed in the cavity 18b functions as a heat dissipating portion 80.

Figure 70:
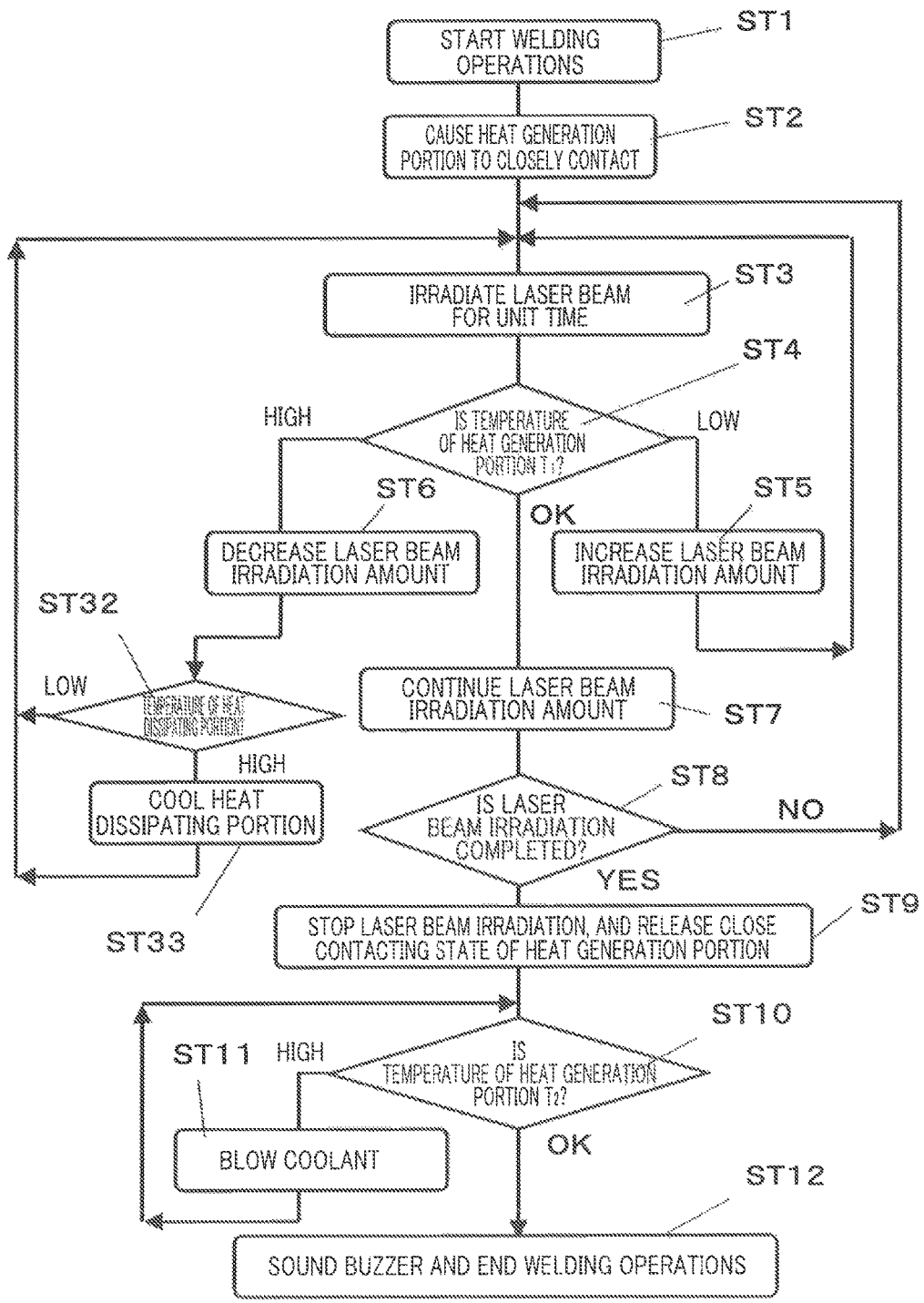
FIG. 70 is a flowchart of welding operations according to a modification of the laser welding method according to the twenty-third embodiment of the present invention.

FIG. 70 illustrates a flowchart of the modification of the twenty-third embodiment that has been described referring to FIG. 69. In FIG. 70, when it is determined in step ST4 that the temperature of the heat generation portion is higher than the first temperature range, the laser beam irradiation amount is decreased in step ST6, and thereafter it is determined whether the temperature of the lower half of the heat generation portion 4 (that is, the heat dissipating portion 80) is higher or lower than a scheduled temperature (step ST32).

When the temperature of the lower half of the heat generation portion 4 (that is, the heat dissipating portion 80) is higher than the scheduled temperature, the coolant 17 is fed from the cooling passage 18 into the cavity 18b, and the coolant 17 takes heat from the bottom face and side face of the lower half of the heat generation portion 4 (that is, the heat dissipating portion 80) to thereby cool the heat generation portion 4, and releases the heat that is taken to the outside from the heat exhaust ports 18c (step ST33). Thereby, the temperature of the heat generation portion 4 is kept within a desired temperature range. When it is determined that the temperature of the lower half of the heat generation portion 4 (that is, the heat dissipating portion 80) is lower than the scheduled temperature, the laser beam is irradiated without blowing the coolant 17 at the heat generation portion 4 (step ST3). The remaining parts of the flowchart are the same as in FIG. 15 and FIG. 68, and hence a description thereof is omitted here.

Figure 71:
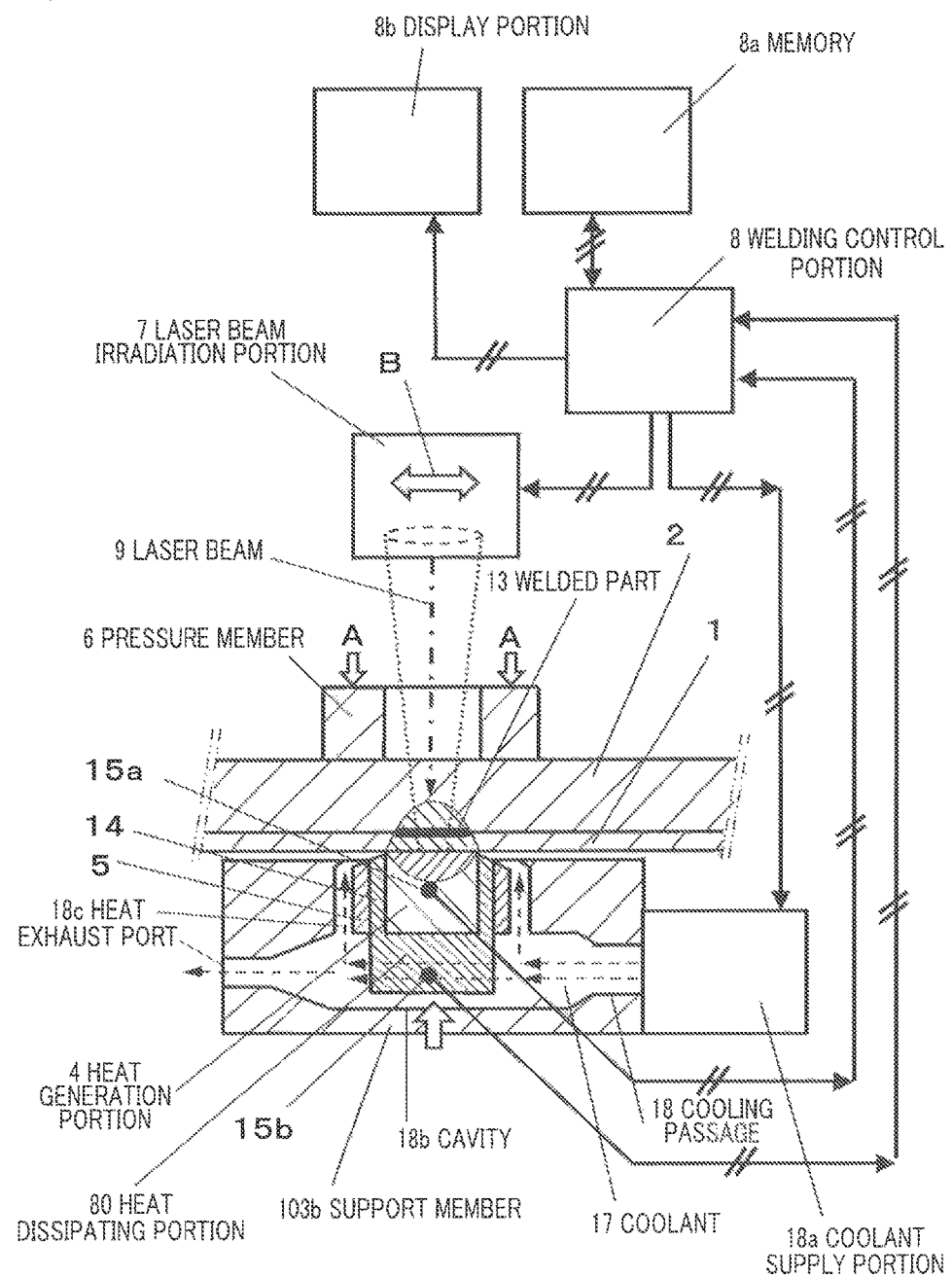
FIG. 71 is a view that illustrates another modification of the laser welding method according to the twenty-third embodiment of the present invention.
Figure 72:
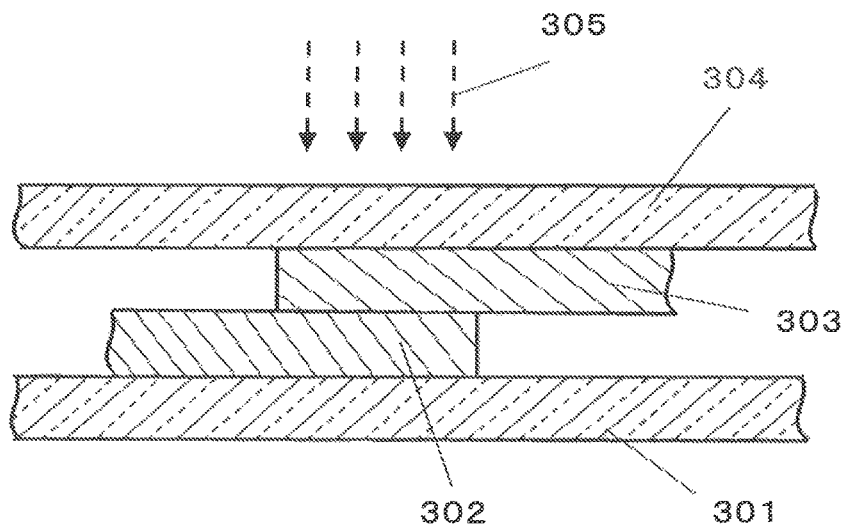
FIG. 72 is a view that illustrates a principle of a conventional laser welding method for plastic components.
Figure 73:
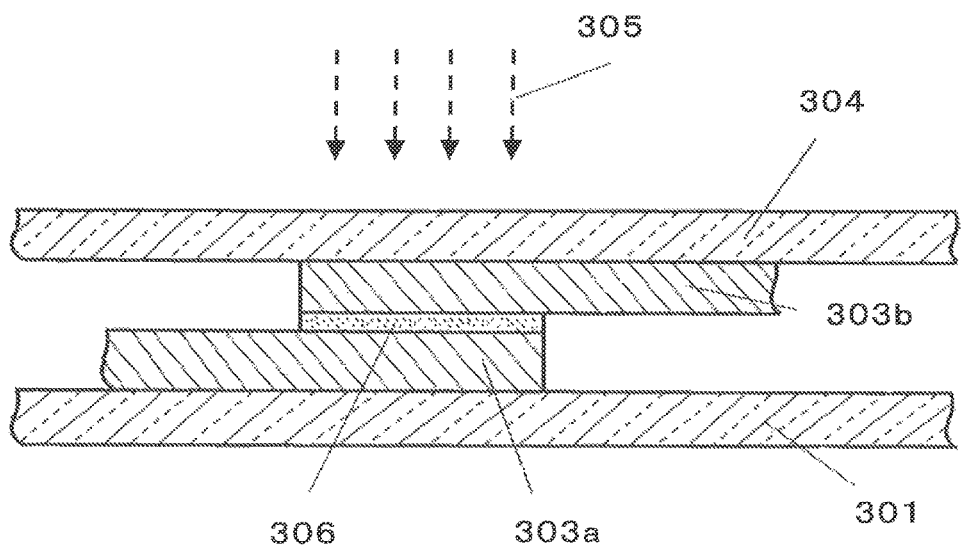
FIG. 73 is a view that illustrates another principle of a conventional laser welding method for plastic components.

FIG. 71 illustrates another modification of the principles of the twenty-third embodiment of the present invention. In the modification illustrated in FIG. 71, the material of the lower half of the heat generation portion (that is, the heat dissipating portion 80) which is shown in FIG. 69 is not the same stainless steel as the upper half, and instead is a metal with a high degree of heat conductivity such as aluminum or copper, thus increasing the heat release effect.

Because aluminum or copper or the like is also a reflective material that reflects a laser beam, in FIG. 71 the reflection portion 14 that surrounds the circumference of the stainless steel of the upper half that is the heat generation portion 4 is formed in a shape that extends further downward than the bottom face of the stainless steel of the upper half that is the heat generation portion 4. Further, in FIG. 71, heat exhaust ports 18c that blow the coolant 17 to the upper face of the heat generation portion 4 are formed on the outside of the heat blocking portion 5 that further surrounds the reflection portion 14 surrounding the circumference of the stainless steel of the upper half that is the heat generation portion 4. The reason that the sizes of the heat exhaust ports 18c that release the heat taken from the bottom face and side face of the heat dissipating portion 80 to outside are small in comparison to FIG. 69 is to facilitate movement of the coolant 17 to the upper face of the heat generation portion 4. The flowchart of this modification is the same as the flowchart illustrated in FIG. 70, and hence illustration and description thereof is omitted.

As described in the foregoing, the present invention realizes a novel laser welding method and laser welding apparatus which can directly weld together a plurality of plastic components that transmit a laser beam.

Further, cases of performing laser welding of plate-shaped plastic components, tubular plastic components, and bar-shaped plastic components and the like as first and second plastic components have been described in the foregoing description. It has also been described that, even when the plurality of plastic components are block shaped, the present invention can be applied to cases where the block-shaped plastic components have a flange and the flanges can be welded together.

Note that, since a laser welding method for welding plate-shaped plastic components and a laser welding method for welding sheet-like plastic components are common with each other, a description of a case of performing laser welding of sheet-like plastic components is omitted from the above description.

Forms of the Present Invention

A laser welding apparatus according to a first form of the present invention includes:

a support member including a heat generation portion which has a size that is limited to correspond to a size of a welding area of a plurality of plastic components and is made from a material that absorbs a laser beam and generates heat, and which generates heat of a temperature that is equal to or greater than a melting temperature of the plastic components;

a laser beam irradiation unit for converging a laser beam to be transmitted through the plurality of plastic components, and irradiating the laser beam toward the heat generation portion through the plurality of plastic components; and a welding controller for causing a laser beam to be irradiated at the heat generation portion using the laser beam irradiation unit to thereby cause the heat generation portion to generate heat, and welding abutting faces of a welding area of the plurality of plastic components with heat that is generated.

A laser welding apparatus according to a second form of the present invention is in accordance with the first form, wherein, in the support member, a circumference of the heat generation portion is surrounded by at least any one of a heat blocking portion that blocks heat, a reflection portion that reflects the laser beam, and a heat conduction portion to which heat of the heat generation portion is conducted.

A laser welding apparatus according to a third form of the present invention is in accordance with the first or second form, and further includes a pressure member for sandwiching the plurality of plastic components together with the heat generation portion of the support member, and pressurizing abutting faces as a welding area of the plurality of plastic components in a direction in which the abutting faces closely contact with each other.

A laser welding apparatus according to a fourth form of the present invention is in accordance with the second form, wherein the support member has an empty space section as the heat blocking portion.

A laser welding apparatus according to a fifth form of the present invention is in accordance with the first form, wherein, in the support member, a resin that absorbs the laser beam is coated on a surface of the heat generation portion.

A laser welding apparatus according to a sixth form of the present invention is in accordance with the first form, and further includes a laser moving device for moving a laser beam emitting position at which a laser beam is irradiated from the laser beam irradiation unit relative to the plurality of plastic components, while maintaining a distance between the plurality of plastic components and the laser beam emitting position of the laser beam irradiation unit at a constant distance.

A laser welding apparatus according to a seventh form of the present invention is in accordance with the first form, and further includes a plastic component moving device for moving the plurality of plastic components relative to a laser beam emitting position at which a laser beam is irradiated from the laser beam irradiation unit, while maintaining a distance between the plurality of plastic components and the laser beam emitting position at a constant distance.

A laser welding apparatus according to an eighth form of the present invention is in accordance with the seventh form, wherein the plastic component moving device performs at least one of the following actions: moving the plurality of plastic components parallel to a horizontal direction relative to the laser beam emitting position of the laser beam irradiation unit; rotationally moving the plurality of plastic components in a horizontal direction; and rotating the plurality of plastic components around an axis that is perpendicular to a direction of laser beam irradiation toward the heat generation portion.

A laser welding apparatus according to a ninth form of the present invention is in accordance with the first form, and further includes a temperature measurement device for measuring a temperature of the heat generation portion of the support member, and sending temperature information that is measured to the welding controller, wherein, based on temperature information regarding the heat generation portion from the temperature measurement device, the welding controller performs at least one welding operation among: (1) keeping the temperature of the heat generation portion constant, (2) stopping laser irradiation, and (3) notifying completion of laser welding.

A laser welding apparatus according to a tenth form of the present invention is in accordance with the ninth form, wherein the temperature measurement device is a thermocouple or a reflection thermometer.

A laser welding apparatus according to an eleventh form of the present invention is in accordance with the third form, the laser beam irradiation unit being a first laser beam irradiation unit for irradiating a first laser beam that is a near infrared beam, and further including a second laser beam irradiation unit for irradiating a second laser beam that is a far infrared beam toward the pressure member, wherein:

a material that transmits the first laser beam that is a near infrared beam and absorbs the second laser beam that is a far infrared beam is used for the pressure member, and the welding controller controls so that the first laser beam and second laser beam are simultaneously irradiated by the first laser beam irradiation unit and second laser beam irradiation unit, the heat generation portion of the support member is caused to generate heat by the first laser beam, the pressure member is caused to generate heat by the second laser beam, and abutting faces of a welding area of the plurality of plastic components are welded using heat that is generated by each of the heat generation portion of the support member and the pressure member which sandwich the plurality of plastic components.

A laser welding apparatus according to a twelfth form of the present invention is in accordance with any one of the first to ninth forms, and further includes: a housing that houses the support member in a form in which an upper face of the heat generation portion is exposed, and that has a cooling passage including a heat exhaust port that opens toward the upper face of the heat generation portion; and a coolant feeder for supplying a coolant to the cooling passage and blowing the coolant from the heat exhaust port of the cooling passage toward the upper face of the heat generation portion.

A laser welding apparatus according to a thirteenth form of the present invention is in accordance with any one of the first to ninth forms, and further includes: a housing that houses the support member in a form in which an upper face of the heat generation portion is exposed, and that has a cooling passage that is formed along a face other than the upper face of the heat generation portion; and a coolant feeder for supplying a coolant to the cooling passage and blowing the coolant along a face other than the upper face of the heat generation portion.

A laser welding apparatus according to a fourteenth form of the present invention is in accordance with the first form, wherein, in the heat generation portion, a concave portion is provided in an abutting face that abuts against the plastic component, and a vertical wall is provided around the concave portion.

A laser welding method according to a fifteenth form of the present invention is a laser welding method for welding abutting faces of a welding area of a plurality of plastic components that transmit a laser beam, and includes the steps of: (1) mounting a plurality of plastic components on a support member that includes a heat generation portion which has a size that is limited to correspond to a size of a welding area of the plurality of plastic components and is made of a material that absorbs a laser beam and generates heat, and which generates heat of a temperature that is equal to or greater than a melting temperature of the plastic components; (2) causing the plurality of plastic components to come in contact at abutting faces of the welding area; (3) causing a certain portion of the abutting faces of the welding area of the plurality of plastic components to be superposed facing the heat generation portion of the support member; (4) by using a pressure member to sandwich and press the plurality of plastic components between the pressure member and the heat generation portion, causing the abutting faces of the welding area of the plurality of plastic components to closely contact, and simultaneously causing the heat generation portion of the support member and a surface of a plastic component that contacts the heat generation portion to closely contact; (5) using a laser beam irradiation unit to converge a laser beam and irradiate the laser beam toward the heat generation portion of the support member through the plurality of plastic components; (6) causing the laser beam to be transmitted through the plurality of plastic components and absorbed by the heat generation portion; (7) causing the heat generation portion to generate heat; and (8) welding the abutting faces of the welding area of the plurality of plastic components with heat generated by the heat generation portion.

A laser welding method according to a sixteenth form of the present invention is in accordance with the fifteenth form, further including a step (9) of, after causing the heat generation portion to generate heat by the steps from (1) to (7), detecting temperature information regarding the heat generation portion by means of one or a plurality of thermocouples, and based on the temperature information, increasing or decreasing an amount of irradiation of a laser beam by the laser beam irradiation unit and also supplying a coolant from a coolant feeder to cool the heat generation portion.

A laser welding method according to a seventeenth form of the present invention is in accordance with the fifteenth or sixteenth form, the laser beam irradiation unit being a first laser beam irradiation unit for irradiating a first laser beam that is a near infrared beam, and further including second laser beam irradiation unit for irradiating a second laser beam that is a far infrared beam toward the pressure member, wherein: the pressure member is made of a material that transmits the first laser beam that is a near infrared beam and absorbs the second laser beam that is a far infrared beam; in the step (5), simultaneously with the first laser beam being converged and irradiated by the first laser beam irradiation unit toward the heat generation portion of the support member through the plurality of plastic components, the second laser beam is irradiated toward the pressurization means by the second laser beam irradiation unit; in the step (6), the first laser beam is caused to be transmitted through the plurality of plastic components and absorbed by the heat generation portion, and the second laser beam is caused to be absorbed by the pressure member; in the step (7), the pressure member is caused to generate heat together with the heat generation portion; and in the step of (8), the abutting faces of the welding area of the plurality of plastic components are welded using heat that is generated at each of the heat generation portion of the support member and the pressure member which sandwich the plurality of plastic components.

INDUSTRIAL APPLICABILITY

The present invention can be widely applied to laser welding of a plurality of plastic components that transmit a laser beam, and can also be applied to, for example, laser welding for welding catheter tubes together, laser welding of a catheter tube and a balloon catheter, and laser welding of other small and precise plastic components.

EXPLANATION OF REFERENCE SIGNS

1 First plastic component
2 Second plastic component
3 Support member
4 Heat generation portion
5 Heat blocking portion
6 Pressure member
7 Laser beam irradiation portion
8 Welding control portion
9 Laser beam
13 Welded part
14 Reflection portion

The invention claimed is:

1. A laser welding apparatus, comprising:
a support member including a columnar heat generation portion which has a limited size necessary to form a weld of a size corresponding to a welding area of a plurality of plastic components irradiated with a laser beam and is made from a material that absorbs the laser beam and generates heat, and which generates heat of a temperature that is equal to or greater than a melting temperature of the plastic components;
a laser beam irradiation unit for converging a laser beam to be transmitted through the plurality of plastic components, and irradiating the laser beam toward the heat generation portion through the plurality of plastic components; and
a welding controller for causing a laser beam to be irradiated at the heat generation portion using the laser beam irradiation unit to thereby cause the heat generation portion to generate heat, and welding abutting faces of a welding area of the plurality of plastic components with heat that is generated,
wherein respective faces of the heat generation portion other than a face to be irradiated of the heat generation portion are surrounded by a heat blocking portion made of a heat insulating material.

2. The laser welding apparatus according to claim 1, further comprising a pressure member for sandwiching the plurality of plastic components together with the heat generation portion of the support member, and pressurizing abutting faces as a welding area of the plurality of plastic components in a direction in which the abutting faces closely contact with each other.

3. The laser welding apparatus according to claim 1, wherein, in the support member, a resin that absorbs the laser beam is coated on a surface of the heat generation portion.

4. The laser welding apparatus according to claim 1, further comprising a laser moving device for moving a laser beam emitting position at which a laser beam is irradiated from the laser beam irradiation unit relative to the plurality of plastic components, while maintaining a distance between the plurality of plastic components and the laser beam emitting position of the laser beam irradiation unit at a constant distance.

5. The laser welding apparatus according to claim 1, further comprising a plastic component moving device for moving the plurality of plastic components relative to a laser beam emitting position at which a laser beam is irradiated from the laser beam irradiation unit, while maintaining a distance between the plurality of plastic components and the laser beam emitting position at a constant distance.

6. The laser welding apparatus according to claim 5, wherein the plastic component moving device is configured to operate according to at least one of the following actions;
(i) moving the plurality of plastic components parallel to a horizontal direction relative to the laser beam emitting position of the laser beam irradiation unit; (ii) rotationally moving the plurality of plastic components in a horizontal direction; and (iii) rotating the plurality of plastic components around an axis that is perpendicular to a direction of laser beam irradiation toward the heat generation portion.

7. The laser welding apparatus according to claim 1, further comprising:
a temperature measurement device for measuring a temperature of the heat generation portion of the support member, and sending temperature information that is measured to the welding controller, wherein, based on temperature information regarding the heat generation portion from the temperature measurement device, the welding controller performs at least one welding operation among: (1) keeping the temperature of the heat generation portion constant, (2) stopping laser irradiation, and (3) notifying completion of laser welding.

8. The laser welding apparatus according to claim 7 wherein the temperature measurement device is a thermocouple or a reflection thermometer.

9. The laser welding apparatus according to, claim 2, the laser beam irradiation unit being a first laser beam irradiation unit for irradiating a first laser beam that is a near infrared beam, and further comprising a second laser beam irradiation unit for irradiating a second laser beam that is a far infrared beam toward the pressure member, wherein:
 a material that transmits the first laser beam that is a near infrared beam and absorbs the second laser beam that is a far infrared beam is used for the pressure member, and
the welding controller controls so that the first laser beam and second laser beam are simultaneously irradiated by the first laser beam irradiation unit and second laser beam irradiation unit, the heat generation portion of the support member is caused to generate heat by the first laser beam, the pressure member is caused to generate heat by the second laser beam, and abutting faces of a welding area of the plurality of plastic components are welded using heat that is generated by each of the heat generation portion of the support member and the pressure member which sandwich the plurality of plastic components.

10. The laser welding apparatus according to claim 1, further comprising:
 a housing that houses the support member in a form in which an upper face of the heat generation portion is exposed, and that has a cooling passage including a heat exhaust port that opens toward the upper face of the heat generation portion;
 and a coolant feeder far supplying a coolant to the cooling passage and blowing the coolant from the heat exhaust port of the cooling passage toward the upper face of the heat generation portion.

11. The laser welding apparatus according to claim 1, further comprising:
 a housing that houses the support member in a form in which an upper face of the heat generation portion is exposed, and that has a cooling passage that is formed along a face other than the upper face of the beat generation portion; and
a coolant feeder for supplying a coolant to the cooling passage and blowing the coolant along a face other than the upper face of the heat generation portion.

12. The laser welding apparatus according to claim 1, wherein, in the heat generation portion, a concave portion is provided in an abutting face that abuts again the plastic component, and a vertical wall is provided around the concave portion.

13. The laser welding apparatus according to claim 1, wherein, in the support member, a circumference of the heat generation portion is surrounded by a reflection portion that reflects the laser beam.

14. The laser welding apparatus according to claim 1, wherein, in the support member, a circumference of the heat generation portion is surrounded by a heat conduction portion to which heat of the heat generation portion is conducted.

15. The laser welding apparatus according to claim 1, wherein the laser welding apparatus further comprises a pressure member for sandwiching the plurality of plastic components together with the heat generation portion of the support member, and pressurizing the abutting faces of the welding area of, the plurality of plastic components in a direction in which the abutting faces closely contact with each other,
 the laser beam irradiation unit is a first laser beam irradiation unit for irradiating a first laser beam that is a near infrared beam,
 the laser welding apparatus further comprises a second laser beam irradiation unit for irradiating a second laser beam that is a far infrared beam toward the pressure member, wherein:
 a material that transmits the first laser beam that is a near infrared beam and absorbs the second laser beam that is a far infrared beam is used for the pressure member, and
the welding controller controls so that the first laser beam and second laser beam are simultaneously irradiated by the first laser beam irradiation unit and second laser beam irradiation unit, the heat generation portion of the support member is caused to generate heat by the first laser beam, the pressure member is caused to generate heat by the second laser beam, and the abutting faces of the welding area of the plurality of plastic components are welded using heat that is generated by each of the heat generation portion of the support member and the pressure member which sandwich the plurality of plastic components.

16. The laser welding apparatus according to claim 1, wherein the laser welding apparatus further comprises a housing that houses the support member in a form in which an upper face of the heat generation portion is exposed, and that has a cooling passage including a heat exhaust port that opens toward the upper face of the heat generation portion; and
a coolant feeder for supplying a coolant to the cooling passage and blowing the coolant from the heat exhaust port of the cooling passage toward the upper face of the heat generation portion.

17. The laser welding apparatus according to claim 1, wherein the laser welding apparatus further comprises a housing that houses the support member in a form in which an upper face of the heat generation portion is exposed, and that has a cooling passage that is formed along a face other than the upper face of the heat generation portion; and
a coolant feeder for supplying a coolant to the cooling passage and blowing the coolant along a face other than the upper face of the heat generation portion.

18. The laser welding apparatus according to claim 1, wherein, in the heat generation portion, a concave portion is provided in an abutting face that abuts against the plastic component, and a vertical wall is provided around the concave portion.

* * * * *